United States Patent [19]
Kameyama

[11] Patent Number: 6,111,607
[45] Date of Patent: Aug. 29, 2000

[54] LEVEL COMPRESSION OF A VIDEO SIGNAL WITHOUT AFFECTING HUE OF A PICTURE REPRESENTED BY THE VIDEO SIGNAL

[75] Inventor: Takashi Kameyama, Kanagawa, Japan

[73] Assignee: Sony Corporation, Tokyo, Japan

[21] Appl. No.: 08/831,686

[22] Filed: Apr. 10, 1997

[30] Foreign Application Priority Data

| Apr. 12, 1996 | [JP] | Japan | 8-091575 |
| Jan. 30, 1997 | [JP] | Japan | 9-016729 |

[51] Int. Cl.⁷ ................................................ H04N 9/77
[52] U.S. Cl. .................... 348/256; 348/255; 348/645; 348/655
[58] Field of Search .................... 348/222, 223, 348/242, 255, 254, 256, 599, 672, 673, 674, 675, 679, 703, 712, 713, 225, 645, 649, 650, 651, 652, 653, 654, 655

[56] References Cited

U.S. PATENT DOCUMENTS

| 5,130,786 | 7/1992 | Murata et al. | 348/341 |
| 5,181,105 | 1/1993 | Udagawa et al. | 358/520 |
| 5,245,428 | 9/1993 | De With et al. | 367/165 |
| 5,296,920 | 3/1994 | Sakaue et al. | 348/675 |
| 5,523,785 | 6/1996 | Muramoto | 348/254 |
| 5,680,230 | 10/1997 | Kaburagi et al. | 358/520 |
| 5,729,299 | 3/1998 | Suzuki et al. | 348/649 |
| 5,949,482 | 9/1999 | Kawa | 348/256 |

*Primary Examiner*—Wendy Garber
*Assistant Examiner*—Mitchell White
*Attorney, Agent, or Firm*—Frommer Lawrence & Haug, LLP; William S. Frommer; Glenn F. Savit

[57] ABSTRACT

A level compression and/or gradation conversion of a video signal are performed without causing any change in the hue of a picture represented by that video signal. The knee compression and/or gradation conversion are carried out by multiplying red, green and blue primary color signals by a luminance gain, while the hue and saturation remain unaffected. If the level of any of the primary color signals still exceeds a predetermined threshold level, the saturation conversion is executed by using the saturation gain and the luminance component supplied from a controller. In the saturation conversion operation, the maximum level of at least one of the red, green and blue primary color signals is made coincident with the predetermined threshold level while the hue and luminance of the picture represented by the video signal are maintained unchanged.

65 Claims, 42 Drawing Sheets

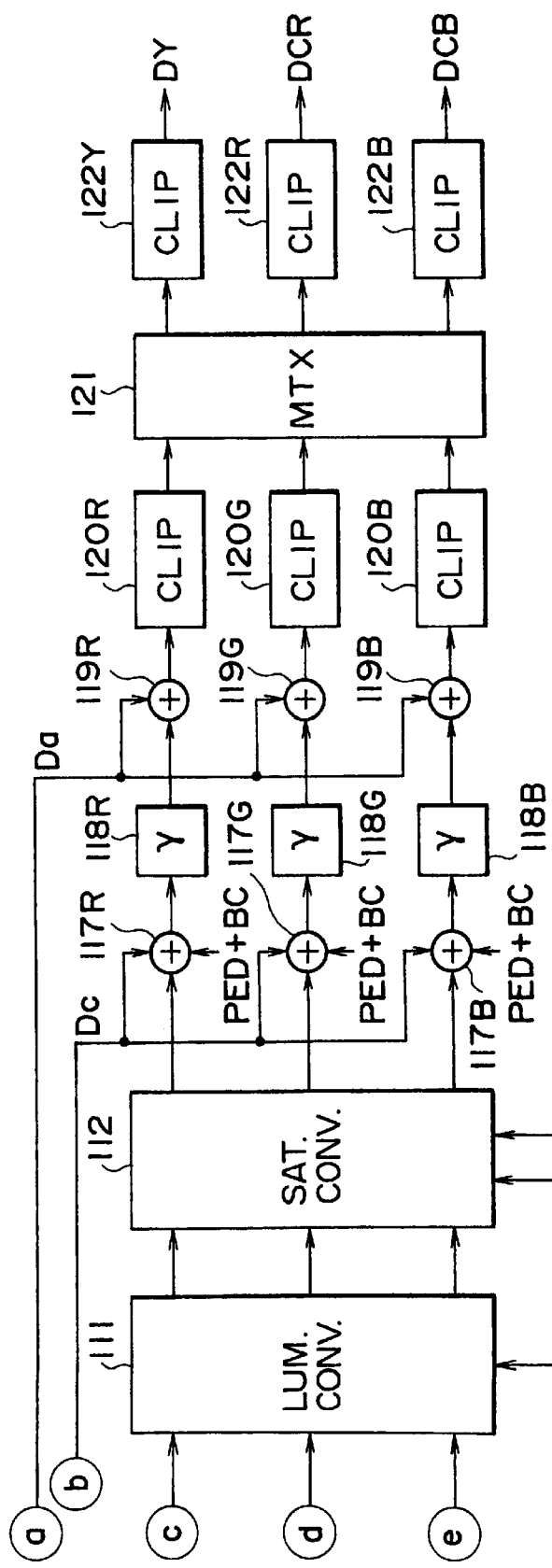

IPF

LPF

OVERALL

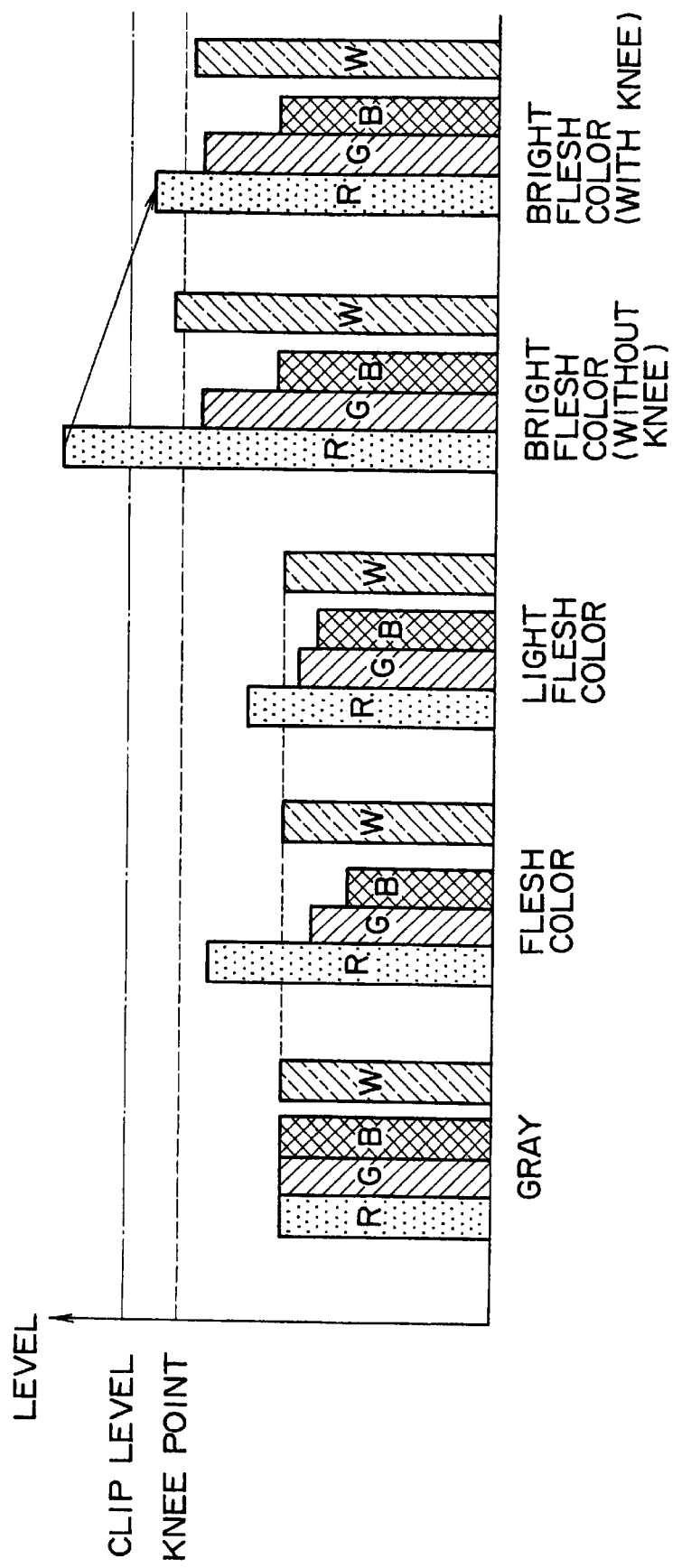

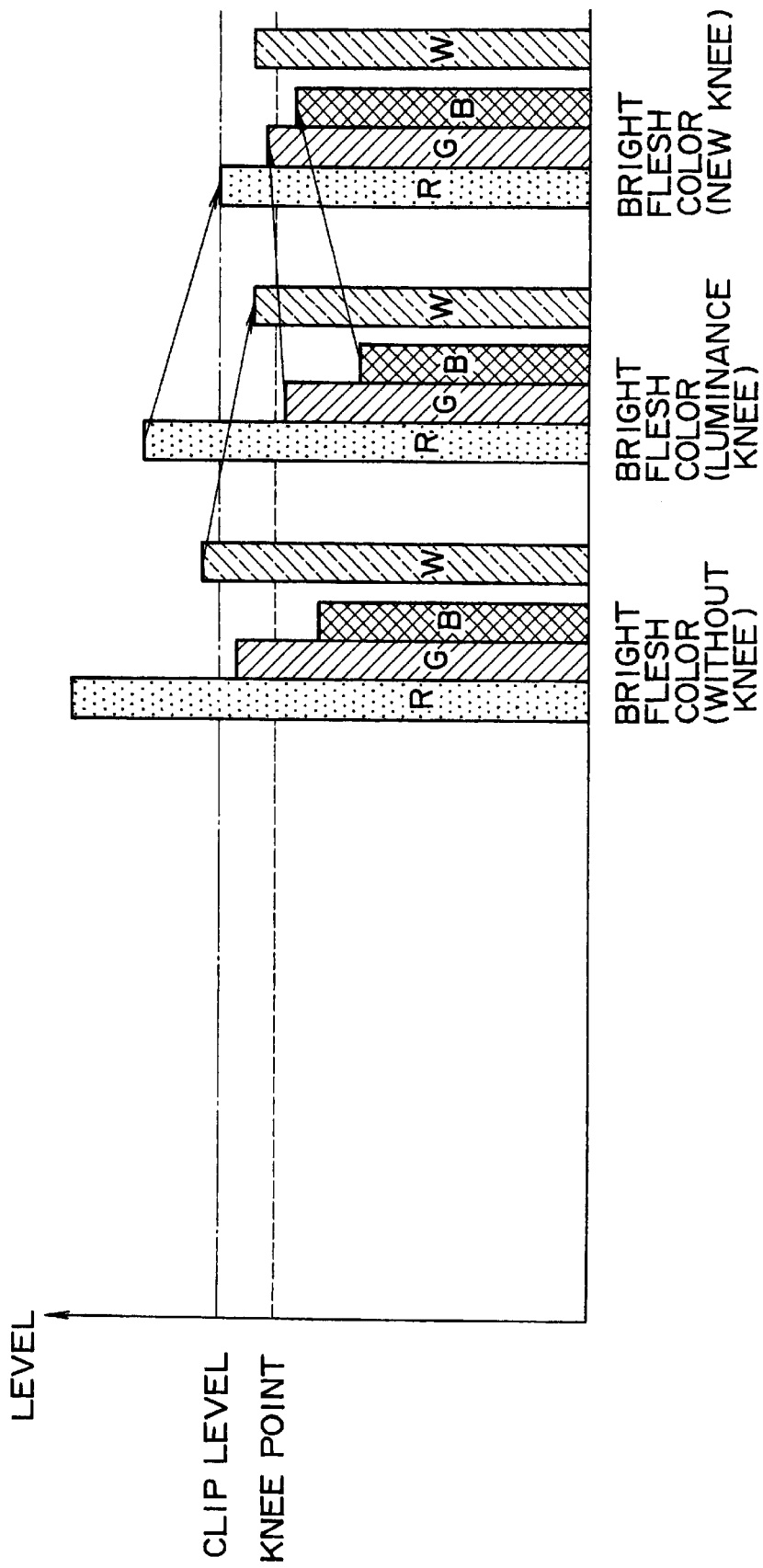

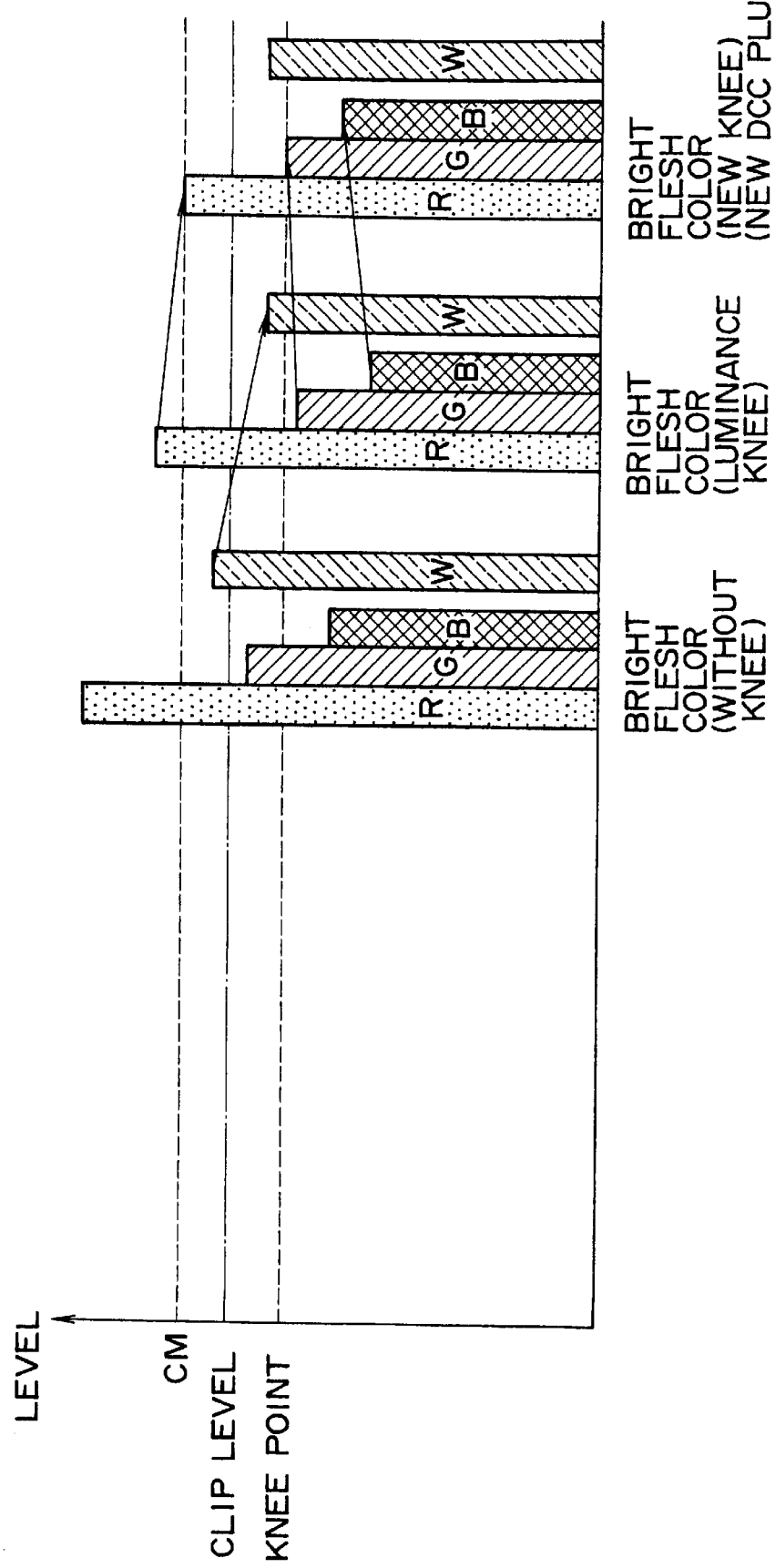

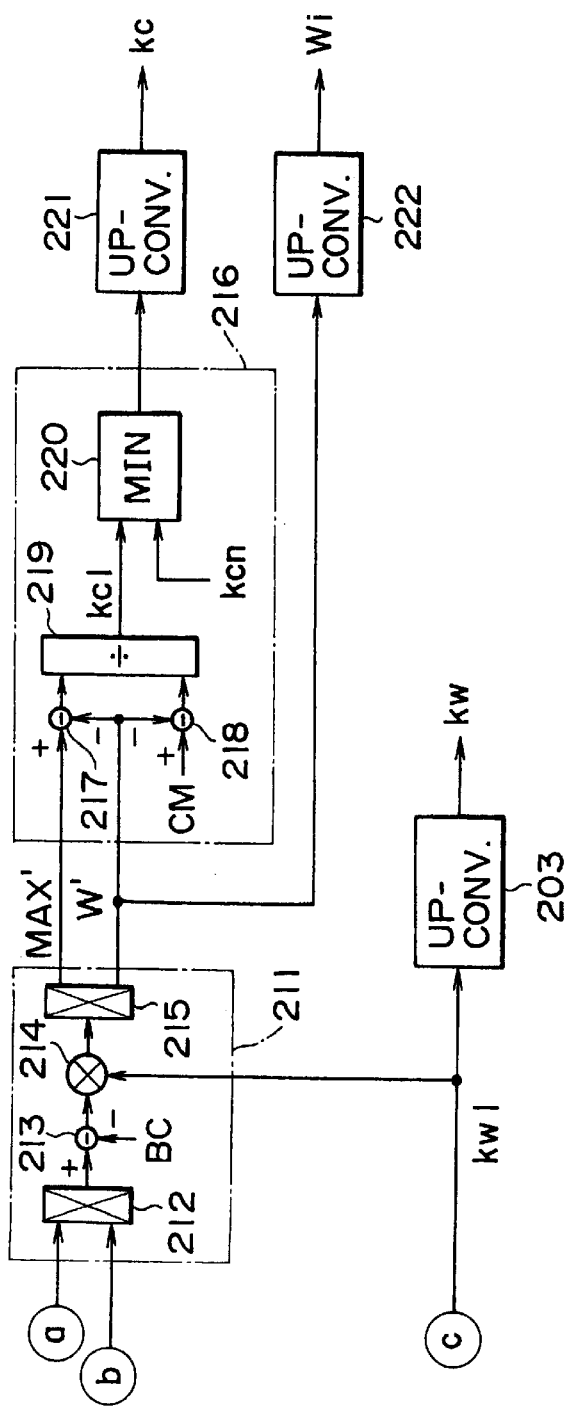

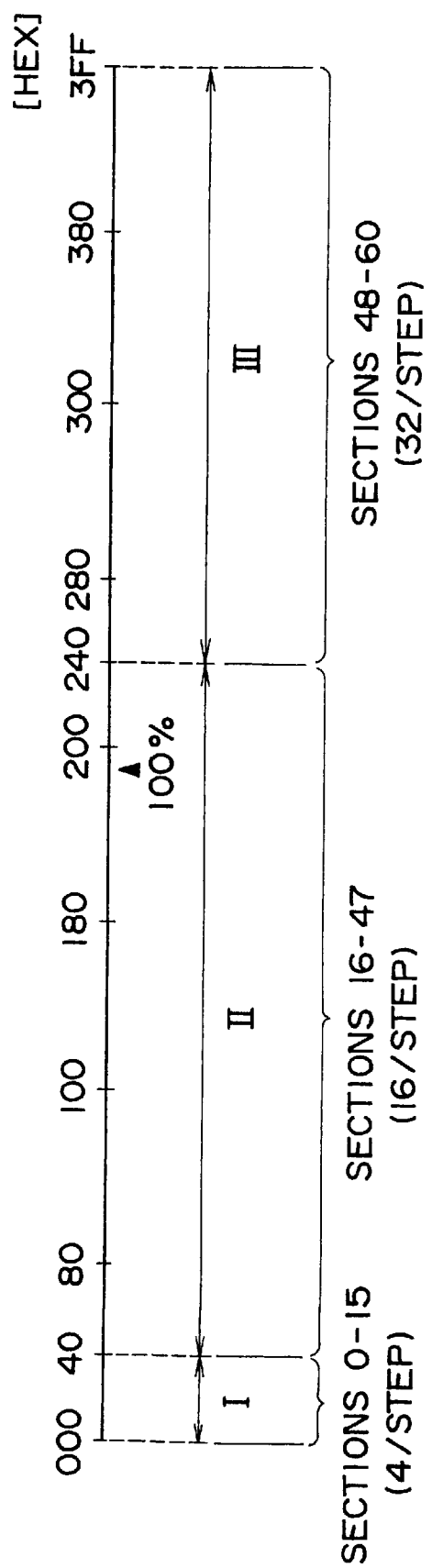

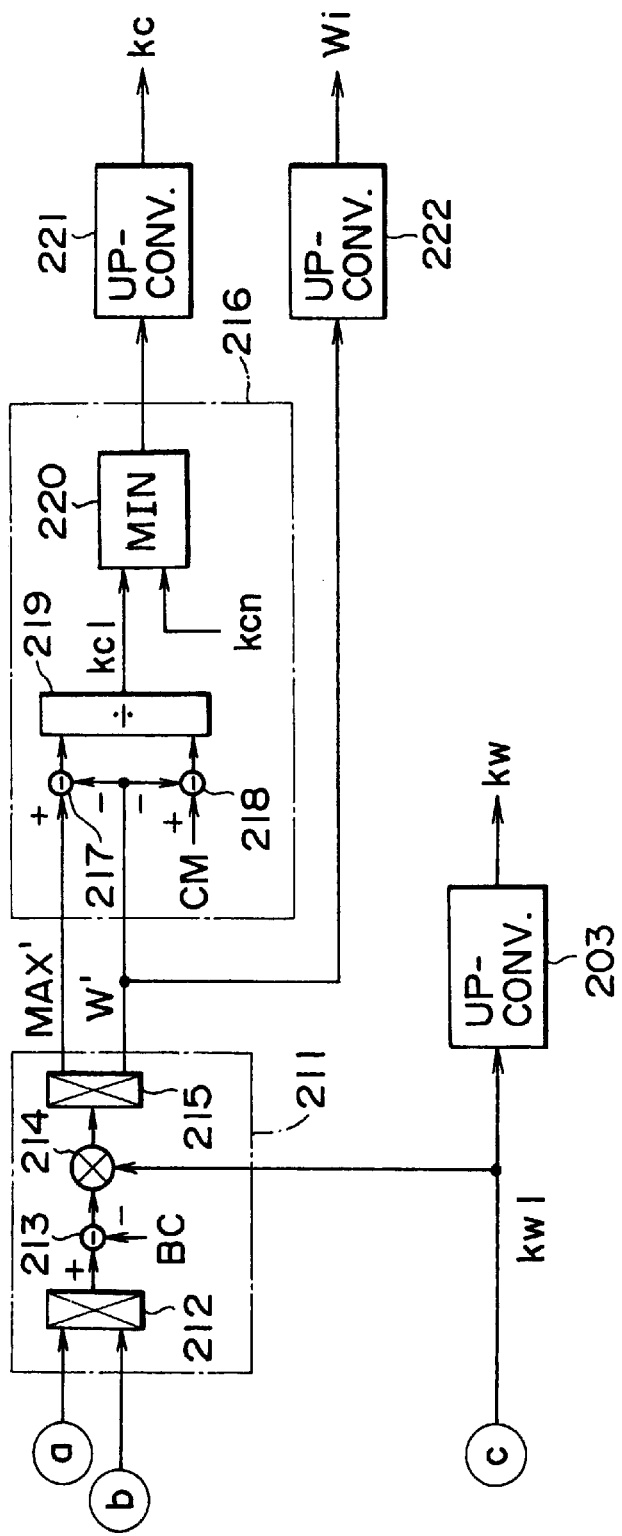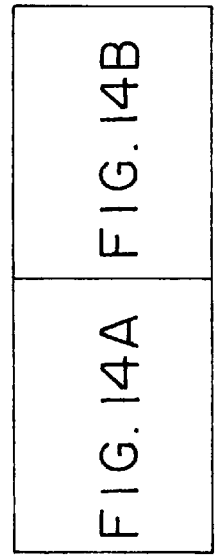

FIG. 16

| Step | 0 | 1 | 2 | 3 | 4 | 5 | 6 | 7 | 8 | 9 |
|---|---|---|---|---|---|---|---|---|---|---|
| Function | Histogram | Accumulate | Kwc(1) | Kwc(2) | Blk Adj | W_hold(1) | W_hold(2) | Knee 1(1) | Knee 1(2) | Knee 2(1) |
| Sequence 0 | | memrd | memrd | memrd | memrd | memrd | memrd | memrd | memrd | memrd |
| 1 | | | | | | | | | | |
| 2 | | | | | | | | | | |
| 3 | | regwr | regwr | memwr | memwr | regwr | memwr | regwr | memwr | regwr |
| 4 | | | | | | | | | | |
| 5 | | histwr | | | | | | | | |
| 6 | | memwr | memwr | | | memwr | | memwr | | memwr |
| 7 | | | | | | | | | | |
| add/sub | + | + | — | + | — | — | + | — | + | — |

| Step | 10 | 11 | 12 | 13 | 14 | 15 |
|---|---|---|---|---|---|---|
| Function | Knee 2(2) | Gain | Divide | LPF(1) | LPF(2) | Clear |
| Sequence 0 | memrd | memrd | memrd | memrd | memrd | memrd |
| 1 | | | | | | |
| 2 | | | divstart | | | |
| 3 | memwr | regwr | Stop | regwr | memwr | memwr |
| 4 | | | | | | |
| 5 | | | | | | |
| 6 | | memwr | memwr | memwr | memwr | |
| 7 | | | | | | |
| add/sub | + | — | * | — | + | * |

| Step | 3 | 4 |
|---|---|---|
| Function | Kwc(2) | Blk Adj |
| Sequence 0 | memrd | memrd |
| 1 | | |
| 2 | | |
| 3 | memwr / blkwr | memwr |
| 4 | | memrd |
| 5 | | divstart |
| 6 | | Stop |
| 7 | | hldwr |
| add/sub | + | — → — | adr = adr =
blksec : hldsec :

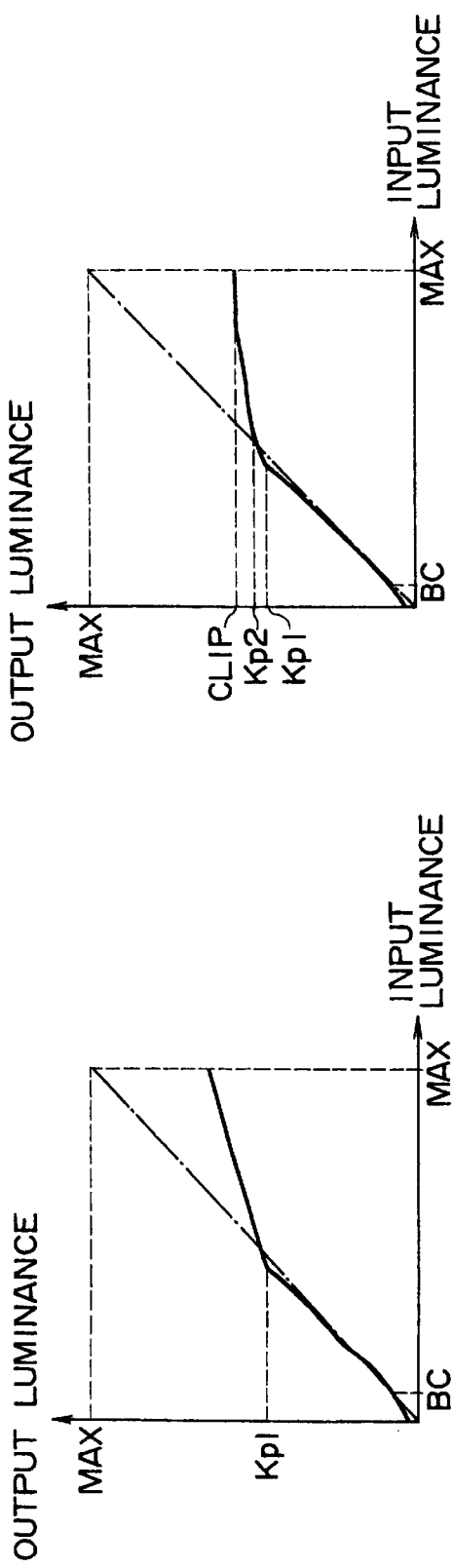
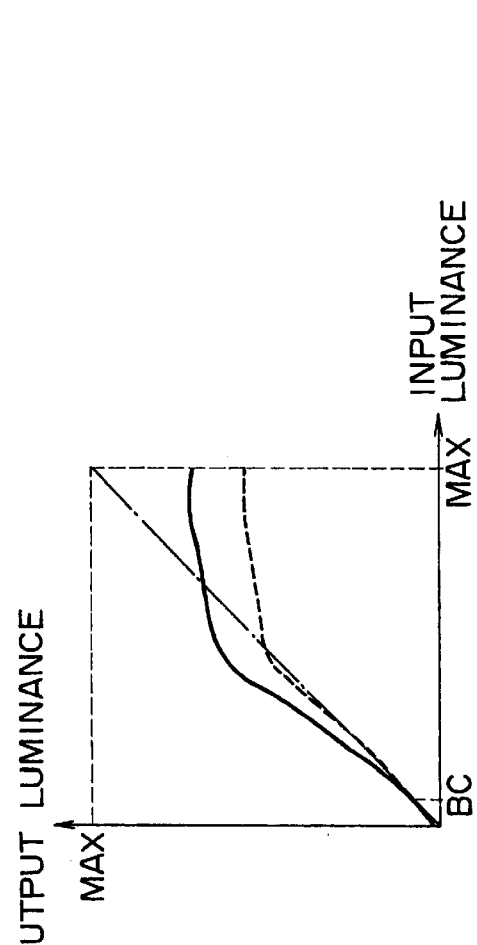
FIG.25G
FIG.25H
FIG.25I

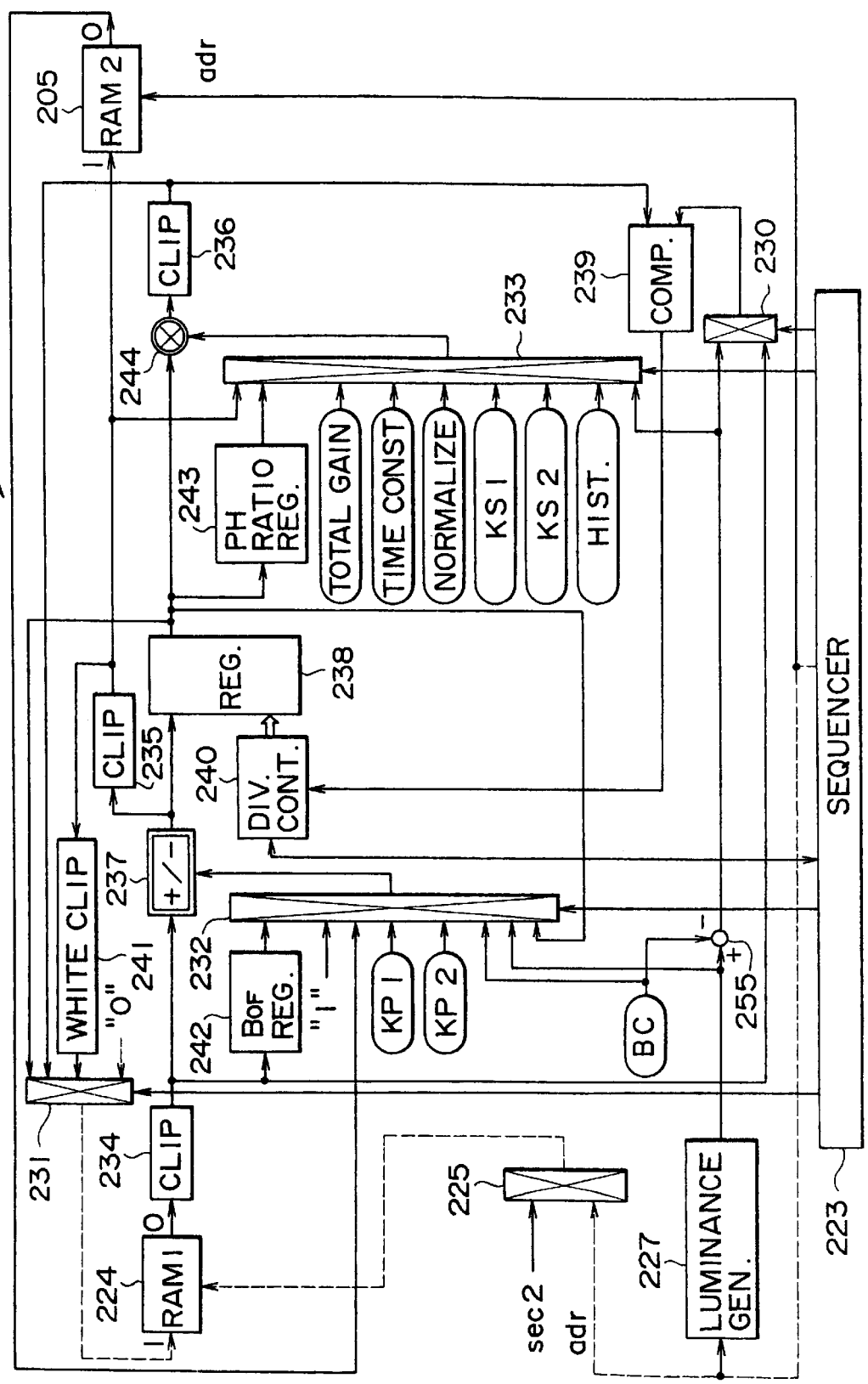
F I G. 35

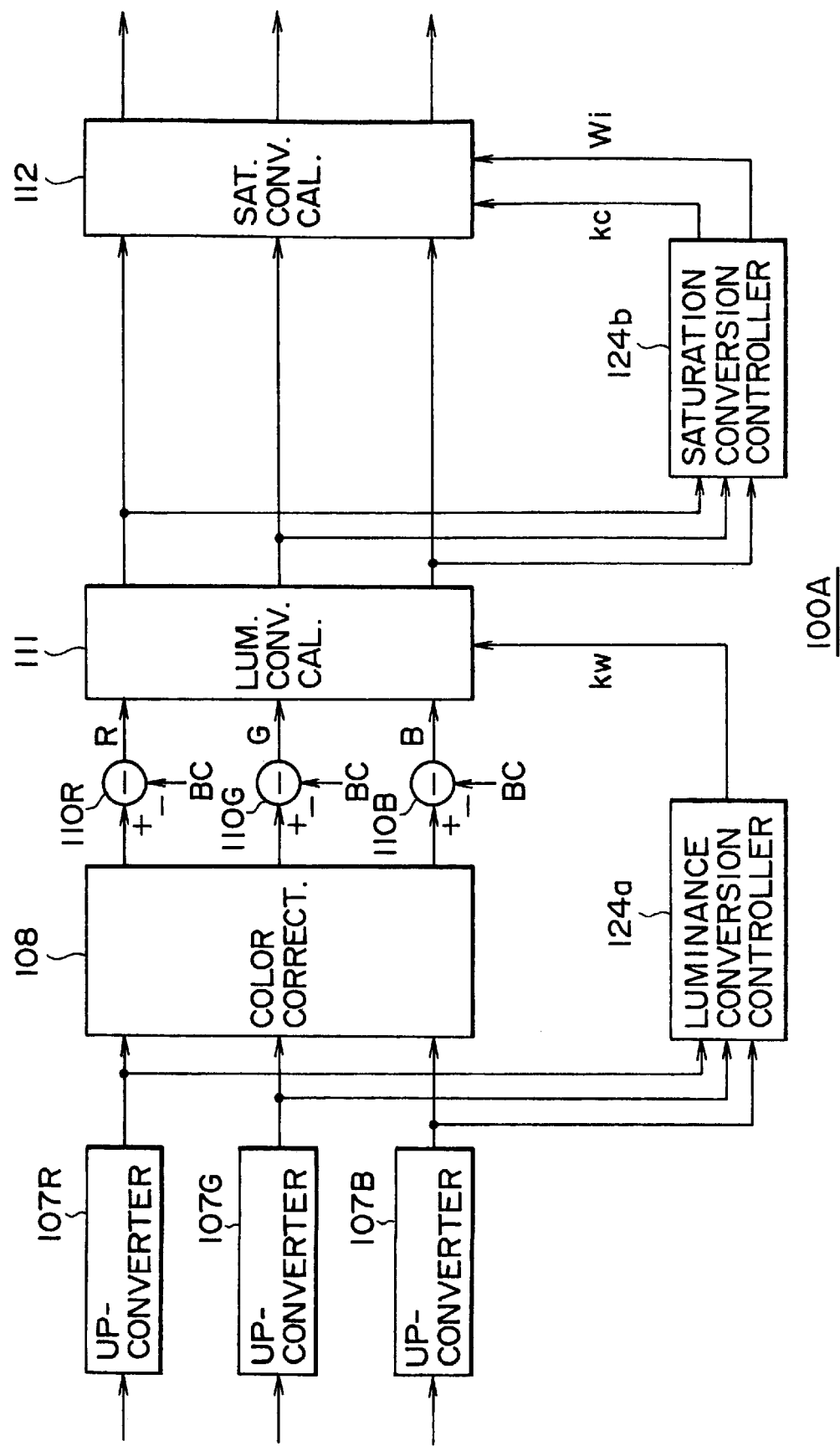

FIG. 37A-I
RELATED ART
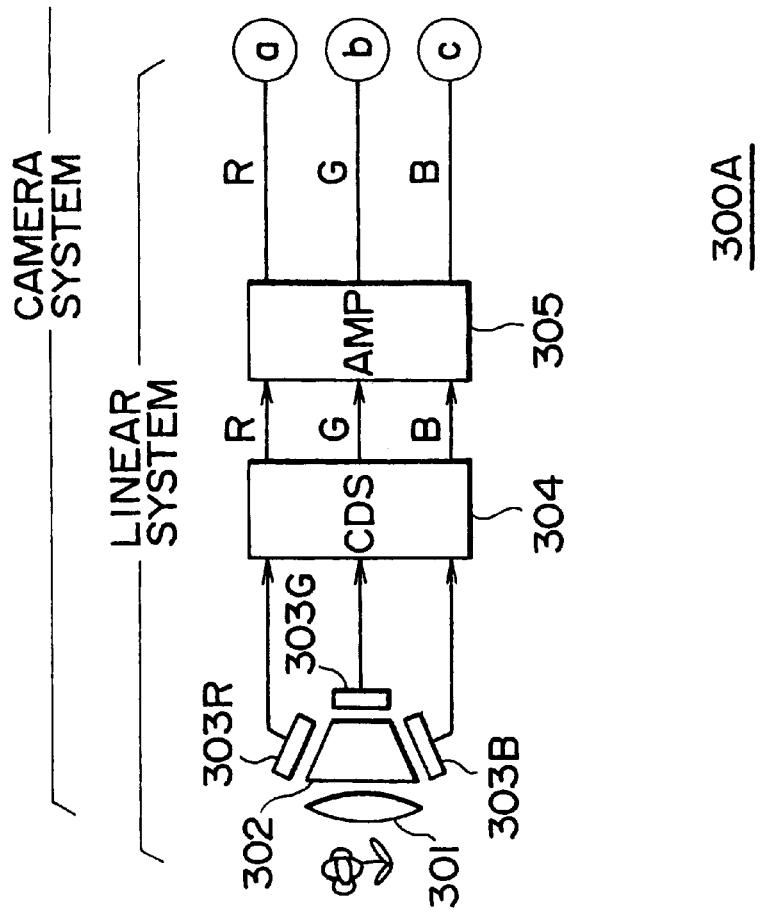
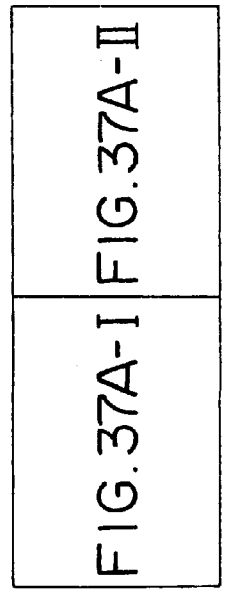

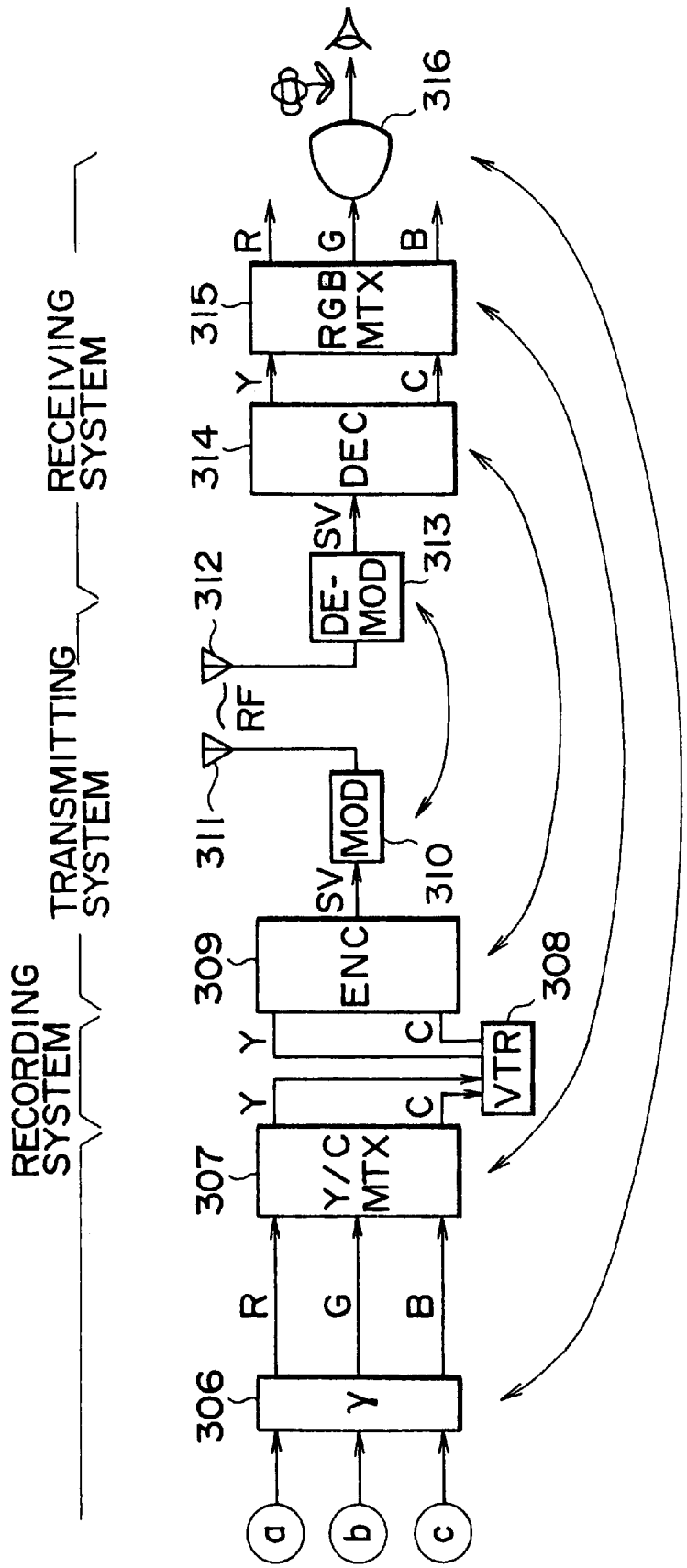

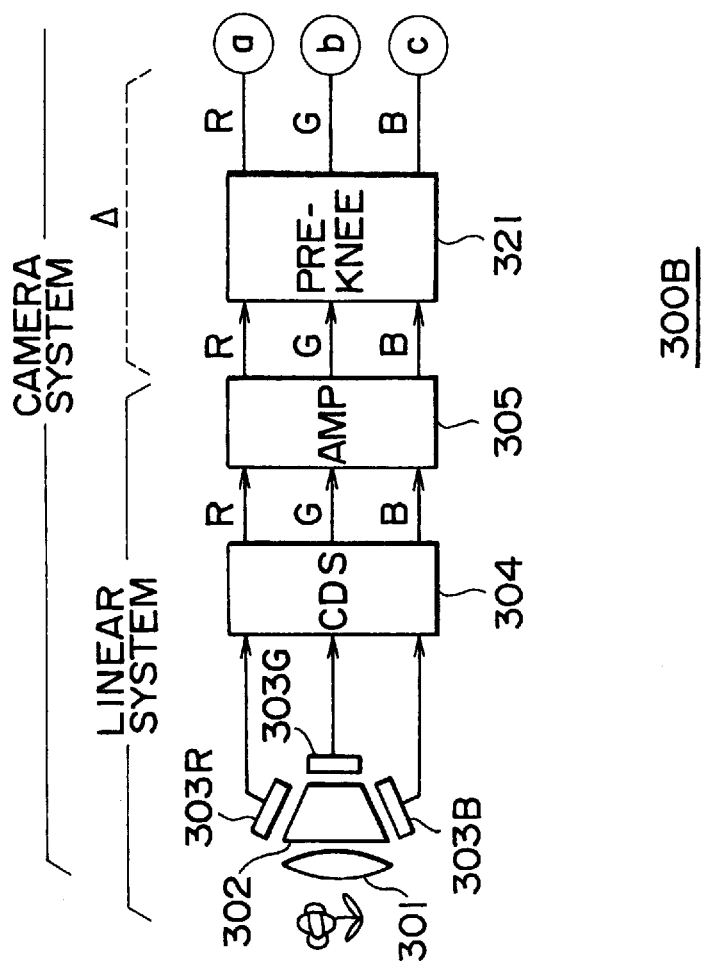
FIG. 37B-I
RELATED ART

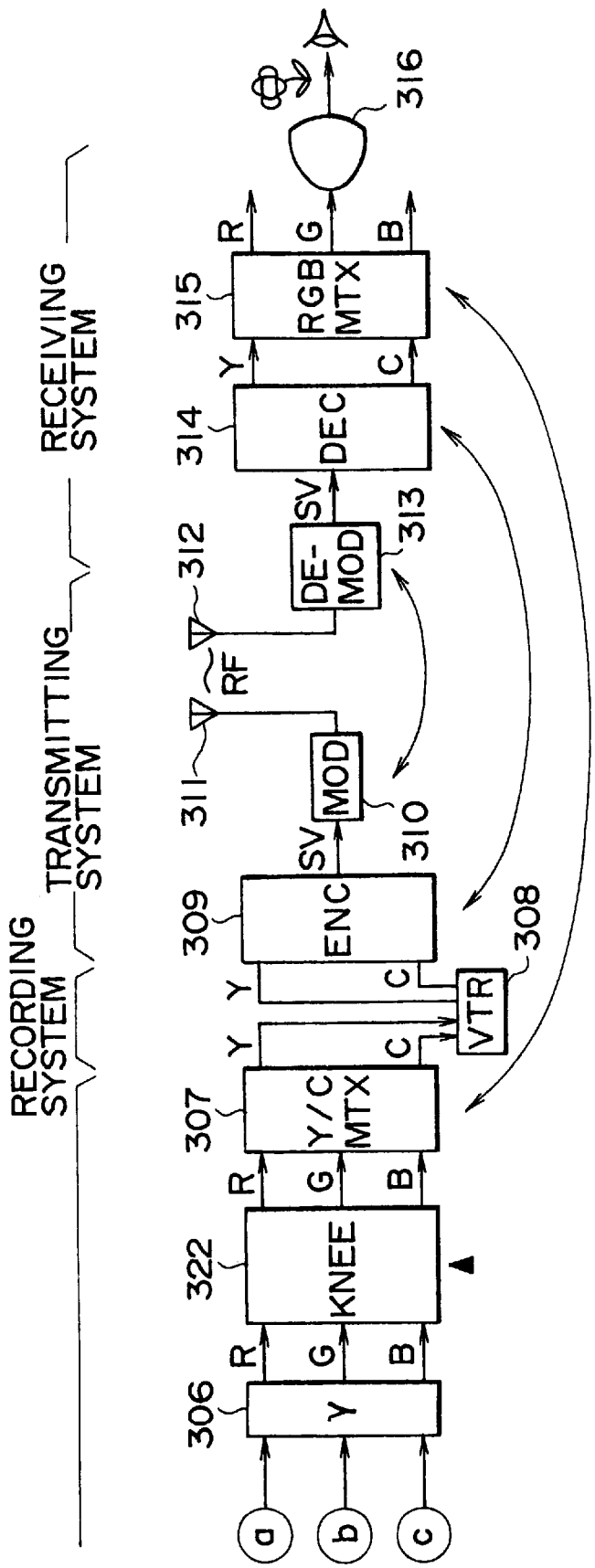
FIG. 37B-II
RELATED ART

LEVEL COMPRESSION OF A VIDEO SIGNAL WITHOUT AFFECTING HUE OF A PICTURE REPRESENTED BY THE VIDEO SIGNAL

BACKGROUND OF THE INVENTION

The present invention is broadly related to a video camera and, in particular, a method and apparatus for compressing a level, and converting gradations, of a color video signal representing a color video picture of an object in high luminance areas without causing any change in hue of the picture.

FIG. 37A shows an ideal television system 300A consisting of a camera system, a recording system, a transmitting system and a receiving system. A picture is obtained by the camera system and sent via the recording system and transmitting system to the receiving system including a monitor for viewing, for example.

In the television system 300A, incident light of an object, such as a flower for example, passes through an objective lens 301, and is divided into red, green and blue components by a color separation prism 302. Each individual color component is then supplied to CCD solid-state image sensors 303R, 303G, 303B, so that a red image, a green image and a blue image of the object are obtained. The red, green and blue image signals are further supplied to a correlated double sampling (CDS) circuit 304 for appropriate processing, such as noise removal, resulting in red, green and blue color signals R, G, B.

Next, the color signals R, G, B outputted from the CDS circuit 304 are amplified in an amplifier 305 and are processed by a gamma correction circuit 306 and a signal processing circuit 307. The signal processing circuit 307 performs a well-known matrixing operation on the color signals R, G, B to obtain a luminance signal Y, a red color difference signal CR and a blue color difference signal CB. A sync signal is then added to the luminance signal Y, while the color difference signals CR and CB are modulated and combined to form a carrier color signal C. The luminance signal Y and the carrier color signal C are now ready to be recorded, for example, on a Video Tape Recorder (VTR) 308 of the recording system.

For distribution, for example, to a viewing audience via the transmitting system, the luminance signal Y and the carrier color signal C are reproduced by the VTR 308 for input to an encoder 309 which forms a video signal SV. The video signal SV is modulated in a modulator 310 to result in an RF signal, which is then transmitted from a transmitting antenna 311. The RF signal received by a receiving antenna 312 of the viewing audience is demodulated in a demodulator 313 such that the video signal SV is recovered.

The receiving system performs virtually inverse operations with respect to the corresponding operations of the transmitting system. Namely, the luminance signal Y and the carrier color signal C are recovered from the video signal SV by a decoder 314. Then, the luminance signal Y and the carrier color signal C are supplied to a signal processing circuit 315 where the carrier color signal C is demodulated to obtain the color difference signals CR and CB. The luminance signal Y and the color difference signals CR, CB are processed to form color signals R, G, B. Thereafter, the color signals R, G, B outputted from the signal processing circuit 315 are supplied to a cathode-ray tube (CRT) 316, and the picture of the object-in-interest (the flower) is displayed on the CRT 316.

Although a nonlinear device exists in the signal line of this ideal television system 300A, namely the CRT as known in the art, the entire process starting from the object and ending with the picture display is linear as viewed by the audience. This is due to the presence of the gamma correction circuit to compensate for the CRT non-linear operation, whereby the picture of the object is accurately reproduced for viewing.

As stated above, the described television system is ideal, without any limitations or restrictions. In practice, however, the dynamic range of each image sensor 303R, 303G, 303B is limited. In addition, the recording and transmitting systems have operational restrictions on signal recording and transmission in order to conform to accepted standards. Hence, it is virtually impossible to achieve the configuration of FIG. 37A. The standards imposed on the signal recording and transmission are determined to be very restrictive, and therefore adequate measures are needed to include a wide dynamic range of the incident natural light within the prescribed range as allowed by the standards.

For this reason, in a practical television system 300B, a pre-knee circuit 321 is inserted between an amplifier 305 and a gamma correcting circuit 306 as shown in FIG. 37B. Further, a knee circuit 322 is inserted between the gamma correcting circuit 306 and a signal processing circuit 307. This is done to fit the levels of the color signals R, G, B into the prescribed range of the standard by providing nonlinear input-output characteristics of the knee circuit. Since the signal levels according to the broadcasting standards refer to the color signals R, G, B, it is possible to conform with those standards by processing the color signals directly. In FIG. 37B, any components corresponding to FIG. 37A are designated by like reference numerals.

According to the system of FIG. 37B, the color signals R, G, B are non-linearly processed—each signal being processed independently from other signals—without corresponding inverse operations to compensate for this non-linear processing. The complementary operations are disrupted between the gamma correcting circuit 306 and the gamma characteristics of the CRT 316. As a result, luminance and hue of the picture of the object displayed on the CRT are different from the actual luminance and hue of the image of that object as perceived by the human eye.

Although the knee compression is determined to be the best operation for compressing the dynamic range of the incident light such that harmful effects are minimized on the object reproduction, a defect due to the knee compression occurs making an undesirable change in hue visually perceptible and unpleasant. For example, in a person's portrait shot in a slightly bright area, the problem occurs making that person look unhealthy with the skin color appearing more yellow than should be.

A need therefore exists for a method and device that overcome the above disadvantages.

OBJECTS OF THE INVENTION

It is an object of the present invention to obtain a high fidelity reproducible picture shot in bright light with a video camera.

It is another object of the present invention to provide a better dynamic contrast control in a video camera.

It is a further object of the present invention to provide flare correction of a video picture caused by an excessive luminance level in a video camera.

It is still another object of the present invention to provide a manual control of a saturation level of a color video signal representing a picture generated by the video camera.

It is yet another object of the invention to perform level compression and gradation conversion of a color video signal without causing any change in hue of a picture represented by the color video signal.

SUMMARY OF THE INVENTION

These and other objects, features and advantages are accomplished by a method and apparatus for generating a color video signal formed of a luminance signal and a chrominance signal, which is defined by hue and saturation components. In accordance with the present invention, input three primary color signals having the respective levels and representing the color video signal are generated. Compressed three primary color signals are then obtained by compressing the respective levels of the input three primary color signals using one compression rate without affecting the hue and saturation components. A maximum level detected from the compressed three primary color signals is adjusted when the detected maximum level exceeds a first predetermined threshold level. The detected maximum level is adjusted to substantially coincide with the first predetermined threshold level without affecting the hue component and the luminance signal.

In accordance with one aspect of the invention, the three respective levels are compressed when the luminance signal exceeds a second predetermined threshold level. The first predetermined threshold level is selected to be higher than the second predetermined threshold level.

In accordance with another aspect of the invention, the first predetermined threshold level is selected to be higher than a maximum signal level established in accordance with a color television standard.

In accordance with yet another aspect of the invention, the luminance converter means is knee correction means for providing a knee characteristic operative on the color video signal.

BRIEF DESCRIPTION OF THE DRAWINGS

The above-mentioned as well as additional objects, features and advantages of the invention will become readily apparent from the following detailed description thereof which is to be read in conjunction with the accompanying drawings, in which:

FIG. 6 shows the relationship between R, G, B levels and colors;

FIG. 7 shows the relationship between R. G. B levels and colors, with the luminance knee and saturation knee compression applied to those signals;

FIG. 8 shows the relationship between R, G. B levels and colors, with the DCC plus feature applied to those signals;

FIG. 12 shows an example of divided sections in the luminance range;

FIG. 16 shows operational steps of the controller for preparing a sequencing table;

FIG. 25 shows diagrams illustrating knee compression, white clipping and total gain control;

FIG. 35 is a diagram illustrating the ALU operation at step 15 for executing a RAM clearing operation;

FIG. 36 is a block diagram showing principal components of a video camera according to the second embodiment of the present invention; and FIG. 37 is a block diagram showing ideal and practical television systems.

In all Figures, like reference numerals represent the same or identical components of the invention.

DETAILED DESCRIPTION OF THE PREFERRED EMBODIMENTS

The invention will now be described in detail with reference to the accompanying drawings.

Figure 1A:
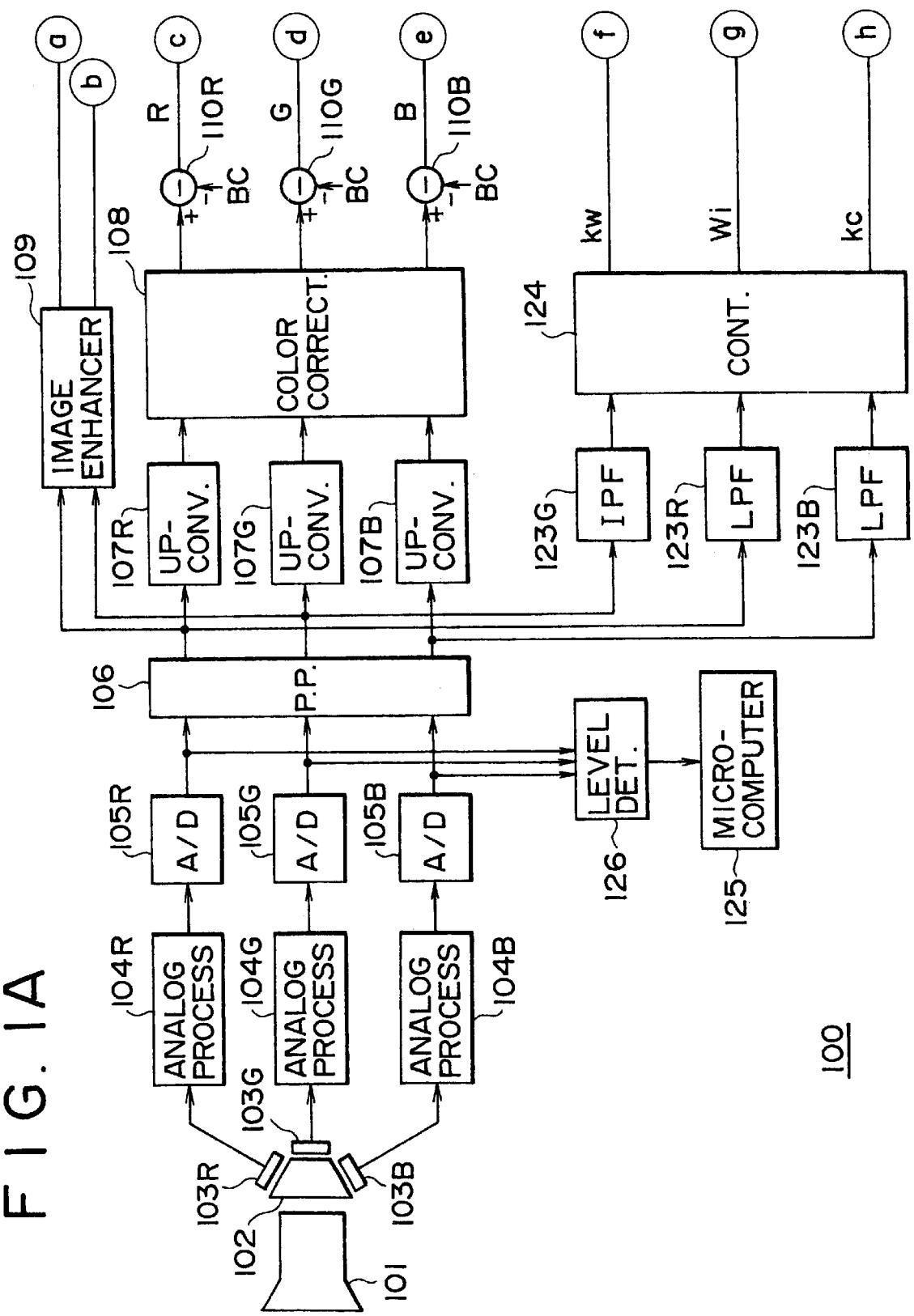
FIG. 1 is a block diagram of a video camera according to the first embodiment of the present invention.

FIG. 1 shows a video camera 100 in accordance with the first embodiment of the present invention. A microcomputer 125 functions as a system controller for the entire video camera 100. The microcomputer 125 supplies various data, such as a knee point, a knee slope, a white clip level, a normalization constant, a total gain, a time constant, a histogram, a black code, etc. for producing a sequencing table for carrying out the operations in accordance with the present invention, as will be explained hereinbelow. To reduce the complexity of this figure and to facilitate the understanding of the present invention, input and output lines of the microcomputer 125 carrying the above-mentioned data signals are not shown in FIG. 1.

Figure 2:
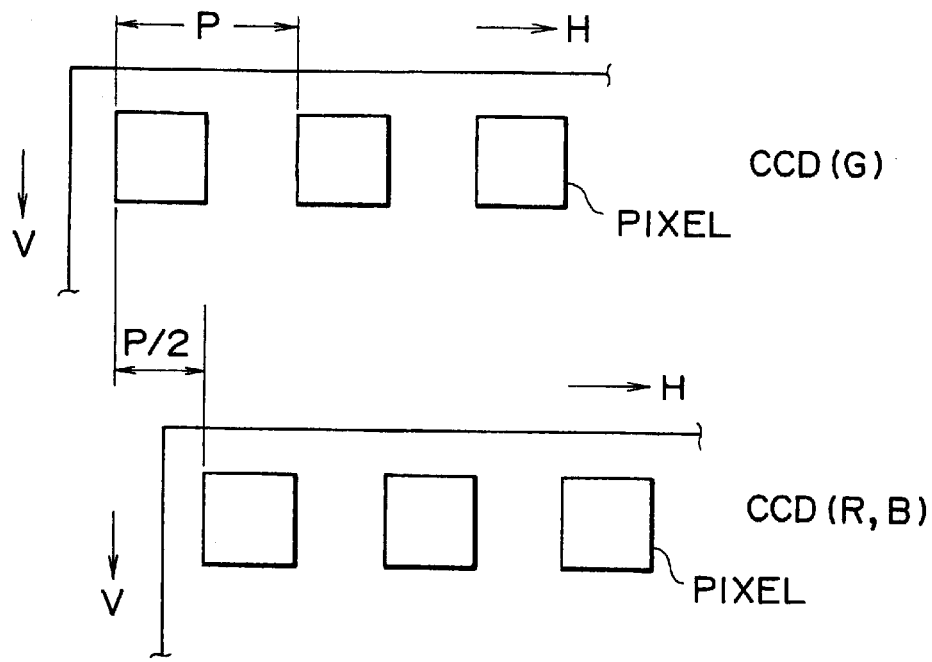
FIG. 2 is a schematic diagram illustrating a spatial pixel staggering method.

The video camera 100 has a lens block 101: the incident light forming an image of an object-in-interest enters the lens block 101 and a color separation prism 102 for separating red, green and blue color components of the incident light. These color components are then focused onto image sensing planes of CCD solid-state image sensors 103R, 103G, 103B for obtaining red, green and blue signals representing, respectively, red, green and blue images of the object. In this case, a spatial pixel staggering method is used for obtaining red, green and blue signals. As shown in FIG. 2, the image sensors 103R and 103B are positioned with a horizontal stagger of ½ pixel pitch (P/2) with respect to the image sensor 103G. Hence, the green signal generated by the image sensor 103G has a 180-degree phase difference with respect to red and blue signals for enhancing the pixel resolution.

The output from the image sensors 103R, 103G, 103B is supplied, respectively, to analog processing circuits 104R, 104G, 104B for carrying out correlated double sampling and level control on the red, green and blue signals individually. As known in the art, noise is reduced by the correlated double sampling operation, while the white and/or black balance is achieved by the level control.

A–D converters 105R, 105G, 105B convert the above-processed red, green and blue signals into digital signals. When supplied from the image sensors 103R, 103G, 103B at a rate of fs1 (such as 14.31818 MHz, for example), the red, green and blue signals are digitized by the A–D converters 105R, 105G, 105B using the sampling frequency substantially the same as the output rate fs1.

FIG. 1 further shows a level detector 126 for detecting the levels of the red, green and blue digital data outputted from the A–D converters 105R, 105G, 105B. The detected levels are supplied to the microcomputer 125 for controlling an iris, for example.

A pre-processing circuit 106 executes various image processing operations including black/white balance control and shading/defect correction on the red, green and blue digital data outputted from the A–D converters 105R, 105G, 105B. Next, up-converters 107R, 107G, 107B increase the output frequency of the red, green and blue digital data, respectively, having an in-phase relationship. The output frequency 2fs1 is twice the frequency of the red, green and blue digital data outputted from the pre-processing circuit 106. A color correcting circuit 108 performs a linear matrixing operation on the red, green and blue digital data outputted from the up-converters 107R, 107G and 107B. In the linear matrixing operation, calculations according to expression (1) are carried out for improving the reproduction of the images. In expression (1), DRin, DGin, DBin are input red, green and blue data, respectively; DRout, DGout, DBout are the corresponding output red, green and blue data; and a–f are predetermined coefficients.

$$DRout=DRin+a(DRin-DGin)+b(DRin-DBin)$$
$$DGout=DGin+c(DGin-DRin)+d(DGin-DBin)$$
$$DBout=DBin+e(DBin-DRin)+f(DBin-DGin) \quad (1)$$

An image enhancer 109 produces, based on the red and green data DR, DG obtained from the pre-processing circuit 106, contour emphasis signals Da and Dc to emphasize the contours of the images. In this case, the contour emphasis signal Da is operative to emphasize the high frequency area, while the contour emphasis signal Dc is operative to emphasize the low frequency area.

Further, subtracters 110R, 110G, 110B subtract a black code BC, which is supplied from the microcomputer 125, from the red, green and blue color data outputted from the color correcting circuit 108. Since the black code BC is affected by the operations of a luminance conversion calculator 111 and/or a saturation conversion calculator 112, the black code BC is removed from the digital data prior to those operations. As a result of this subtraction, red, green and blue stimulus values R, G, B are obtained. Following the operations of the luminance conversion calculator 111 and/or the saturation conversion calculator 112, the black code BC is restored (added) by adders 117R, 117G, 117B, as explained below.

According to the present invention, knee compression, DCC plus function, white clipping, flare correction, adaptive gradation conversion with the histogram equalization, etc. are performed in the luminance conversion calculator 111 and in the saturation conversion calculator 112. The luminance conversion calculator 111 is operative to convert only the luminance signal, without affecting the hue or saturation component, of the color video signal formed of the stimulus values R, G, B. The saturation conversion calculator 112 is operative to convert only the saturation component, without affecting the luminance signal or the hue component, of the color video signal. These operations will be explained in detail next.

Conversion of the luminance signal without affecting the hue and saturation components is performed by multiplying each of the three stimulus values R, G and B with a luminance gain kw, as shown in expression (2). In this expression, Ri, Gi, Bi are stimulus values on the input side, and Ro, Go, Bo are stimulus values on the output side.

$$\begin{pmatrix} Ro \\ Go \\ Bo \end{pmatrix} = k_w \begin{pmatrix} Ri \\ Gi \\ Bi \end{pmatrix} \quad (2)$$

Expressions (3) to (5) describing color signal theory are well known in the art of color television systems.

$$W = 0.30R + 0.59G + 0.11B \quad (3)$$

$$x = \frac{R-W}{W} \quad (4)$$

$$y = \frac{B-W}{W} \quad (5)$$

In the above expressions, W is the luminance signal, and x and y contain only color information independently of the luminance signal W. When x=y=0, the pixel is colorless, i.e., gray. The angle of the vector (x, y) represents hue, while the magnitude of the vector (x, y) represents saturation of the color signal.

For determining if the hue and/or saturation components are affected by expression (2), it is substituted into expressions (3), (4) and (5) to obtain expressions (6), (7) and (8) as follows:

$$Wo = kw(0.30Ri + 0.59Gi + 0.11Bi) \quad (6)$$
$$= kwWi$$

$$xo = \frac{Ro - Wo}{Wo} \quad (7)$$
$$= \frac{kw(Ri - Wi)}{kwWi}$$
$$= \frac{Ri - Wi}{Wi}$$
$$= xi$$

$$yo = \frac{Bo - Wo}{Wo} \quad (8)$$
$$= \frac{kw(Bi - Wi)}{kwWi}$$
$$= \frac{Bi - Wi}{Wi}$$
$$= yi$$

Clearly, only the luminance signal is changed by the luminance gain kw, while hue and saturation of the color signal (represented by the vector (x, y)) remain unchanged.

Figure 3:
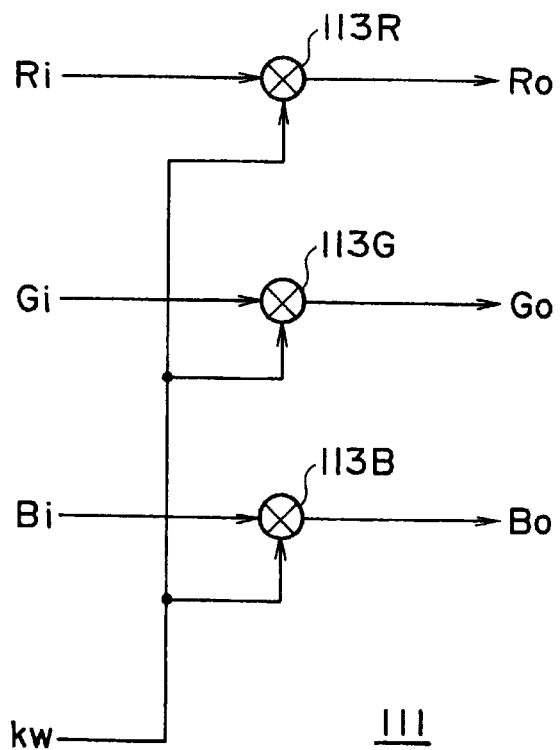
FIG. 3 is a block diagram of a luminance conversion calculator.

Based on expression (2), FIG. 3 shows a representative design of the luminance conversion calculator 111 in accordance with the present invention. The luminance conversion calculator 111 has multipliers 113R, 113G, 113B for multiplying the input stimulus values Ri, Gi, Bi by the luminance gain kw to obtain the output stimulus values Ro, Go, Bo.

Next, the saturation conversion according to the present invention is described. The conversion of the saturation component without affecting the luminance signal or the hue component is accomplished by executing linear operations of expression (9). Similar to the exemplary designation of variables in the above expressions with respect to the luminance conversion, Ri, Gi, Bi are the input stimulus values and Ro, Go, Bo are the output stimulus values. The saturation gain is denoted by kc.

$$\begin{pmatrix} Ro \\ Go \\ Bo \end{pmatrix} = \begin{pmatrix} 0.30 + 0.70kc & 0.59(1-kc) & 0.11(1-kc) \\ 0.30(1-kc) & 0.59 + 0.41kc & 0.11(1-kc) \\ 0.30(1-kc) & 0.59(1-kc) & 0.11 + 0.89kc \end{pmatrix} \begin{pmatrix} Ri \\ Gi \\ Bi \end{pmatrix} \quad (9)$$

By substituting the input luminance signal Wi, expression (9) may be rewritten as expressions (10), (11), (12) and (13).

$$Ro = Wi + kc(Ri - Wi) \quad (10)$$

$$Go = Wi + kc(Gi - Wi) \quad (11)$$

$$Bo = Wi + kc(Bi - Wi) \quad (12)$$

$$Wi = 0.59Gi + 0.30Ri + 0.11Bi \quad (13)$$

Similar to the above manipulation of expressions with respect to the luminance conversion, expressions (10), (11) and (12) are substituted into expressions (3), (4) and (5) to obtain expressions (14), (15) and (16) for determining if the luminance signal and hue component are affected:

$$Wo = 0.30\{Wi + kc(Ri - Wi)\} + 0.59\{Wi + kc(Gi + Wi)\} + \quad (14)$$
$$0.11\{Wi + kc(Bi - Wi)\}$$
$$= Wi$$

$$xo = \frac{Ro - Wo}{Wo} \quad (15)$$
$$= \frac{Wi + kc(Ri - Wi) - Wi}{Wi}$$
$$= \frac{kc(Ri - Wi)}{Wi}$$
$$= kcxi$$

$$yo = \frac{Bo - Wo}{Wo} \quad (16)$$
$$= \frac{Wi + kc(Bi - Wi) - Wi}{Wi}$$
$$= \frac{kc(Bi - Wi)}{Wi}$$
$$= kcyi$$

As evident from the above expressions, only the magnitude of the vector (x, y) is affected, that is, only saturation is changed by the saturation gain kc, while the luminance signal and hue remain unmodified.

Figure 4:
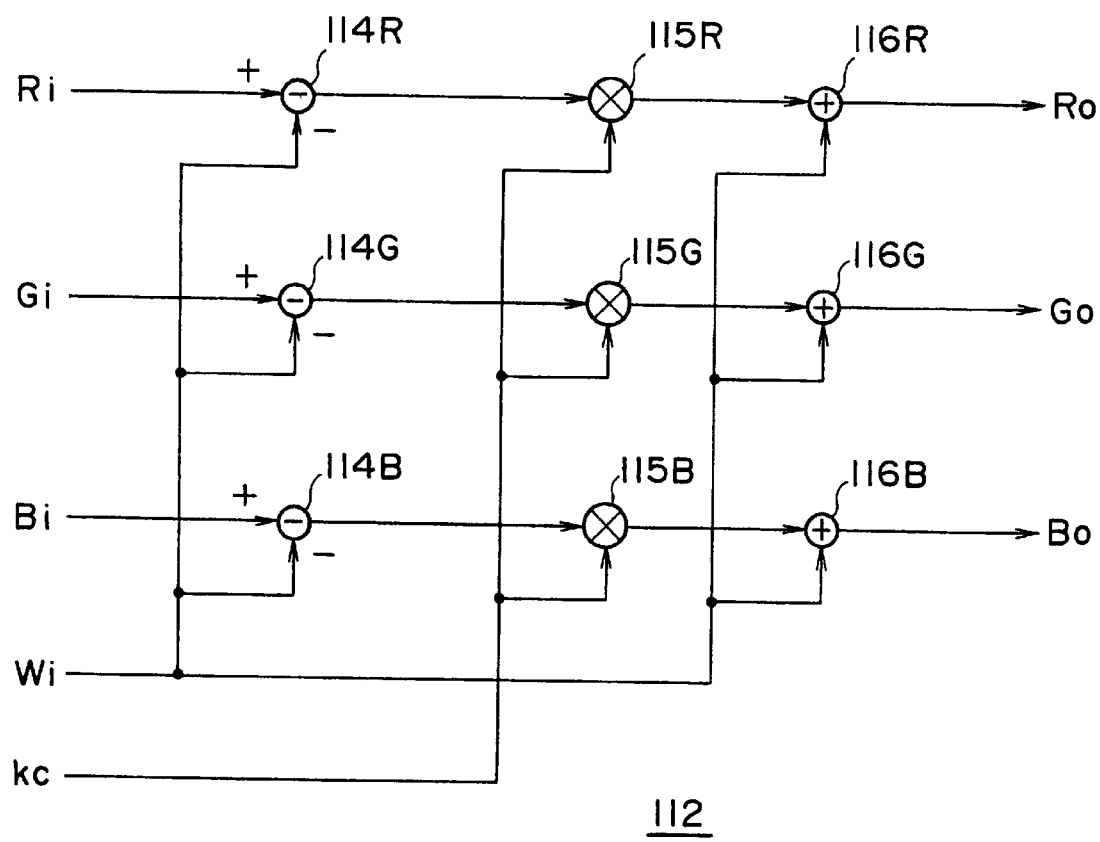
FIG. 4 is a block diagram of a saturation conversion calculator.

Based on expressions (10), (11) and (12), FIG. 4 shows a representative design of the saturation conversion calculator 112 in accordance with the present invention. More specifically, the luminance conversion calculator 112 has subtracters 114R, 114G, 114B for subtracting the input luminance signal Wi from the input stimulus values Ri, Gi, Bi. Multipliers 115R, 115G, 115B multiply the output signals from the subtracters 114R, 114G, 114B by the saturation gain kc. And adders 116R, 116G, 116B add the input luminance signal Wi and the output signals of the multipliers 115R, 115G, 115B to obtain the output stimulus values Ro, Go, Bo.

Continuing with the description of FIG. 1, the adders 117R, 117G, 117B add the black code BC and a pedestal level correction value PED, which are supplied from the microcomputer 125, to the red, green and blue stimulus values R, G, B. Also added to the stimulus values is the contour emphasis signal Dc. It is worth noting that the addition of the black code BC converts the stimulus values R, G, B back to the actual code values with respect to the analog-to-digital conversion. Further, the addition of the pedestal level correction value PED provides the proper adjustment of the red, green and blue values when the iris (not shown) is closed, that is, the adjustment of the black level.

The code values outputted from the adders 117R, 117G, 117B are corrected for non-linearity in gamma correcting circuits 118R, 118G, 118B. Thereafter, the contour emphasis signal Da supplied from the image enhancer 109 is added to the gamma-corrected code values by the adders 119R, 119G, 119B for emphasizing the higher frequency components. Further, clipping circuits 120R, 120G, 120B adjust to a fixed level the red, green and blue signals which are then supplied to a matrix circuit 121. The luminance data, red color difference data and blue color difference data, generated by the matrix circuit 121, are clipped in the clipping circuits 122Y, 122R, 122B to form luminance data DY, red color difference data DCR and blue color difference data DCB.

Figure 5A:
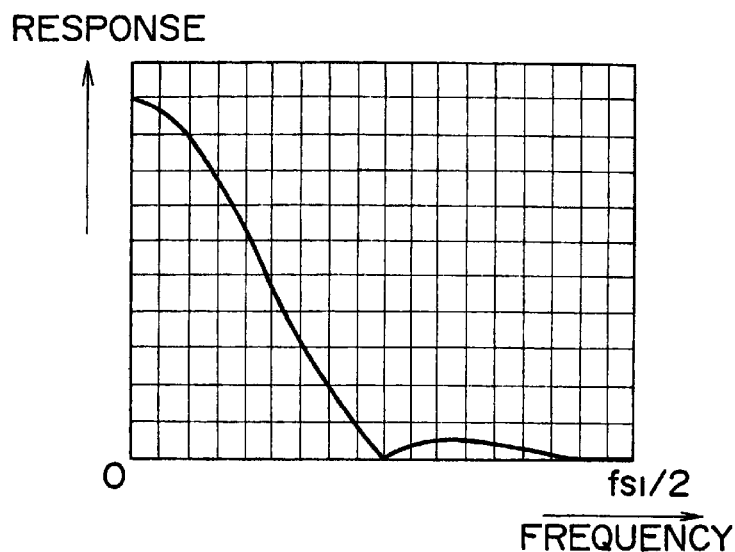
FIG. 5 shows frequency characteristics of a low pass filter (LPF) and an interpolation filter (IPF)
Figure 5B:
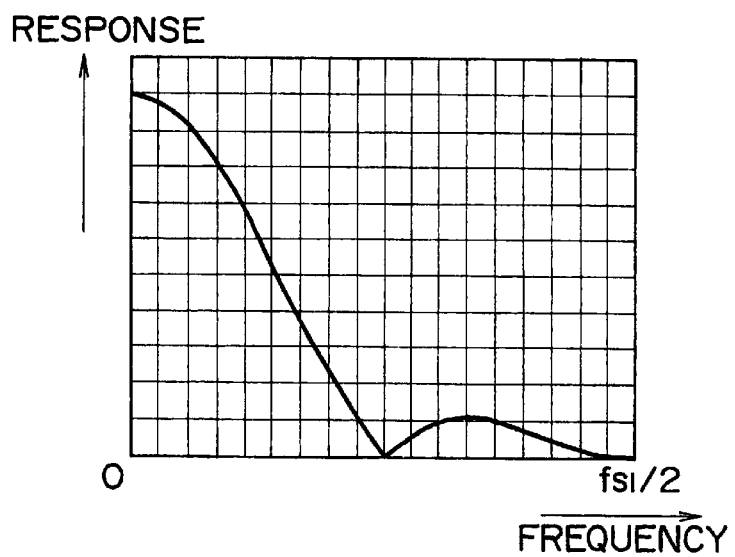
Figure 5C:
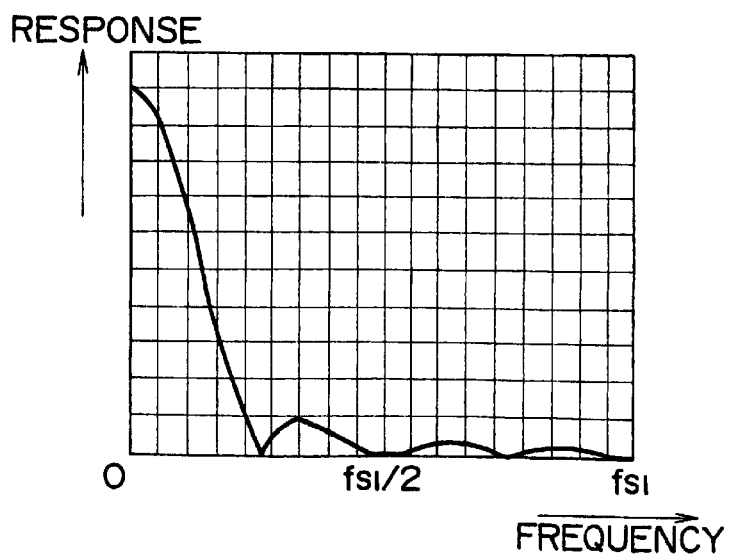

As shown in FIG. 1, low pass filters 123R, 123B limit the bandwidth of the red and blue digital signals, respectively, outputted from the pre-processing circuit 106, while an interpolation filter 123G generates green digital signal retaining in-phase relationship with the red and blue signals. Each of the low pass filters 123R, 123B may include a 12221-type filter having the frequency characteristic of FIG. 5B. The interpolation filter 123G may be a 134431-type filter having a frequency characteristic of FIG. 5A. FIG. 5C shows the overall frequency characteristic of the low pass filters 123R, 123B and the interpolation filter 123G operable on the luminance signal of the pixel-staggered red, green and blue data.

Further shown in FIG. 1 is a controller 124 for providing, among other things, the luminance gain kw, which is used in the luminance conversion calculator 111, and also for providing the input luminance signal Wi and the saturation gain kc, which are used in the saturation conversion calculator 112. According to the present invention, knee compression, DCC plus function, white clipping, flare correction, adaptive gradation conversion with the histogram equalization and so forth are carried out in the luminance conversion calculator 111 and in the saturation conversion calculator 112 based on the luminance gain kw, the input luminance signal Wi and the saturation gain kc. These operations are described in detail below.

(1) The knee compression operation

First, the relationship between the levels of primary color signals R, G, B and the level of luminance signal W will be described, disregarding all of the nonlinear signal processing operations, such as gamma correction, etc. FIG. 6(a) shows exemplary levels representing the gray color, where the level of each primary color signal and the level of the luminance signal W are equal, so that R=G=B=W=1 (see expression (13)).

In general, with respect to a particular color, the levels of the primary color signals R, G, B are distributed substantially around the level of the luminance signal W. For example, in skin-color pixels, the R, G, B signal levels are distributed as shown in FIG. 6(b). Since expression (13) is a first-order equation of the R, G, B variables having positive coefficients whose total sum is 1, at least one of the R, G, B signal levels must be larger than the W signal level, while another primary color signal level (at least one) must be smaller than the W signal level.

When the saturation is reduced by a half (that is, the color is lightened) while the hue is kept unchanged, the level distribution of the primary color signals R, G, B changes as shown in FIG. 6(c). And if the color is further lightened, the level of each primary color signal approaches the level of the luminance signal W, i.e., gray level. Meanwhile, if the iris of the camera is opened wider in the camera state of FIG. 6(b), the level distribution of the primary color signals R, G, B is illustrated in FIG. 6(d). In this case, no change occurs in the hue or saturation components, while the luminance level is increased.

As shown in FIG. 6(d), the R signal level is in excess of a predetermined clip level and is also above the knee point. This signal level fails to comply with the specified conditions of the television signal broadcast standard, so that some appropriate signal processing is necessary for compressing the R signal level. In the conventional camera system, as mentioned above, knee compression is executed for each primary color signal independently of each other to satisfy the specified standard. FIG. 6(e) shows the level distribution of the R, G, B signals obtained by independently executing knee compression in each color signal of FIG. 6(d).

As a result of this knee compression operation, the levels of the primary color signals R, G, B are adjusted to satisfy the specified conditions of the television signal broadcast standard. However, by examining the balance of levels among the R, G, B signals in the distribution of FIG. 6(e), it is apparent that this balance differs from the balance of the R, G, B signal levels of FIG. 6(d). Such variation extends to the hue component as well, and consequently, the flesh color on a reproduced image is rendered more yellow than normal, causing an unnatural (unhealthy) effect on the image.

To alleviate this problem, according to the present invention, the knee compression operation is executed in two stages to bring the excessive level in any of the R, G, B signals within the specified standard without the accompanied change in the hue and/or saturation component. In the first stage, the knee compression operation is executed for the luminance signal if at least one primary color signal level exceeds a predetermined threshold level (hereinafter referred to as a luminance knee operation). And in the second stage, if the compressed level in any of the primary color signals R, G, B is still excessive (that is, above the predetermined threshold level), the saturation is reduced until the highest-level primary color signal is coincident with the threshold level (hereinafter referred to as a saturation knee operation). Hence, such two-stage operation ensures that the color signals are in conformance with the specified signal broadcasting standard.

In the level distribution of the primary color signals of FIG. 7(d), the R signal level exceeds the clip level. FIG. 7(f) shows an improved distribution of the R, G, B signal levels following the luminance knee operation. FIG. 7(g) shows a further improved distribution of the R, G. B signal levels by performing the saturation knee operation.

The detailed description of the luminance and saturation knee operations is as follows.

In the luminance knee operation, the knee compression is carried out for the luminance level in accordance with expression (2). The luminance gain kw is uniquely determined as a function of a preselected knee characteristics (input vs. output luminance signal level curve). Considering that the knee curve with a zero slope corresponds to a clip, a white clipping operation can be similarly performed.

In the saturation knee operation, expressions (10), (11) and (12) are performed on the luminance signal Wi and the red, green and blue stimulus values Ri, Gi, Bi. To determine the saturation gain kc used in the above expression, expression (17) is calculated based on a limit value CM of the primary color signal level and the actual maximum level MAX of the primary color signals.

$$kc = \frac{CM - Wi}{MAX(Ri, Gi, Bi) - Wi} \qquad (17)$$

Hence, due to the luminance and saturation knee operations in the two-stage process as described above, a satisfactory gradation conversion is achieved in the high luminance area without changing the hue component or exceeding the signal threshold level, as illustrated in FIG. 7(g).

Although not described above, the saturation conversion calculator 112 shown in FIG. 4 may be enabled to function as a knee compression calculator when the knee point and the knee slope are input, instead of the luminance signal Wi and the saturation gain kc. Therefore, the conventional knee compression for each individual color signal can be selectively realized as well.

(2) DCC plus function

Even in the high light area, color can be added by raising the chroma level (the color signal following the I, Q matrix is referred to as chroma). According to the DCC plus function, the red, green and blue signals demodulated in the television receiver exceed the prescribed dynamic range, and therefore this mode deviates from the specification of the television signal standard. However, since the DCC plus function has an advantage of providing color even in the high luminance area and raises no practical problems, it is employed as an optional function principally in cameras for commercial use.

Following the gamma correction, the knee compression and white clipping, in order to implement the DCC plus function, it has been customary to apply the knee compression operation to the luminance signal Y obtained by matrixing the I and Q signals, while the knee compression operation is not applied to the color difference signals.

However, because of the color difference signals, there exists the following problem. Although the theoretical color difference signals have the luminance and color information independent of each other, on the practical side these signals are inter-related: the color is affected if the luminance signal is changed. Further, since these signals are formed through the nonlinear processing operations such as gamma correction, the hue is also affected. The changes in the saturation and hue occur for the following reasons.

Let it be assumed that the post-matrix signals (Y, R-Y, B-Y) are linear signals not processed for the gamma correction or other non-linear operations. The theoretical signals (Y, R-Y/Y, B-Y/Y) represent the luminance and the color independently. Meanwhile, the signals (Y, R-Y, B-Y) are in such a form that Y affects the color such that the color values (R-Y, B-Y) are varied even if the luminance alone is changed while keeping the color (hue, saturation) the same. The reason for implementing signals as above (Y, R-Y, B-Y) is due to the fact that division is necessary for obtaining the signals (Y, R-Y/Y, B-Y/Y), and an adequate circuit configuration to meet the above division requirement is not readily achievable.

For the purpose of realizing the DCC plus function, if knee compression is applied only to the luminance signal Y alone out of the post-matrix signals (Y, R-Y, B-Y) while the color difference signals R-Y and B-Y are left unchanged, the actual color (R-Y/Y, B-Y/Y) is so varied that merely the denominator is reduced. Hence, the saturation is increased more than the actual color to consequently render the image unnatural. It is therefore impossible in such a process to lower the knee point sufficiently. And since this process is executed in a practical manner after the nonlinear processes such as the gamma correction, the hue is also affected in addition to the saturation.

In the embodiment according to the present invention, the channel level limit value CM in expression (17) is set to be higher (for example, 110% of the reference white level) while the luminance signal W is kept to a value lower than 110%. In this case, any excessive channel level of R, G, B is realized by permitting the limit value CM to be the maximum primary color signal level. Hence, according to the present invention, the DCC plus function is realized by executing the above-described knee compression process with a different threshold level, whereby the hue is retained and the saturation is automatically adjusted for achieving the highest possible fidelity relative to the original image within this predetermined range.

In the level distribution of the R, G, B signal of FIG. 8(d), the R-channel level exceeds the clip level, as in the previous case of FIG. 7(d). FIG. 8(f) shows the improved level distribution of the R, G, B signals obtained by executing the luminance knee operation. And FIG. 8(h) shows the improved level distribution of the R, G, B signals obtained by executing the saturation knee operation while setting the channel level limit value CM to be higher than the clip level. As shown in FIG. 8(h), the color can be obtained in the high luminance area by raising the channel level limit value CM above the clip level while leaving the limit of the luminance signal level unchanged.

(3) White clipping

In the prior art, the white clipping operation is performed with respect to each channel level of the signals R, G, B independently. Consequently, if the level of any primary color signal reaches the clip level, the relevant channel is clipped individually without any consideration to the level balance of the R, G, B signals. As a result, the hue of the color signal changes.

In the present invention, as already described in connection with the knee compression, the white clipping operation is performed with respect to the luminance signal, and then any excessive level of the individual primary color signals is corrected through the saturation knee process. The satisfactory white clipping operation is attained without affecting the hue component.

Meanwhile, if the luminance white clip is set to 100%, for example, and the channel level limit value CM to 109%, a difference of 9% therebetween can be used for adding color to the high luminance area. Consequently, the aforementioned DCC plus function is realized without deviation from the specified television signal standard. And it becomes possible to allocate the limited dynamic range to the gradation and the color operations.

(4) Flare correction

It is known in the art that flare correction is performed by reducing the pedestal level. The color is affected as follows.

Let it be assumed that certain pixels (Ri, Gi, Pi) have been turned to (Ro, Go, Bo) via the addition of a pedestal level. Then, expressions (18) to (22) are obtained, where Wi denotes the luminance based on the stimulus values Ri, Gi, Bi; and Wo denotes the luminance based on the stimulus values Ro, Go, Po.

$$Wi = 0.30Ri + 0.59Gi + 0.11Bi \tag{18}$$

$$Ro = Ri + a \tag{19}$$

$$Go = Gi + a \tag{20}$$

$$Bo = Bi + a \tag{21}$$

$$\begin{aligned} Wo &= 0.30(Ri + a) + 0.59(Gi + a) + 0.11(Bi + a) \\ &= 0.30Ri + 0.59Gi + 0.11Bi + a \\ &= Wi + a \end{aligned} \tag{22}$$

The saturation SATi before addition of the pedestal is represented by expression (23), and the saturation SATo after addition of the pedestal is represented by expression (24).

$$SATi^2 = \left(\frac{Ri - Wi}{Wi}\right)^2 + \left(\frac{Bi - Wi}{Wi}\right)^2 \tag{23}$$

$$\begin{aligned} SATo^2 &= \left(\frac{Ro - Wo}{Wo}\right)^2 + \left(\frac{Bo - Wo}{Wo}\right)^2 \\ &= \left(\frac{Ri - Wi}{Wo}\right)^2 + \left(\frac{Bi - Wi}{Wo}\right)^2 \end{aligned} \tag{24}$$

Setting Wo/Wi=k in the above, expression (24) is rewritten as expression (25).

$$SATo^2 = \frac{1}{k^2}\left(\frac{Ri-Wi}{Wi}\right)^2 + \frac{1}{k^2}\left(\frac{Bi-Wi}{Wi}\right)^2 \quad (25)$$

$$= \frac{1}{k^2}SATi^2$$

Since SATo>0 and SATi>0, it follows that SATo=SATi/k. Consequently, the saturation is multiplied by Wi/(Wi+a) due to the addition of the pedestal. More specifically, the increase of the pedestal level decreases the chroma level, whereas the decrease of the pedestal level increases the chroma level.

Meanwhile, the hue HUEi before addition of the pedestal level is represented by expression (26) and the hue HUEo after the addition of the pedestal level is represented by expression (27). Therefore, the hue is maintained at the same level even if the pedestal level is added.

$$HUEi = \tan\frac{\frac{Bi-Wi}{Wi}}{\frac{Ri-Wi}{Wi}} \quad (26)$$

$$= \tan Bi - \frac{Wi}{Ri-Wi}$$

$$HUEo = \tan\frac{\frac{Bo-Wo}{Wo}}{\frac{Ro-Wo}{Wo}} \quad (27)$$

$$= \tan Bi - \frac{Wi}{Ri-Wi}$$

Thus, when the flare correction is performed using the pedestal level, the saturation is increased more than the actual value, although the hue can be retained.

In view of the above problem, the present invention provides the satisfactory flare correction, without affecting the color, as follows. By reducing, in expression (2), the luminance gain kw in any gradation region where black floating (flare) is induced, the flare correction is achieved. When an adaptive gradation conversion is executed with the histogram equalization, this operation is performed automatically to attain the desired correction in accordance with the generation of flare, as described below.

(5) Adaptive gradation conversion with histogram equalization

For containing an extensive dynamic range of natural light within the specified range of the television signal standard, a technique of compressing the high luminance region by knee compression and a technique of correcting the black floating induced by the generation of flare are carried out, as mentioned above. In accordance with another aspect of the present invention, further effective compression is executed by compressing, with priority, any gradation region not being currently used for the present image.

Let it be assumed that gradation regions, each having a broad area, are currently being used. The appearance frequencies (occurrence) of luminance regions in the picture are detected, and the luminance regions of the low appearance frequencies (low occurrence) are compressed while the luminance regions of the high appearance frequencies (high occurrence) are expanded. Hence, it is rendered possible to realize such a compression that more gradations can be allocated to the luminance regions actually present in the picture.

Due to the above operations, the following effects are achievable. For example, when the histogram is sorted into bright regions and dark regions, as in a case where an indoor scene and an outdoor scene coexist or when dark spots and bright spots are present in the same picture, it has been unavoidable in the prior art for the dark regions to be confused (known as black confusion), while the bright regions are blurred at excessive levels (known as white blur). In contrast, the technique according to the present invention enables both dark and bright regions to be reproduced properly. Upon occurrence of the black floating with the generation of flare, since the black region histogram is low in appearance, this region is compressed and adjusted automatically to an improved picture quality with sufficient differentiation. And when lighting condition is satisfactory, a sharp picture can be obtained due to the process of allocating a greater number of gradations.

Referring now to FIGS. 9 and 10, a description will be given on such adaptive gradation conversion executed with the histogram equalization.

Figure 9A:
FIG. 9 shows diagrams illustrating an adaptive gradation conversion with the histogram equalization.

Appearance frequencies (in terms of pixels) are represented graphically in a form of a histogram with rectangular bars, wherein the luminance and the number of pixels are plotted along the abscissa and the ordinate, respectively. The largest number of gradations need to be allocated to the highest value region. FIG. 9(a) shows an exemplary histogram in which lighting conditions are relatively good. Any luminance region of the high histogram value can be expressed with more gradations by providing a differential gain proportional to the histogram. That is, if the integral of the histogram is used as an amplitude transfer characteristic, the differential gain is rendered proportional to the histogram.

Figure 9B:
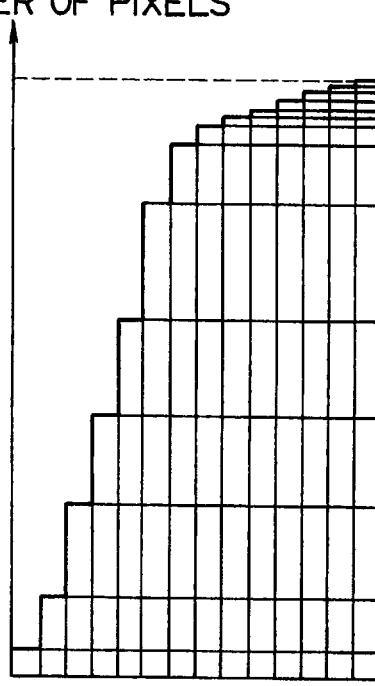

By integrating the appearance frequencies obtained along the abscissa, a cumulative frequency distribution is obtained. The integral of the pixels in all of the intervals, i.e., the right shoulder of the cumulative frequency distribution, is always equal to the total number of pixels and is therefore constant. Since the histogram value is not rendered negative, the curve is always a monotonously increasing one. FIG. 9(b) shows the cumulative frequency distribution corresponding to the histogram of FIG. 9(a). In this case, the cumulative frequency distribution is an accumulation of histogram values.

The complete histogram equalization is achieved by performing luminance conversion with the cumulative frequency distribution curve employed as an amplitude transfer characteristic. More specifically, the histogram of the processed image becomes substantially flat. Although the histogram equalization is executed in a stage following the binary coding in an FA (factory automation) sensor camera or the like, it is not preferred in most cases due to the excessive emphasis on the audio-visual image. For this reason, there is a procedure for adjusting the efficiency for applying the histogram equalization.

Figure 9C:
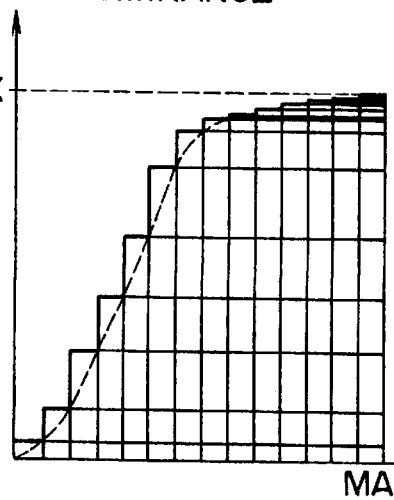

First, a technique of using a cumulative frequency distribution as the amplitude transfer characteristic is described. As mentioned above, the right shoulder of the cumulative frequency distribution is equal to the total number of pixels (total number of points used to plot the histogram). This value is normalized to equal the maximum value of the video signal codes. A constant for such normalization is determined as the video maximum code divided by the total number of pixels. In the example of the video signal represented by 12 bits and the histogram plotted with reference to 188928 pixels, normalization is executed by multiplying the total cumulative frequency distribution by the normalizing constant of 4095/188928 to consequently form the amplitude transfer characteristic curve. FIG. 9(c) shows the amplitude transfer characteristic obtained by normalizing the cumulative frequency distribution of FIG. 9(b). A broken line in FIG. 9(c) denotes an amplitude transfer characteristic in the histogram equalization.

Figure 10D:
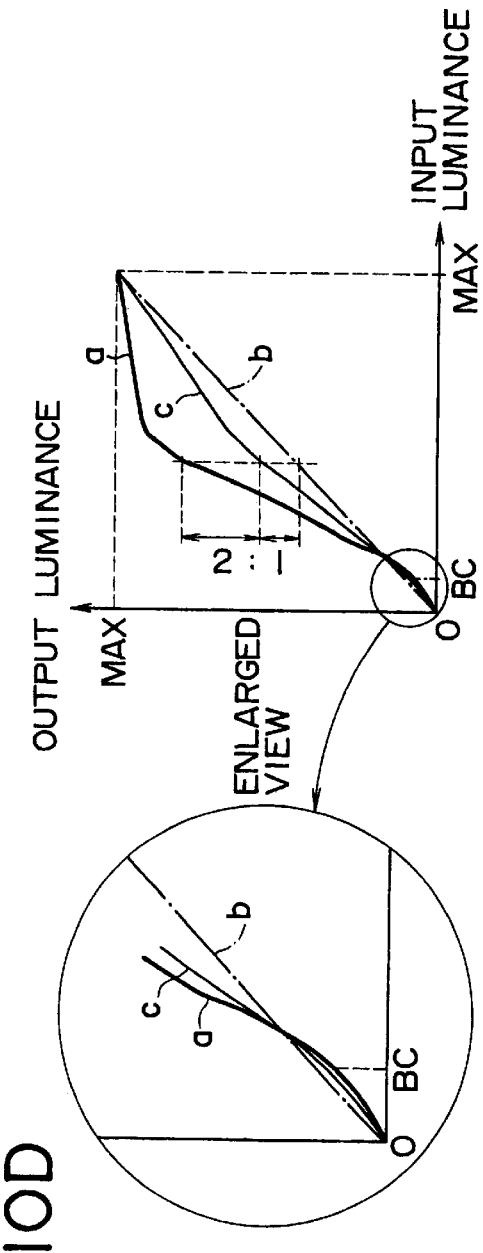
FIG. 10 shows diagrams illustrating an adaptive gradation conversion with the histogram equalization.

Next, the application efficiency of the histogram equalization is adjusted. As shown in FIG. 10(d), the efficiency can be adjusted by specifying a ratio between the histogram equalization (solid line a) and the histogram non-equalization (one-dot chained line b). A solid line c in FIG. 10(d) denotes an amplitude transfer characteristic obtained by reducing the efficiency factor to one third.

The operation of the histogram equalization relates to the input video signal code. As shown in FIG. 10(d), the black code EC is affected by this process. Hence, the luminance conversion in accordance with expression (2) must be performed on the luminance stimulus value, not on the video signal code, to insure the consistency of the black code. For this reason, the process of maintaining the black code is executed by subtracting, from the video signal code, a black code offset $B_{OF}$ in the stage following the adjustment of the histogram equalization in FIG. 10(d). The solid line c in FIG. 10(e) is the same as the solid line c in FIG. 10(d), and the broken line d in FIG. 10(e) denotes the amplitude transfer characteristic after the subtraction of the black code offset $B_{OF}$.

Thus, it is possible to achieve the practical histogram equalization for audio-visual use. The process executed up to this stage is sufficient to meet the requirements for conforming the input signal with the television broadcast standard. However, in the case of a signal within the camera (that is, so-called intra-camera signals), when knee compression is to be performed thereafter, the priority of the high luminance region for the knee compression operation has been lowered. Accordingly, all of the code-assigned regions relative to the intra-camera signals have the same priority. In the histogram of FIG. 9(a) for example, the lighting condition seems, to be good and the histogram values concentrate in the normal light range. In this case, according to the amplitude transfer characteristic denoted by a broken line in FIG. 9(c) after the process of the histogram equalization, it is attempted to attain effective utilization of the code regions by extending the histogram values, which concentrate in the normal range, to the entire signal code regions. However, since the priority of the high luminance region is lowered as mentioned above, immediate execution of the histogram equalization in this state causes the knee compression operation of the satisfactory image obtained under the good lighting condition. In other words, with respect to the intra-camera signals, it is not in the best interest to make such an adjustment as to use the entire signal code region.

Regarding the signal in this example, an improvement of the image quality coinciding with the intention of a camera operator can be attained by executing the histogram equalization while maintaining the peak value of the present brightness.

Figure 10F:
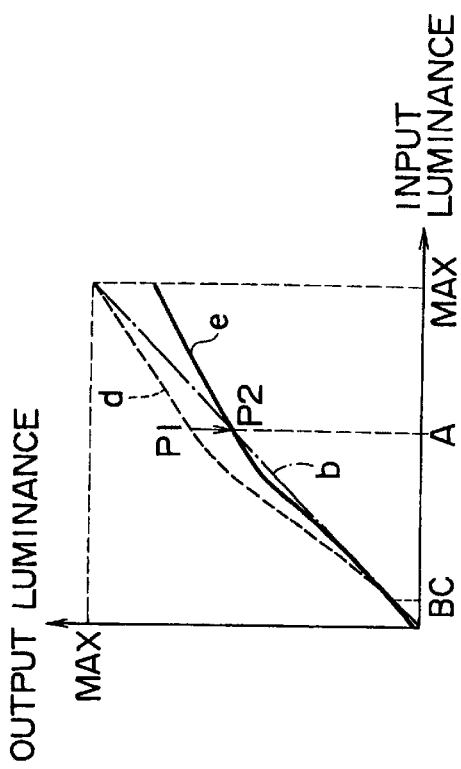
Figure 10E:
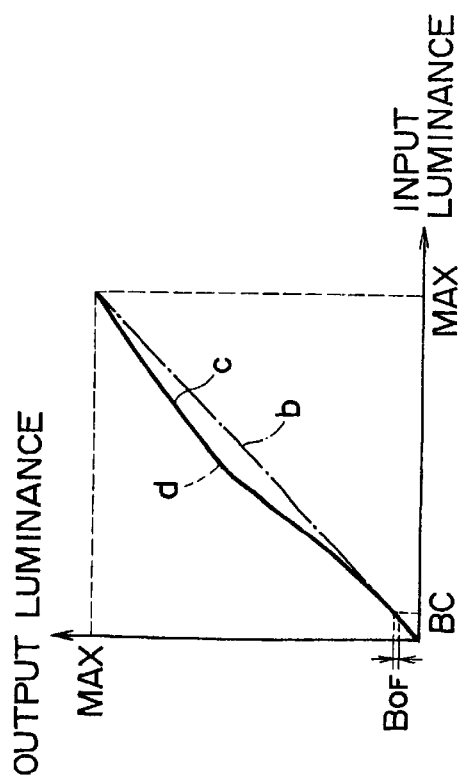

In order to accomplish the above improvement, the level of the input luminance A is held constant by the conversion, as shown in FIG. 10(f). Consequently, the luminance that may otherwise be knee-compressed against the camera operator's intention due to the immediate conversion to the level p1 can be held at the level p2, which corresponds to the desired luminance level intended by the camera operator.

In particular, the following two processes (1) and (2) are executed. That is, the process of calculating the conversion gain p2/p1 for converting the level of the input luminance A to p2; and the process of multiplying the amplitude transfer characteristic, which is obtained in FIG. 10(e), by the conversion gain thus calculated. However, if a multiplication of the signal code by the conversion gain is executed immediately, a variation is caused again in the black code retained in the aforementioned black code holding process. Therefore, in this peak holding process, conversion must be performed on the luminance stimulus value. For this purpose, expression (28) is carried out, where Win is the input luminance, Wout is the output luminance, kwh is the conversion gain, and BC is the black code.

$$Wout=(Win-BC)*kwh+BC \qquad (28)$$

By observing the amplitude transfer characteristic obtained after the peak holding process and denoted by a solid line e in FIG. 10(f), despite some restrictions given for retention of the luminance by this holding process, gradations conforming with the histogram are distributed again.

In any region brighter than the input luminance A, the differential gain tends to decrease in accordance with the amplitude transfer characteristic obtained after the black code holding process and denoted by a broken line d in FIG. 10(e). However, as obvious from the histogram of FIG. 9(a) where the high luminance region is less important in this image, such decrease is adequate.

Upon completion of the peak holding process as mentioned above, a series of histogram equalization operations for the camera is terminated to consequently attain the amplitude transfer characteristic denoted by a solid line e in FIG. 10(f). In this embodiment, the luminance conversion according to expression (2) is executed by using the amplitude transfer characteristic of the luminance gain kw, whereby the adaptive gradation conversion is realized with histogram equalization.

(6) Manual control of saturation

In expression (17), kc is the saturation gain for regulating the channel level when it has exceeded a specified value. Meanwhile, kc in expression (9) is the gain for adjusting the saturation in a broader sense. More specifically, when kc is set to 1.0, the saturation remains unchanged, but if kc is changed to 1.2, the color is rendered slightly deeper. And if kc is changed to 0.8, the color is rendered somewhat lighter. In this manner, a user is enabled, by selectively setting the saturation gain, to adjust the color freely based on the circumstances.

Therefore, according to this aspect of the present invention, in the saturation knee mode, priority is given to an operation of regulating the saturation, and in any other mode, the color chromaticity can be adjusted in accordance with the saturation gain set by the operator. In order to realize the above, a minimum value is selected from kc in expression (17), designated as kcn for adjustment of the saturation.

Figure 11A:
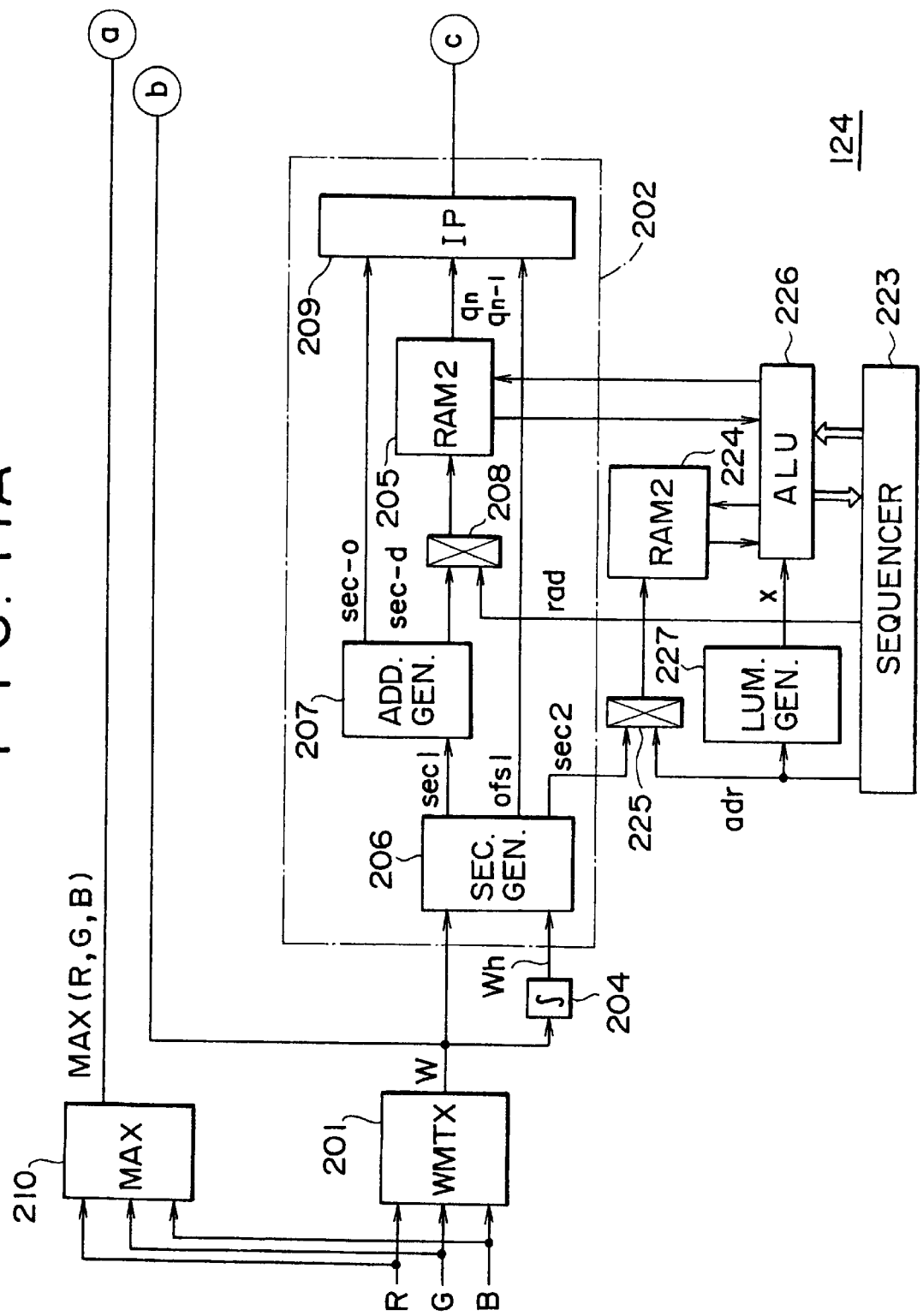
FIG. 11 is a block diagram of a controller.

Next, a detailed circuit configuration of the controller 124 is shown in FIG. 11.

The controller 124 has a matrix circuit 201 for calculating the luminance signal W according to expression (13) from the red, green and blue data R, G, B outputted from filters 123R, 123G, 123B; a luminance gain generator 202 for generating the luminance gain kw1 which corresponds to the luminance signal W outputted from the matrix circuit 201; an up-converter 203 for obtaining the luminance gain kw having the 2fs1 rate by up-converting the luminance gain kw1 having the fs1 rate outputted from the luminance gain generator 202; and a pixel averaging circuit 204 for obtaining the luminance signal Wh, which is required for plotting a histogram, by averaging the luminance signal W of every four or eight pixels outputted from the matrix circuit 201.

The luminance gain generator 202 has a RAM (random access memory) 205 where the luminance gain data corresponding to the respective divided sections is stored. According to the present invention, a luminance range (e.g., hexadecimal 000–3FF) is divided into 61 sections from 0 to 60 as shown in FIG. 12, and the RAM 205 contains a table where the luminance gain data of these 61 sections is stored. The 61 sections are grouped into three regions I, II and III as shown in FIG. 12, where the fineness values of the sections in the three regions are set to be mutually exclusive. For example, each of the sections 0–15 in the region I is set to 4/step, each of the sections 16–47 in the region II is set to 16/step, and each of the sections 48–60 in the region III is set to 32/step. It is understood that the number of the sections and the fineness thereof are not limited to the above examples.

The luminance gain generator 202 has a section generator 206 and an address generator 207. The section generator 206 produces, on the basis of the luminance signal W outputted from the matrix circuit 201, the section data sec-1 indicative of one of the 61 sections corresponding to the luminance signal W, and also produces the offset data ofs1 indicative of the position in the relevant section. The section generator 206 further produces, on the basis of the luminance signal Wh outputted from the pixel averaging circuit 204, the section data sec-2 indicative of one of the 61 sections corresponding to the luminance signal Wh. The address generator 207 produces, on the basis of the section data sec-1, the read address data sec-d which successively signifies the section indicated by the section data sec-1 and the preceding section. In this case, when the section data sec-1 indicates the section 0, the address generator 207 also produces section data sec-0 which signifies that the luminance signal W is in the section 0.

The luminance gain generator 202 further has a switch circuit 208 for selecting either the read address data sec-d or read address data rad and then for supplying the selected data to the RAM 205; and an interpolation calculator 209 for obtaining a luminance gain kw1, which corresponds to the luminance signal W, by interpolation using the luminance gain data qn, qn−1 read from the RAM 205 in response to the read address data sec-d and also by using the offset data ofs1 outputted from the section generator 206.

Figure 13:
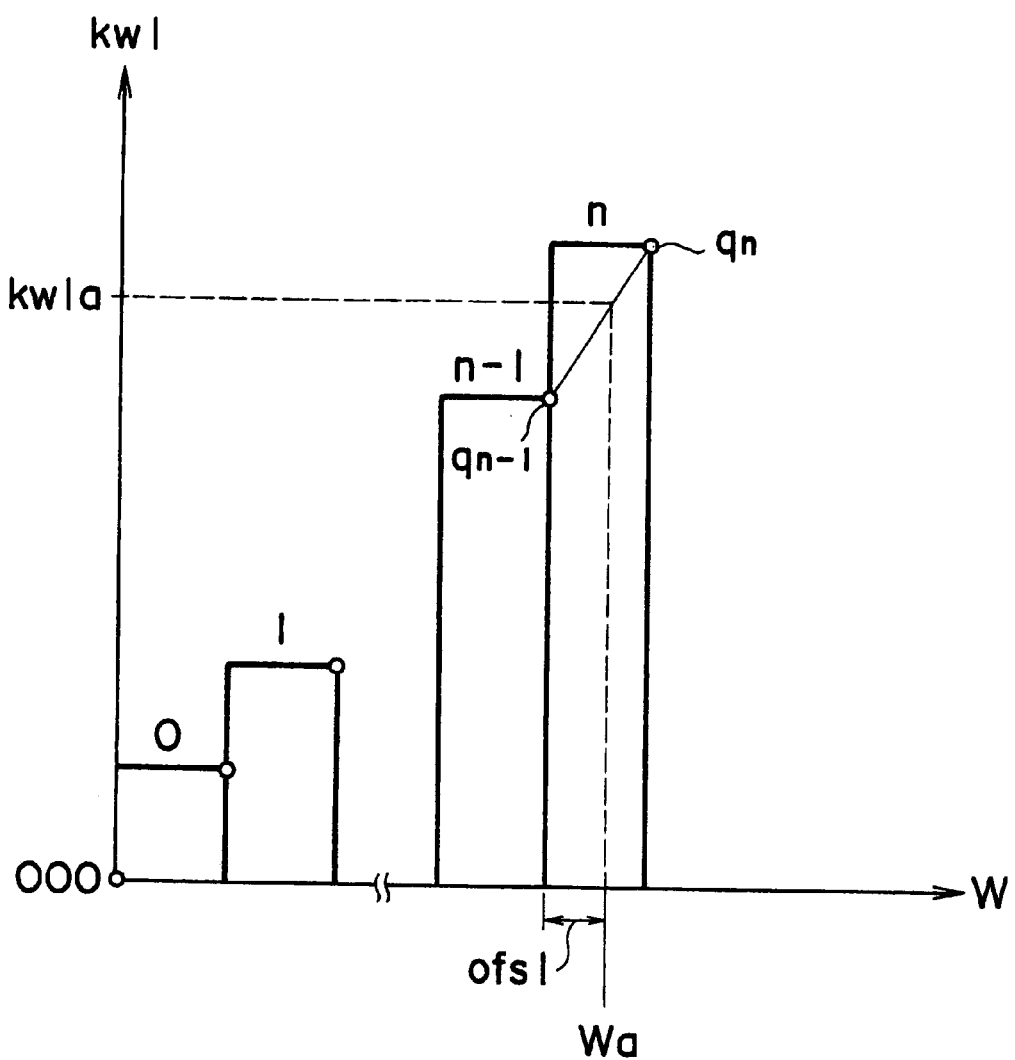
FIG. 13 is a diagram illustrating an interpolation calculation to obtain the luminance gain kw1.

The interpolation calculations executed in the interpolation calculator 209 will be described below with reference to FIG. 13. When the luminance signal W outputted from the matrix circuit 201 is Wa and corresponds to a section n, gain data qn and qn−1 of the sections n and n−1 are outputted on the basis of the data sec-d outputted from the address generator 207. Let it be assumed that the section n is set to m/step, and a calculation of expression (29) is executed. In the interpolation calculator 209, qn is used when n=0, as the gain data qn−1 in expression (29) according to the data sec-0 of the section 0 outputted from the address generator 207.

$$kwla = q_{n-1} + \frac{(q_n - q_n - 1) \cdot ofs1}{m} \quad (29)$$

The controller 124 further has a maximum value circuit 210 for extracting the maximum data MAX(R,G,B) from the red, green and blue color data R, G, B outputted from the filters 123R, 123G, 123B; and a luminance gain multiplier 211 for converting the data MAX(R,G,B), extracted by the maximum value circuit 210, and the luminance signal W, outputted from the matrix circuit 201, into values corresponding to the stimulus values, and then multiplying the converted values by the luminance gain kw1 outputted from the luminance gain generator 202.

The luminance gain multiplier 211 has a switch circuit 212 for selectively providing either the data MAX(R,G,B) or the luminance signal W; a subtracter 213 for subtracting a black code BC from the output data of the switch circuit 212 thereby changing the data to a stimulus value; a multiplier 214 for multiplying the output data of the subtracter 213 by the luminance gain kw1; and a switch circuit 215 for providing, from the output data of the multiplier 214, either data MAX' obtained through multiplication of the maximum of the red, green and blue stimulus values by the gain kw1, or data W' obtained through multiplication of the luminance signal W by the gain kw1.

In this case, the switch circuits 212 and 215 in the luminance gain multiplier 211 are changed cyclically every ½ pixel period, so that the data MAX(R,G,B) and the luminance signal W are processed sequentially on a pixel-by-pixel basis. As a result, merely a single multiplier is sufficient to meet the requirements, thereby realizing the circuit reduction. Control of the switch circuits 212 and 215 or of the other switch circuits is performed by a sequencer 223.

The controller 124 further has a saturation gain generator 216 for obtaining a saturation gain according to expression (17) from the data MAX' and W' outputted from the luminance gain multiplier 211. This saturation gain generator 216 has a subtracter 217 for subtracting MAX' from W'; a subtracter 218 for subtracting W' from the channel level limit value CM supplied by the microcomputer 125; a divider 219 for dividing the output data of the subtracter 218 by the output data of the subtracter 217; and a minimum value circuit 220 for selecting the smaller one from the saturation gain kc1 outputted from the divider 219 and the saturation gain kcn set by the user.

Since expression (17) includes a division operation, there exists a single prohibited point. This point is generated when MAX'=W', i.e., when the pixel is colorless. The divider 219 in the saturation gain generator 216 eliminates it in the following manner. When MAX'=W', the process is executed to make kc1=kcn if MAX'<CM; or kc1=1.00 if MAX'=CM; or kc1=0.00 if MAX'>CM.

The controller 124 further has an up-converter 221 for obtaining the saturation gain kc at the 2fs1 rate by up-converting the saturation gain at the fs1 rate outputted from the saturation gain generator 216; and an up-converter 222 for obtaining the luminance Wi at the 2fs1 rate by up-converting the luminance W' at the fs1 rate outputted from the luminance gain multiplier 211.

The controller 124 further has a sequencer 223 for managing an operation of writing the luminance gain data into the RAM 205 to produce a table; a RAM 224 used in producing the table; a switch circuit 225 for selectively extracting either the section data sec2 outputted from the section generator 206 or the address data adr outputted from the sequencer and then supplying the extracted data to the RAM 224; an arithmetic-logic unit (ALU) 226 also used in producing the table; and a luminance data generator 227 for generating luminance data x from the output address data adr of the sequencer 223 and then supplying the luminance data x to the ALU 226.

Next, the operation of the controller 124 will be described.

Figure 14A:
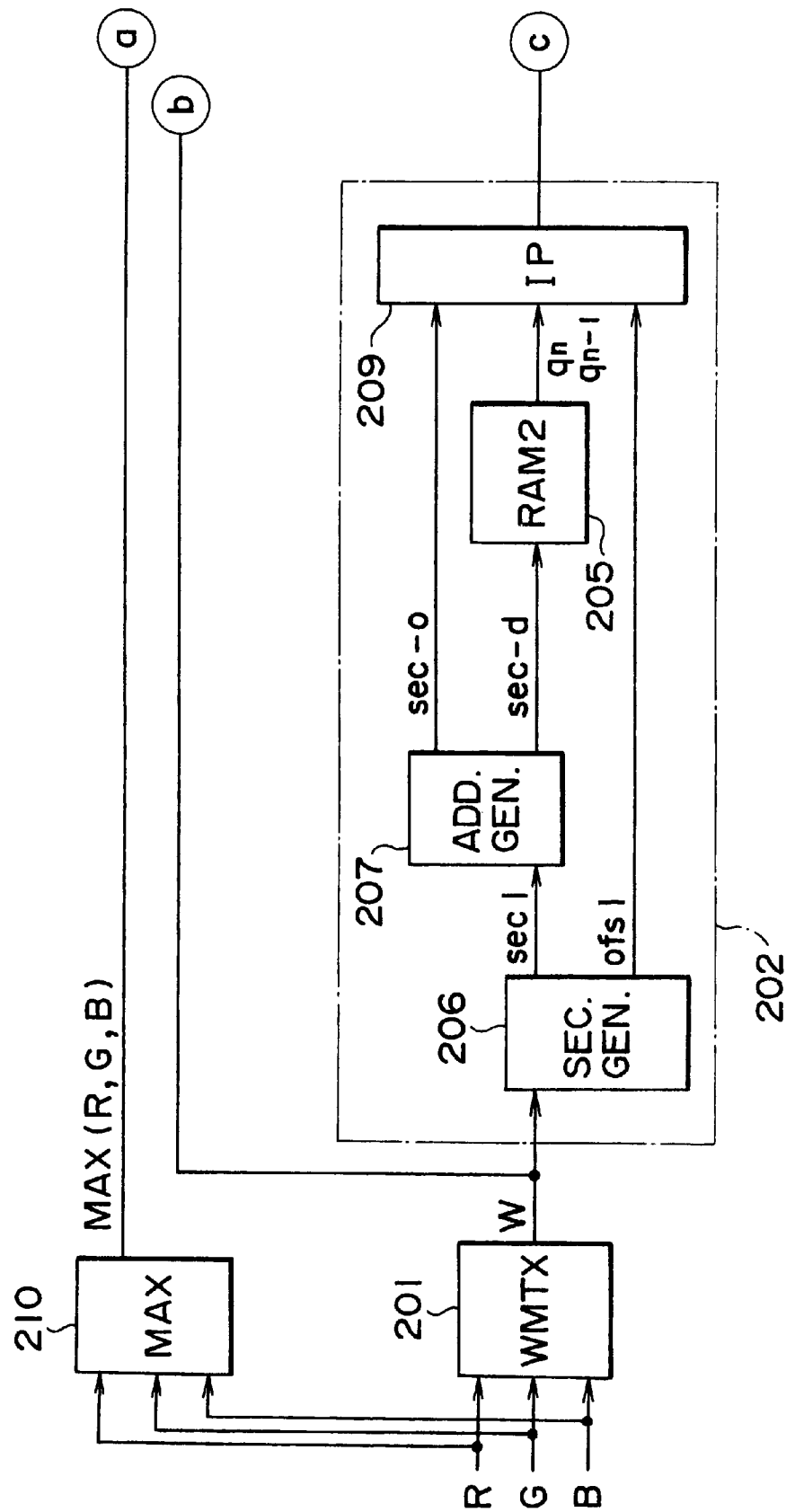
FIG. 14 is a block diagram of circuits employed in a controller for obtaining a luminance gain kw, a saturation gain kc and a luminance Wi.

First, the controller operation for obtaining the luminance gain kw used in the luminance conversion calculator 111, and the saturation gain kc and the luminance signal Wi used in the saturation conversion calculator 112 will be described. FIG. 14 shows excerpted components of the controller 124 for obtaining kw, kc and Wi.

The operation for obtaining the luminance gain kw is performed as follows. The red, green and blue color data R, G, B outputted respectively from the filters 123R, 123G, 123B (FIG. 1) are supplied to the matrix circuit 201, and the luminance W is calculated per pixel. The luminance W of each pixel is supplied to the section generator 206 in the luminance gain generator 202. Then the section generator 206 outputs, per pixel, section data sec1 indicative of the section to which the luminance W belongs, and also offset data ofs1 indicative of the position of the luminance W in the relevant section.

The data sec-d, which successively indicate the section of the luminance W and the preceding section, is outputted from the address generator 207 in accordance with the section data sec1 outputted per pixel from the section generator 206, and such data sec-d is supplied as read address data to the RAM 205. Therefore, the luminance gain data qn and qn−1 corresponding, respectively, to the section of the luminance W and the preceding section are read out from the RAM2 per pixel. In the interpolation calculator 209, the interpolation operation is executed (according to expression (29)) per pixel by using the gain data qn, qn−1 supplied from the RAM 205 and the offset data ofs1 supplied from the section generator 206. A luminance gain kw1 is thus obtained. Thereafter the obtained luminance gain kw1 is converted by the up-converter 203 into the luminance gain kw at the 2fs1 rate to be used in the luminance conversion calculator 111.

The operation for obtaining the saturation gain kc and the luminance Wi is performed in the following manner. The red, green and blue color data R, G, B outputted, respectively, from the filters 123R, 123G, 123B per pixel are supplied to the maximum value circuit 210, where the maximum data MAX(R,G,B) is extracted. The extracted data MAX(R,G,B) is supplied to the luminance gain multiplier 211, where the black code BC is subtracted therefrom and the result is converted into a stimulus value. The stimulus value is then multiplied by the luminance gain kw1 outputted from the luminance gain generator 202 to become data MAX'. Meanwhile, the luminance W outputted per pixel from the matrix circuit 201 is supplied to the luminance gain multiplier 211, where the black code BC is subtracted therefrom and the result is converted into a stimulus value. The stimulus value is then multiplied by the luminance gain kw1 outputted from the luminance gain generator 202 to result into data W'.

The data MAX' and W' outputted per pixel from the luminance gain multiplier 211 are supplied to the saturation gain generator 216, where a saturation gain kc1 is calculated per pixel (according to expression (17)) by using the data MAX', W' and the channel level limit value CM. Further in the saturation gain generator 216, the smaller value of the saturation gain kc1 and of the saturation gain kcn set by the user is selectively extracted, per pixel, by the minimum value circuit 220. And the saturation gain outputted per pixel from the saturation gain generator 216 is converted by the up-converter 221 into a saturation gain kc of the 2fs1 rate to be used in the saturation conversion calculator 112.

The data W' outputted per pixel from the luminance gain multiplier 211 is converted by the up-converter 222 into a luminance Wi at the 2fs1 rate to be used in the saturation conversion calculator 112.

Figure 15:
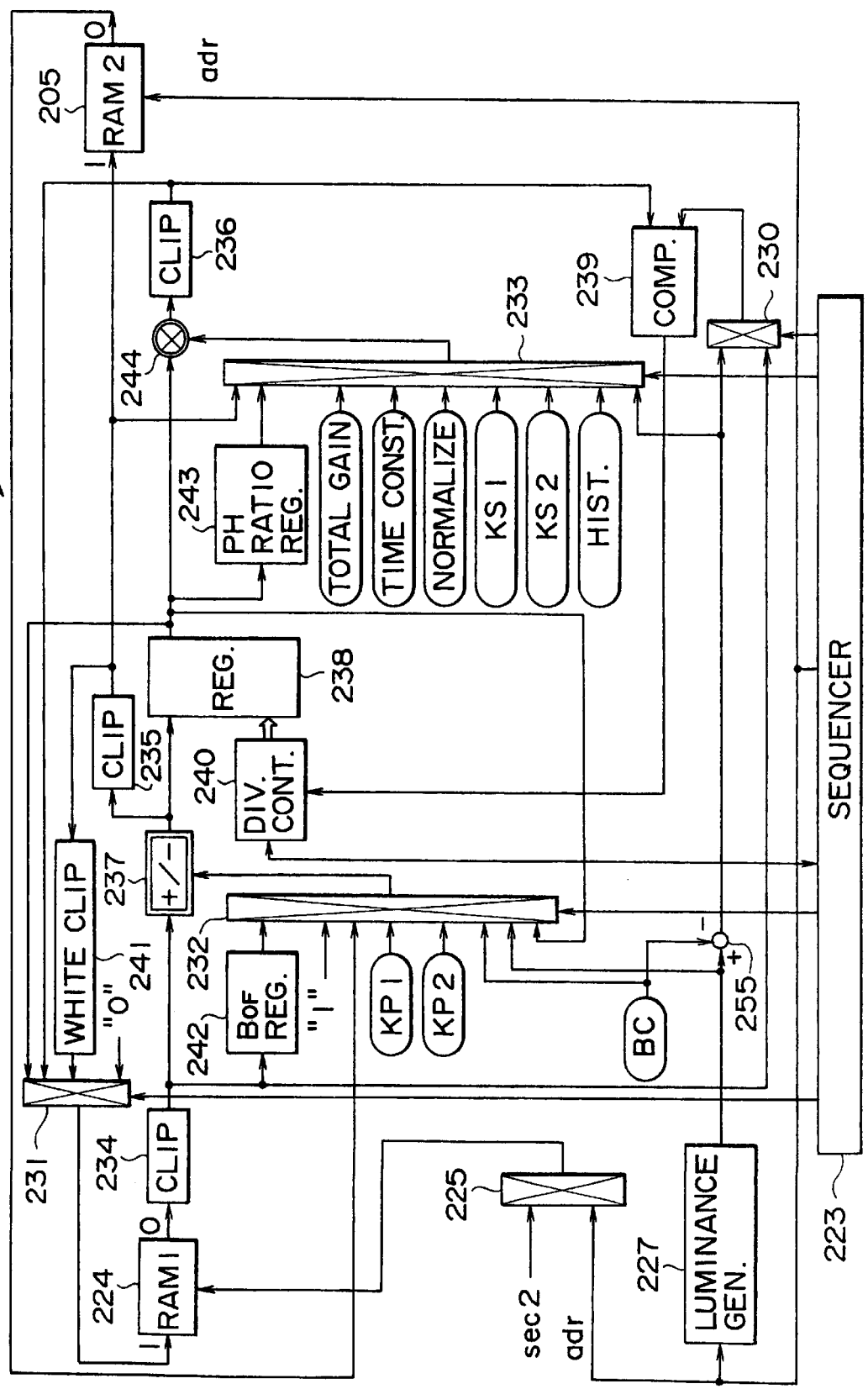
FIG. 15 is a block diagram of circuits employed in the controller for preparing a sequencing table.

Next, the operation to prepare a table by writing in the RAM 205 the luminance gain data corresponding to the 61 sections as mentioned above is explained in detail. FIG. 15 shows excerpted components of the controller 124 related to the preparation of the table. The ALU 226 is constituted by those circuits shown in FIG. 15, except the RAM 205, the sequencer 223, the RAM 224, the switch circuit 225 and the luminance data generator 227. In particular, the ALU 226 has switch circuits 230–233; clip circuits 234–236 for clipping any overflow caused in the calculation; an adder/subtracter 237 serving as an adder or a subtracter; a register 238; a division controller 240; a white clip circuit 241; a black code offset register 242 for temporarily storing a black code offset $B_{OF}$; a peak holding ratio register 243 for temporarily storing a peak hold ratio; a multiplier 244; and a subtracter 245.

The RAM 224 functions as a work RAM. As will be described later, each effective pixel period is taken as a histogram in the RAM 224, and during a vertical blanking interval, the RAM 224 is used for temporary storage of the data being calculated.

The operation for preparing the table is managed by the sequencer 223 and is performed sequentially in the order of steps 0–15 shown in FIG. 16. The sequencer 223 is at step 0 during the effective pixel period, and the external circuits are preparing a histogram at this time.

Upon advance to the vertical blanking interval, the sequencer 223 proceeds to step 1 where sequences 0–7 are repeated while addresses are changed from 0 to 60, and subsequently steps 2–15 are executed in the same manner to prepare a sequencing table. In this operation, sequences 0–7 are executed successively at the fs1 rate (horizontal driving frequency of image sensors 103R, 103G, 103B).

At step 12, the sequencer 223 starts a division sub-sequencer (divstart) in sequence 2 to execute division, then stops once (stop) in sequence 3, and waits for termination of the division sub-sequencer.

At step 3, when the luminance range includes a black code (adr=blksec), a write enable signal is outputted (blkwr) in sequence 3 to the register 242 to store the black code offset $B_{OF}$ used for the black code retention (FIG. 10(e)) in the aforementioned process of the adaptive gradation conversion with the histogram equalization.

At step 4, when the luminance is in the luminance range A where the peak is to be held (adr=hldsec), a calculation is made to obtain a conversion ratio Khold for executing the peak holding process (FIG. 10(f)) in the adaptive gradation conversion with the histogram equalization. Since a division is also included in this operation, the sequencer 223 reads the RAM 224 (memrd) in sequence 4, then starts the division sub-sequencer (divstart) in sequence 5 and, after stopping once (stop) in sequence 6, waits for the termination of the division sequencer. Thereafter the conversion ratio Khold is stored in the register 243 (hldwr) in sequence 7.

Hereinafter an explanation will be given with regard to Z: the process of preparing the table at steps 0–15 in FIG. 16.

(1) Step 0: Histogram plotting (See FIG. 9(a))

Step 0 is executed during the effective pixel period, and a histogram table is prepared in the RAM 224 at this step. Only during this period, the section data sec2 conforming to the luminance value in the relevant pixel is given as address data to the RAM 224. A numerical value 1 is added, by the adder 237 in the ALU 226, to the present histogram value in the address corresponding to the section data sec2, and the result of such addition is stored in the same address again in the RAM 224. Consequently, the histogram value is incremented in accordance with expression (30), where RAM1out is the output data from the RAM 224, and RAM1in is the input data to the RAM 224.

$$RAM1in = RAM1out + 1 \qquad (30)$$

A histogram table representing the relevant field is prepared in the RAM 224 by repeating the above process with regard to every section data scc2 outputted from the section generator 206 (FIG. 11) during the effective pixel period.

Figure 17:
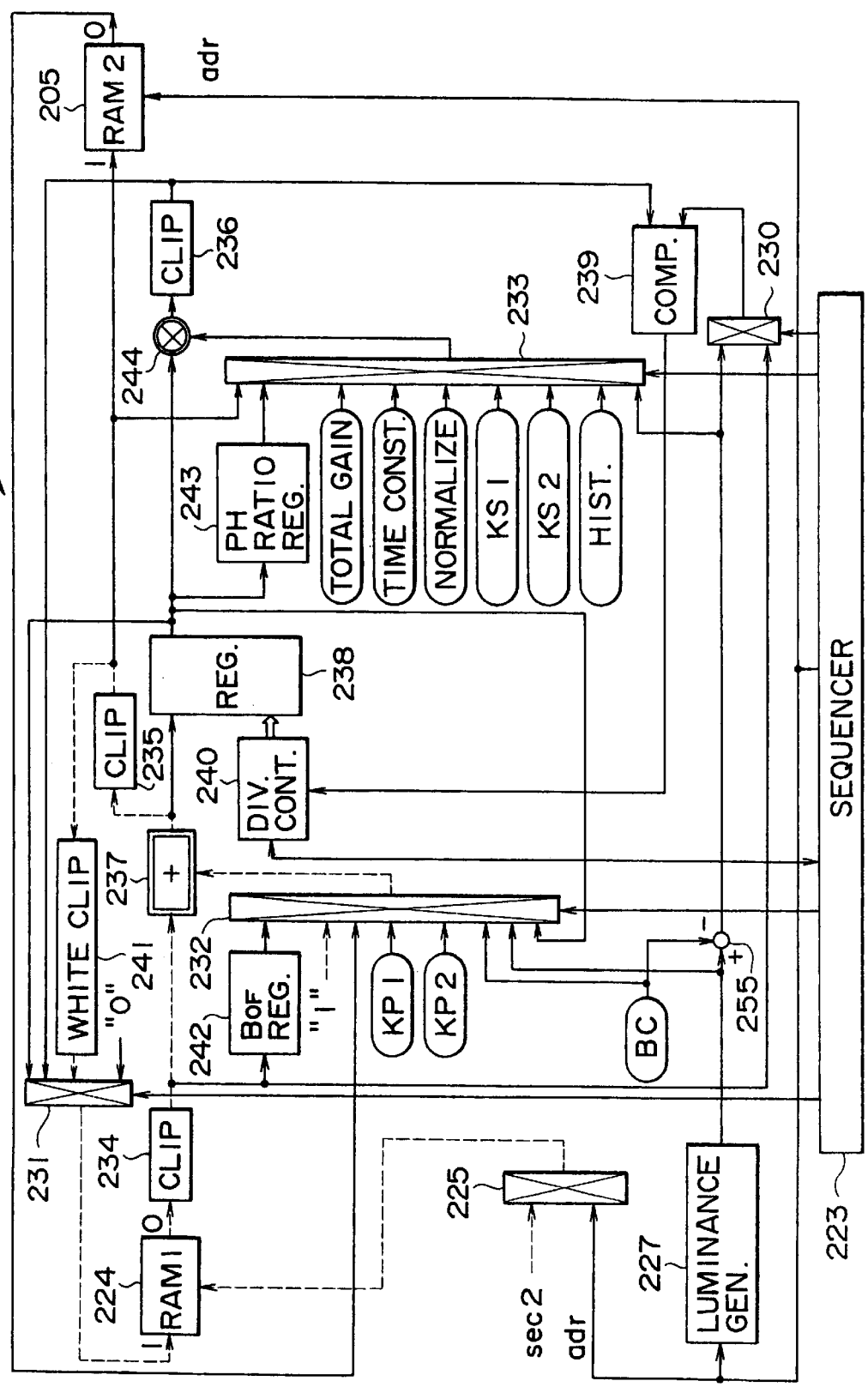
FIG. 17 is a diagram illustrating the ALU operation at step 0 for plotting a histogram.

FIG. 17 shows the operation of the ALU 226 during the plotting of the histogram at step 0, wherein related signal paths are denoted by broken lines. This applies also to the diagrams showing the operations at subsequent steps. In this case, the adder/subtracter 237 in the ALU 226 serves as an adder.

(2) Step 1: Accumulation and normalization (See FIGS. 9 (b) and (c))

The operation subsequent to step 1 is performed during the vertical blanking interval. Address data adr is supplied from the sequencer 223 to the RAM 224. At step 1, the accumulation and normalization of the histogram are executed to convert the same into a normalized cumulative frequency table. Accumulation is executed by the register 238 in the ALU 226, until the relevant section is multiplied by a normalizing constant KCCD in the multiplier 244, and the result of such multiplication is stored in the RAM 224 again. The above process is expressed by expressions (31) and (32).

$$Regin = Regout + RAM1out \qquad (31)$$

$$RAM1in = Regout*KCCD \qquad (32)$$

In the above equations, Regout is the output data from the register 238, and the Regin is the input data to the register 238. At step 1 shown in FIG. 16, "memrd" stands for read from the RAM 224, "regwr" for write in the register 238, and "memwr" for write in the RAM 224. This nomenclature also applies to the subsequent steps. However, "memrd" at steps 13 and 14 stands for read from the RAMs 224 and 205, and "memwr" at step 14 stands for write in the RAM 205.

Figure 18:
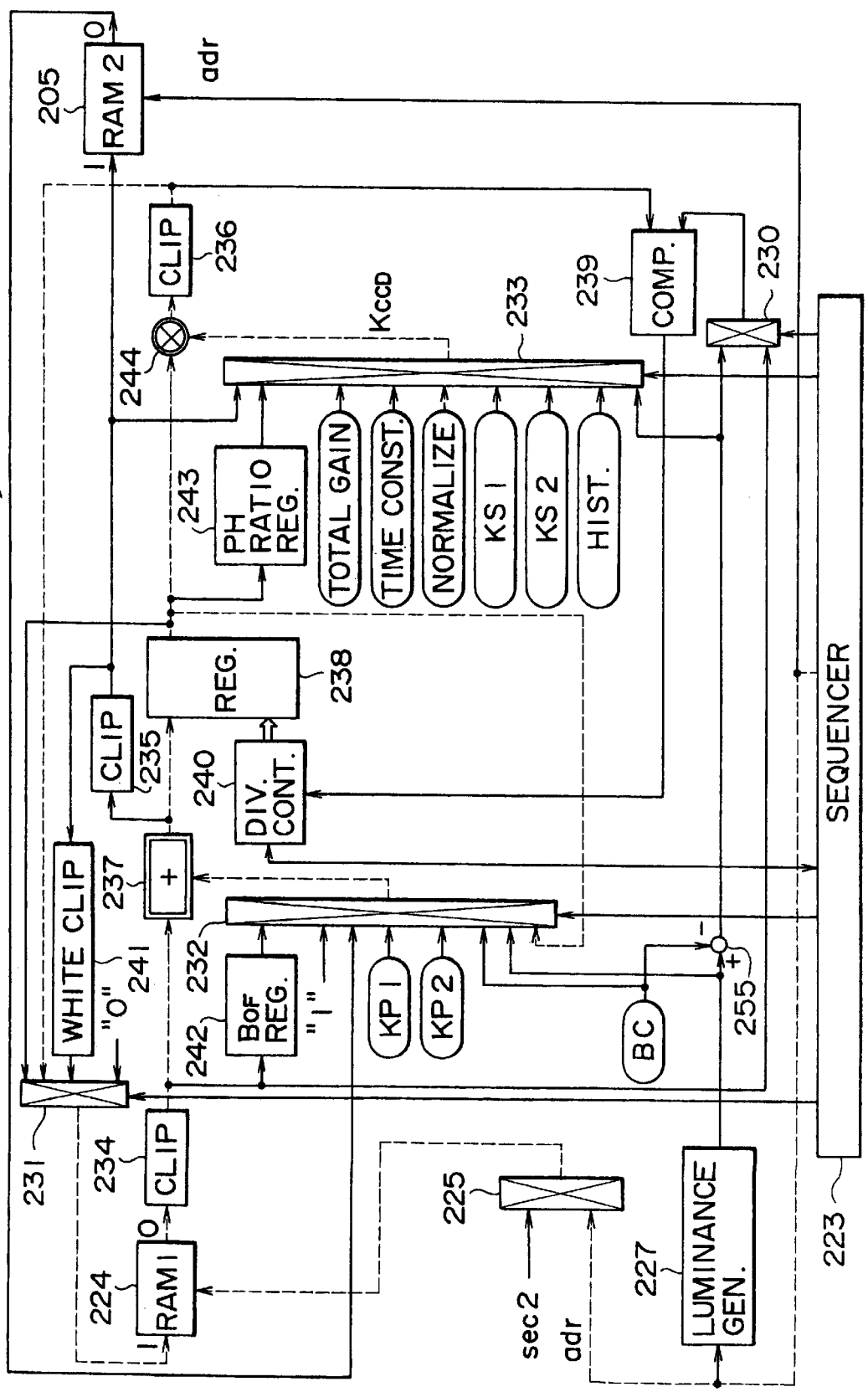
FIG. 18 is a diagram illustrating the ALU operation at step 1 for accumulation and normalization operations.

FIG. 18 shows the operation of the ALU 226 performed for accumulation and normalization at step 1. The adder/subtracter 237 in the ALU 226 serves as an adder. In this case, since the differential gain in the amplitude transfer characteristic rises in accordance with the increase of the histogram value, the clip circuit 234 is operative to prevent any excessive rise of the gain.

In sequence 6 at step 1, the histogram outputted from the RAM 224 as will be described later is stored in a register of a histogram data report circuit.

(3) Steps 2 and 3: Adjustment of the histogram equalization (See FIG. 10(d))

At steps 2 and 3, the histogram equalization is adjusted. More specifically, the degree of histogram equalization is designated as Kwc, and calculations of expressions (33) and (34) are executed.

$$Regin = RAM1out - x \qquad (33)$$

$$RAM1in = Regout*Kwc + x \qquad (34)$$

When Kwc is set to 1.00, the complete histogram equalization is performed. But when Kwc is changed to 0.00, the histogram equalization is not performed. In the above equations, x signifies the luminance data generated in the luminance data generator 227 corresponding to the respective section. This luminance data is obtained without any conversion, and when Kwc is 0.00, x becomes RAM1out.

Figure 19:
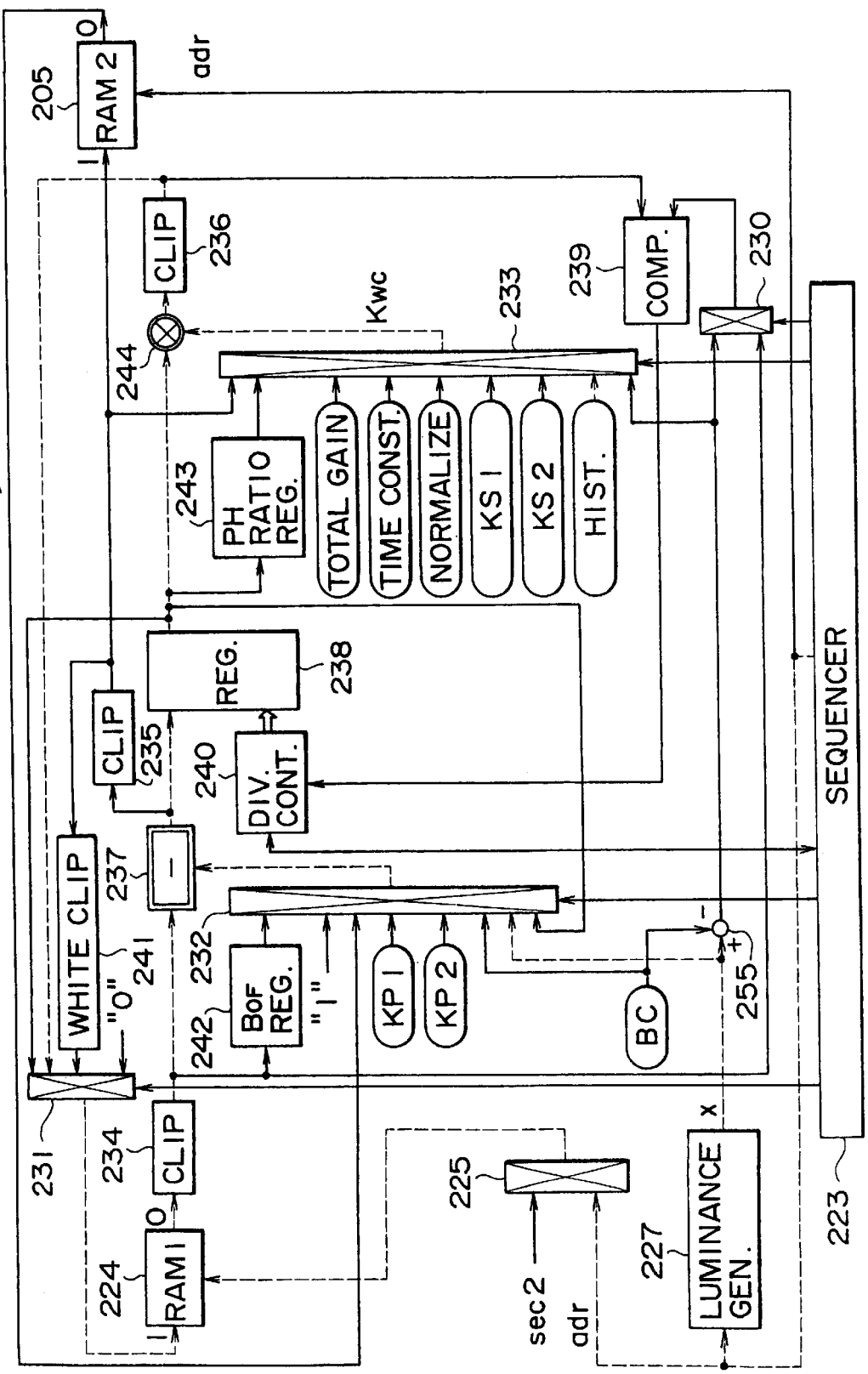
FIG. 19 is a diagram illustrating the ALU operation at step 2 to adjust the histogram equalization.
Figure 20:
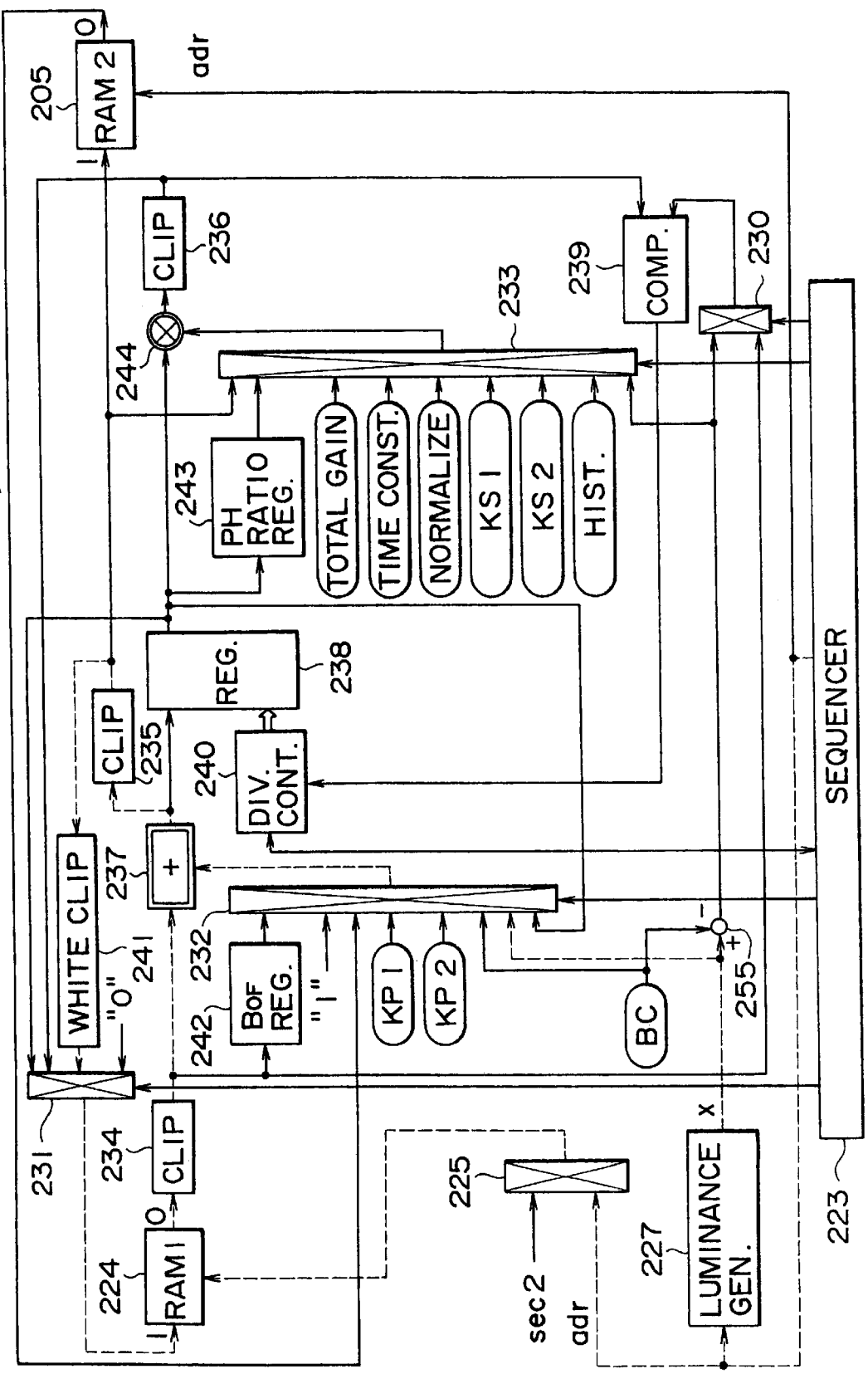
FIG. 20 is a diagram illustrating the ALU operation at step 3 to adjust the histogram equalization.

FIG. 19 shows the operation of the ALU 226 during the adjustment of the histogram equalization at step 2. The calculation of expression (33) is executed at this step 2. Accordingly, the adder/subtracter 237 in the ALU 226 serves as a subtracter. And FIG. 20 shows the operation of the ALU 226 during the adjustment of the histogram equalization at step 3. The calculation of expression (34) is executed at step 3. Accordingly, the adder/subtracter 237 in the ALU 226 serves as an adder.

(4) Step 4: Black code holding process (See FIG. 10 (e))

At step 4, the black code holding process is performed to remove the black code offset $B_{OF}$. At this step, the black level offset $B_{OF}$, which is the difference between x and the table value after adjustment such as the histogram equalization in the black-code including section (adr=blksec), is retained in the register 242. Then, this offset is subtracted from the table in all of the sections, whereby the table value in the black-code including section is equalized to x. Removal of the black level offset $B_{OF}$ can be realized, during execution of the calculation according to expression (34) at step 3, by storing REGout*Kwc in the register 242 in parallel with such calculation. The operation for subtracting the black level offset $B_{OF}$ from the table is based on a calculation of expression (35).

$$RAM1in = RAM1out - B_{OF} \qquad (35)$$

Figure 21:
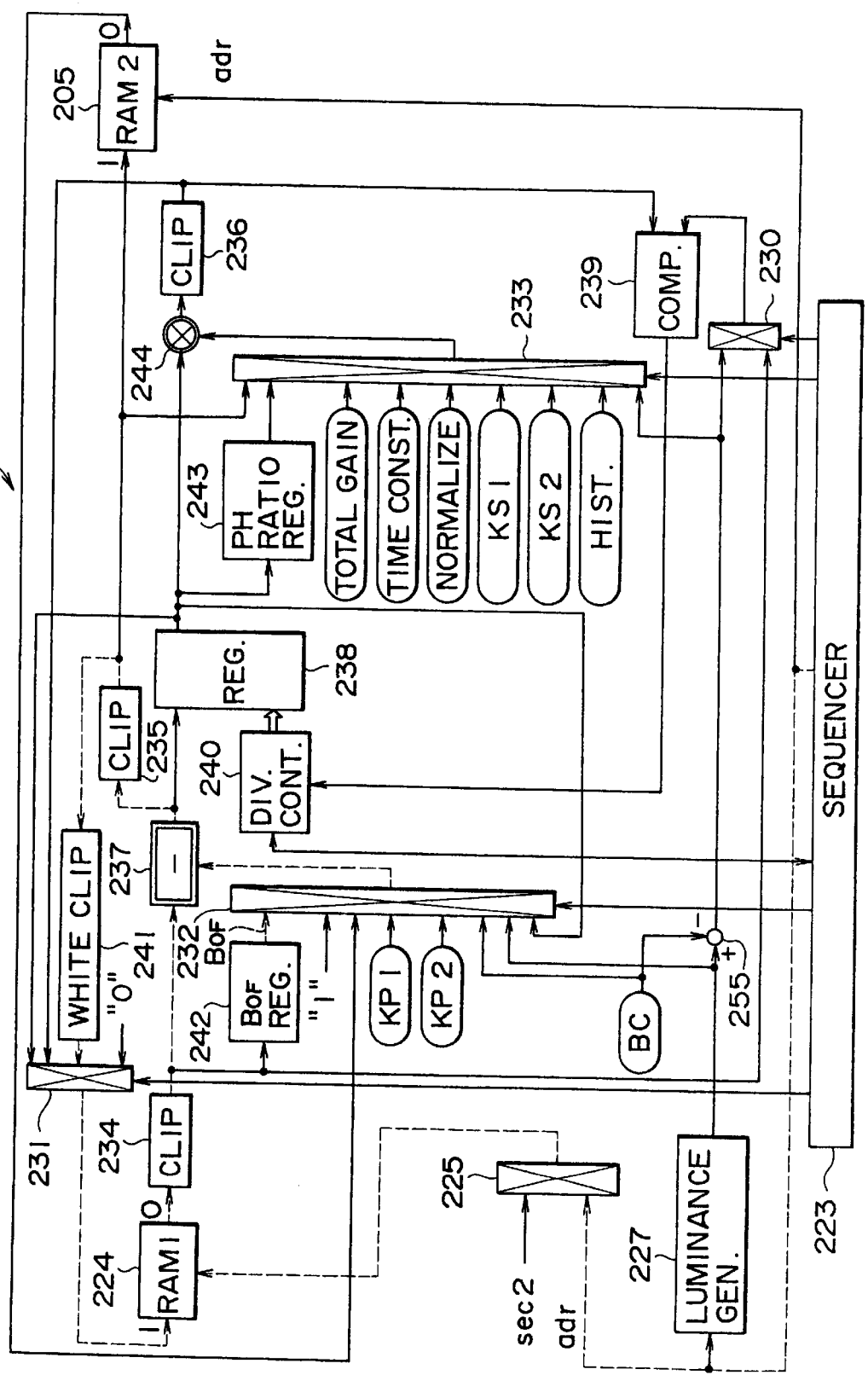
FIG. 21 is a diagram illustrating the ALU operation at step 4 for executing a black code holding process.

FIG. 21 shows the operation of the ALU 226 performed in the black code holding process at step 4. The calculation of expression (35) is executed at this step. Accordingly, the adder/subtracter 237 in the ALU 226 serves as a subtracter.

(5) Steps 5 and 6: Peak holding process (See FIG. 10(f))

At steps 5 and 6, the peak holding process is executed. Although not mentioned above, at step 4, a peak hold ratio Khold is calculated through division of the conversion result p1 in the luminance range A to be fixed and the value x obtained without conversion. This peak hold ratio Khold is stored in the register 236. That is, at step 4, a calculation of expression (36) is executed in the section of the luminance range A (adr=hldsec), whereby the hold ratio Khold is obtained.

$$Khold = (x - BC)/(RAM1out - BC) \qquad (36)$$

Division is typically expressed by an equation b/a=c where variables a, b and c are denominator, numerator and quotient, respectively. This equation can be modified as b=(a*c) which may be used for calculating the quotient c by finding the number x (the denominator a in the modified equation) which gives the product equal to the numerator b when the number x is multiplied by the denominator a. In order to find the quotient c, the number x is sequentially changed so that it finally converges to the ratio c. For example, if the quotient c is to be found as n-bit data, the number x is also treated as n-bit data. The number x is tried bit-by-bit, starting with its most significant bit (MSB), until the product (a*x) exceeds the numerator b. The n-bit number x is then confirmed as the required quotient c.

As an example, let it be assumed that the numerator b is 1010 and the denominator a is 111. Let the division processing be carried out to find the ratio c as 4-bit data, where 4 is derived from the power of 2. Consider the 4-bit data x=[b3, b2, b1, b0] as data for finding the quotient c. Initially, the MSB b3 is confirmed by setting b3 to 1 and b2, b1, b0 to 0. Then, the product (a*x) is compared with the numerator b. Since the product (a*x) equal to 1110 is greater than the numerator b, the MSB b3 is determined to be 0. Next, the bit b2 is determined by setting b3 to 0, b2 to 1 and b1, b0 to 0. In this case, the product (a*x) is again compared with the numerator b. Since the product (a*x) now equal to 0111 is smaller than the numerator b, the bit b2 is confirmed to be 1. Next, the bit b1 is determined by setting b3 to 0, b2, b1 to 1 and b0 to 0. The resulting product (a*x) is compared with the numerator b. Since the product (a*x) equal to 1010.1 is greater than the numerator b, the bit b1 is confirmed to be 0. Finally, the bit b0 is determined by setting b3 to 0, b2 to 1, b1 to 0 and b0 to 1. The product (a*x) is then compared with the numerator b. Since the product (a*x) equal to 1000.11 is smaller than the numerator b, the bit b0 is confirmed to be 1. Accordingly, the quotient c is found to be 01.01.

Figure 22:
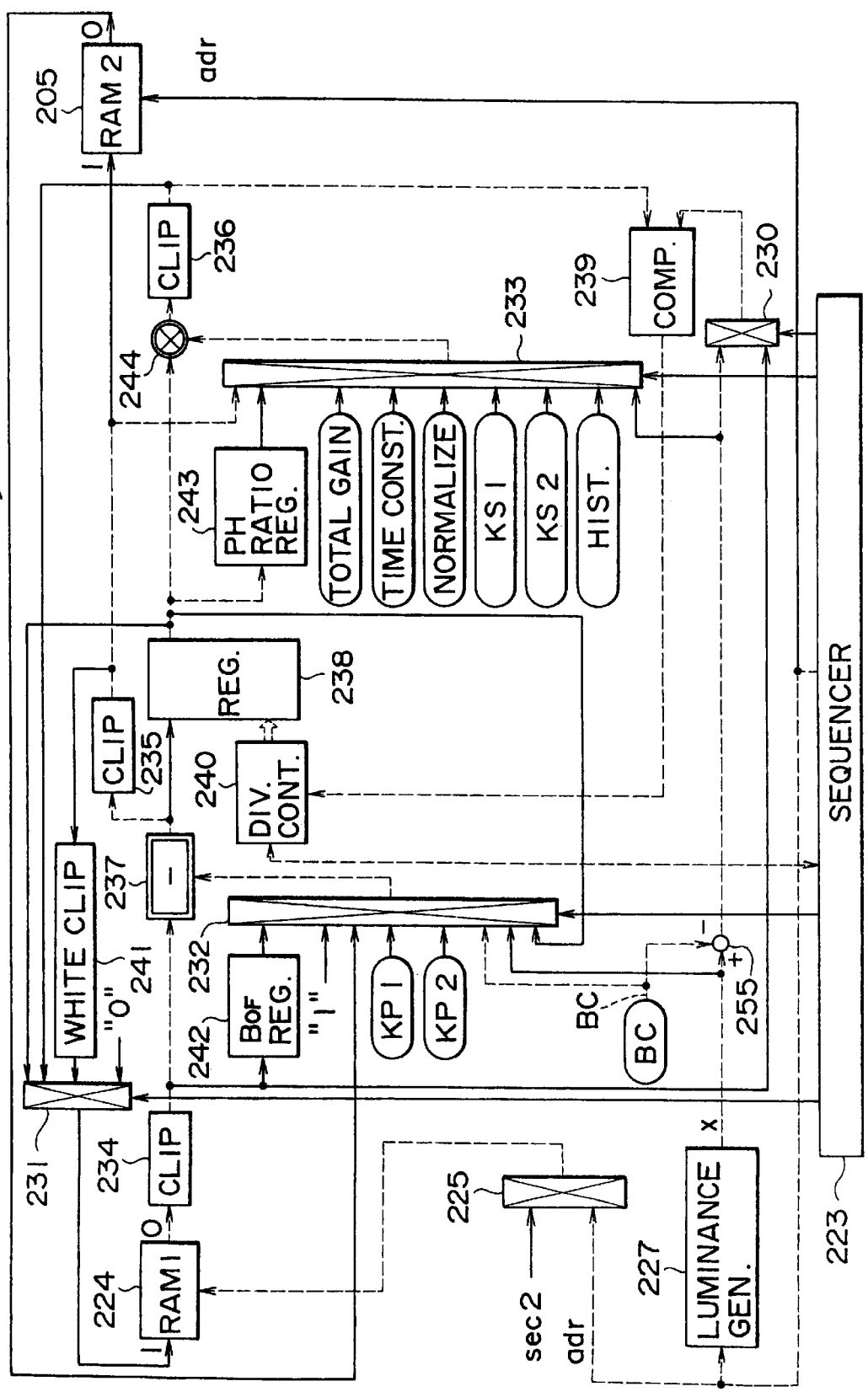
FIG. 22 is a diagram illustrating the ALU operation at step 4 for calculating a peak holding ratio.

FIG. 22 shows the operation of the ALU.226 performed in calculating the peak hold ratio at step 4. As shown in the figure, the peak-retention ratio is calculated by division. In this case, the adder/subtracter 237 in the ALU 226 serves as a subtracter.

As shown in FIG. 22, luminance data x for a period including luminance A is output by the luminance data generator 227. A black code BC is subtracted from the luminance data x by a subtractor 255. The result of the subtraction (x−BC) is supplied to a comparator 239. In the meantime, luminance data RAM1out for a period including the luminance A is retrieved from a RAM 224. Similarly, the black code BC is subtracted from the luminance data RAM1out by the adder/subtractor 237. The result of the subtraction (RAM1out−BC) is supplied to a multiplier 244. In the multiplier 244, the data output by the adder/subtractor 237 (that is, the result of the subtraction (RAM1out−BC)) is multiplied by data of typically 12 bits (b(11) to b(0)) stored in a register 238. The product output by the multiplier 244 is supplied to the comparator 239. The comparator 239 compares the subtraction result (x−BC) output by the subtractor 255 with the product output by the multiplier 244. The outcome of the comparison is supplied to a division controller 240.

In this state, based on the control exercised by a sequencer 223, the division controller 240 initially clears the contents of the register 238 by setting the bits b(11)–b(0) to 0. Then, the MSB b(11) is set to 1. Subsequently, based on the outcome of the comparison output by the comparator 239, the division controller 240 determines the value of the MSB b(11). Specifically, if the product data output by the multiplier 244 is greater than the subtraction result (x−BC), the MSB b(11) is reset to 0. If, however, the product data output by the multiplier 244 is equal to or smaller than the subtraction result (x−BC), the MSB b(11) is maintained as is (1). Thereafter, the division controller 240 sets the remaining bits b(10)–b(0) to 1 and then determines the bits sequentially one-by-one in the same manner as the MSB b(11). Finally, the 12-bit data with confirmed bits b(11)–b(0) is transferred from the register 238 to a register 243 to be stored as the peak-retention ratio (quotient) Khold.

Subsequently the table is multiplied by the hold ratio Khold. Since it is necessary to maintain the black level, calculations of expressions (37) and (38) are executed.

$$Regin = RAM1out - BC \quad (37)$$

$$RAM1in = Regout * Khold + BC \quad (38)$$

Figure 23:
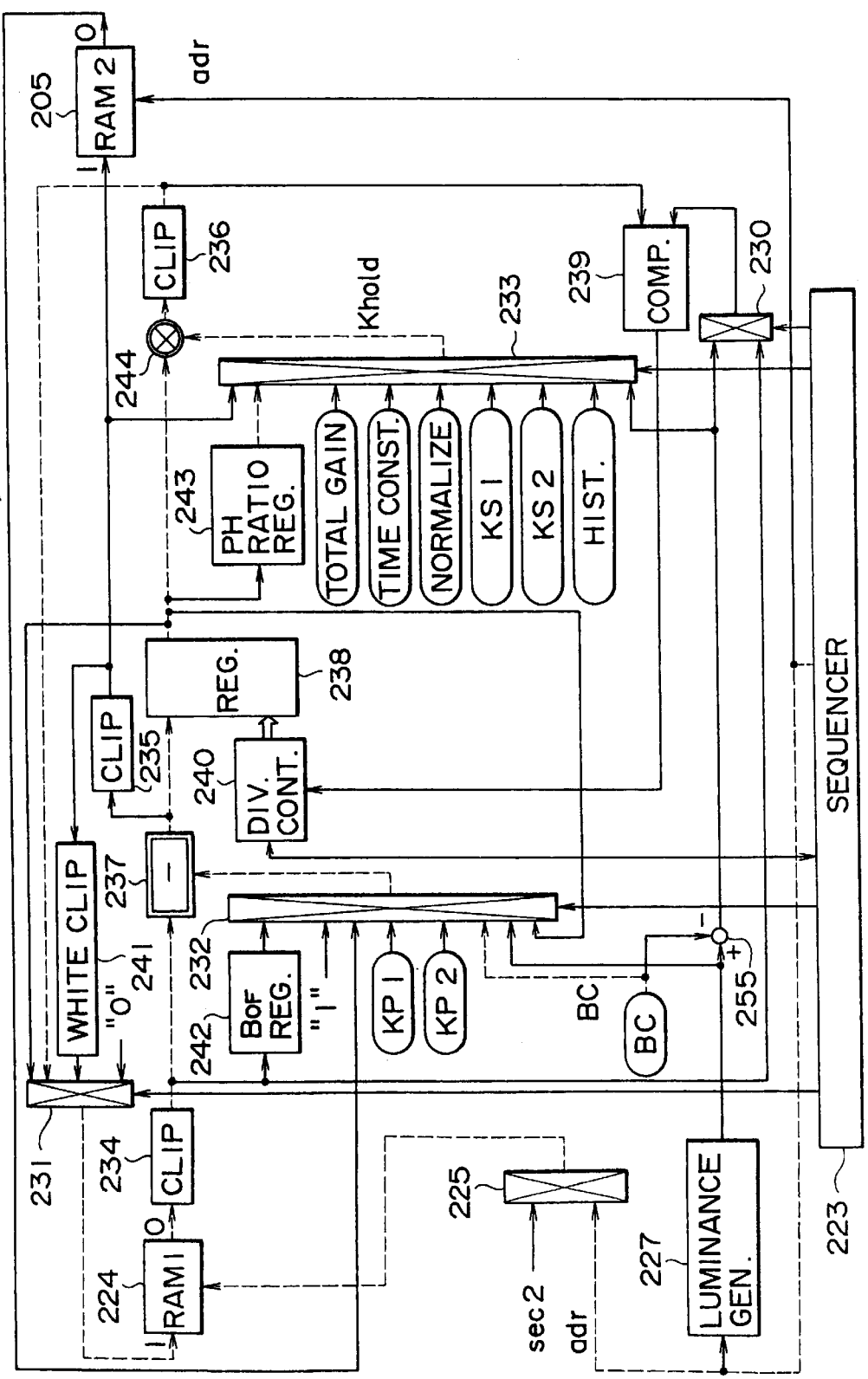
FIG. 23 is a diagram illustrating the ALU operation at step 5 for executing a peak holding process (1)
Figure 24:
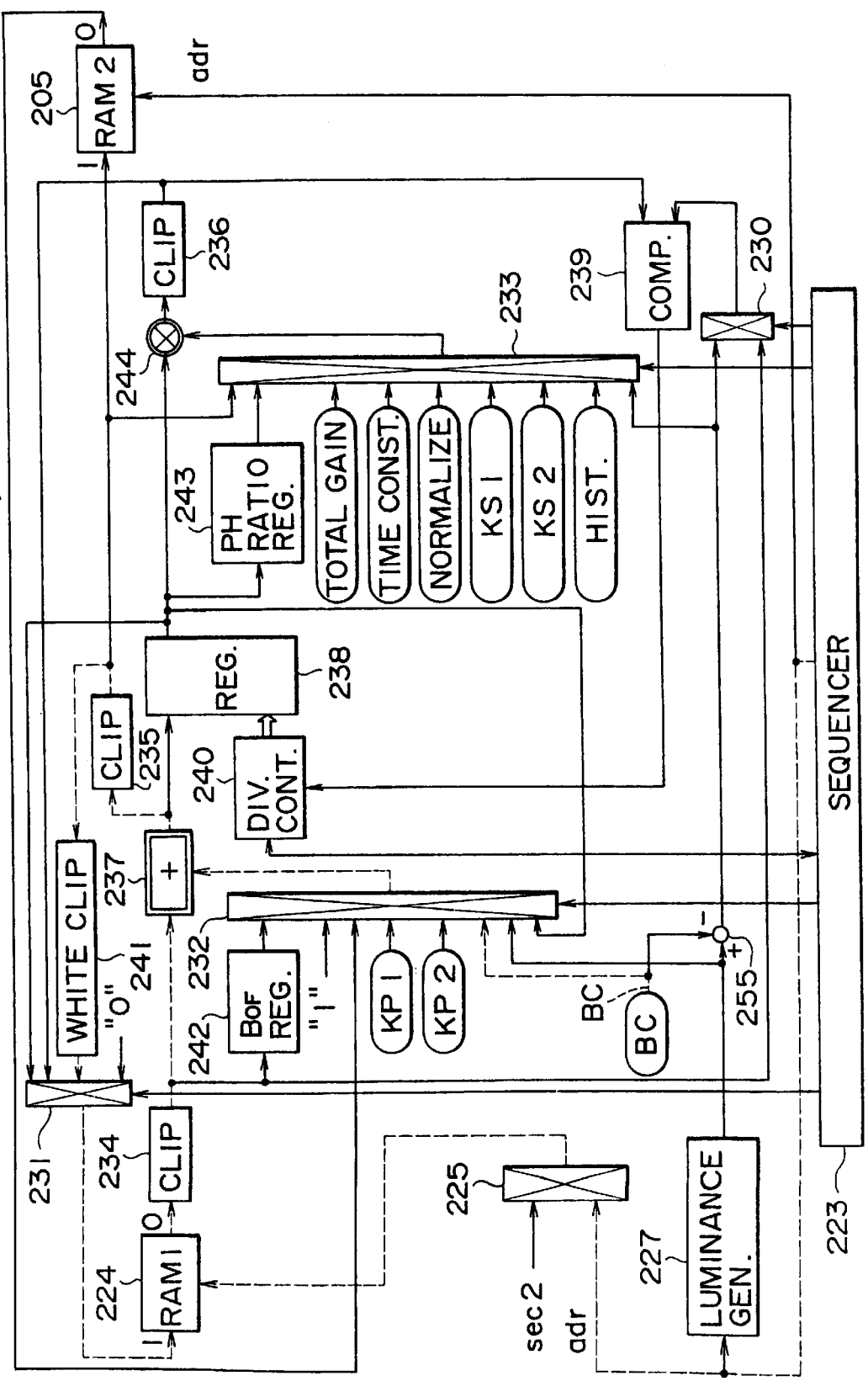
FIG. 24 is a diagram illustrating the ALU operation at step 6 for executing a peak holding process (2)

FIG. 23 shows the operation of the ALU 22G performed in the peak holding process (1) at step 5. The calculation of expression (37) is performed at this step. Accordingly, the adder/subtracter 237 in the ALU 226 serves as a subtracter. And FIG. 24 shows the operation of the ALU 226 performed in the peak holding process (2) at step 6. The addition operation in expression (38) is also executed at this step. Accordingly, the adder/subtracter 237 in the ALU 226 serves as an adder.

(6) Steps 7 and 8: Knee compression (1) (See FIG. 25 (g))

At steps 7 and 8, a first stage of the knee compression operation is executed. That is, the table for carrying out knee compression is prepared. The process of applying the knee to the level table is executed according to the calculations of expressions (39) to (42), wherein Kp and Ks signify a knee point and a knee slope respectively. In the first stage of the knee compression operation, the values are so set as to satisfy the conditions of Kp=Kp1 and Ks=Ks1.

When RAM1out≧Kp, $$Regin = RAM1out - Kp \quad (39)$$

$$RAM1in = Regout * Ks + Kp \quad (40)$$

When RAM1out<Kp, $$Regin = RAM1out - Kp \quad (41)$$

$$RAM1in = Regout * 1.00 + Kp \quad (42)$$

Figure 27:
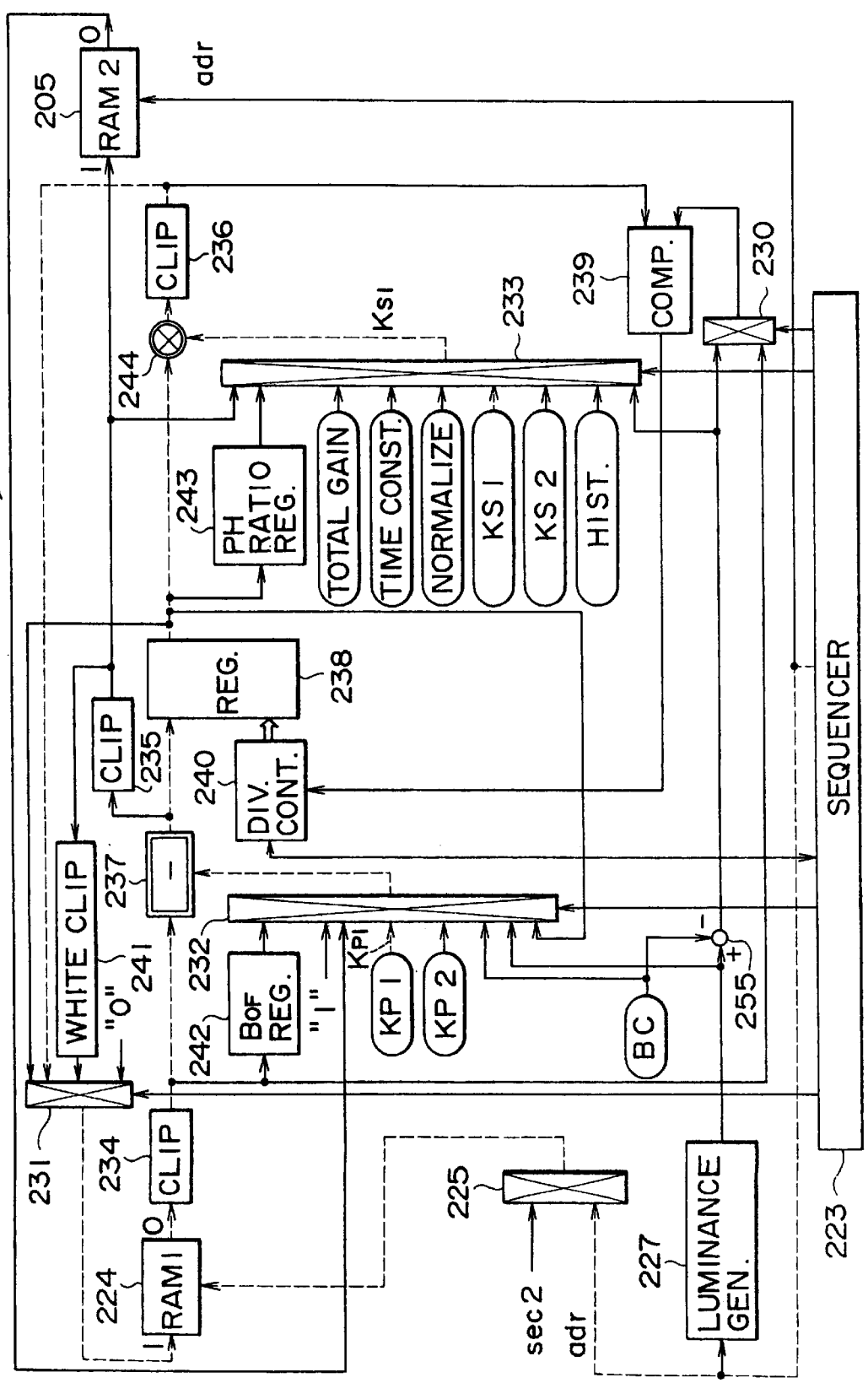
FIG. 27 is a diagram illustrating the ALU operation at step 7 for executing the knee compression operation (1)
Figure 28:
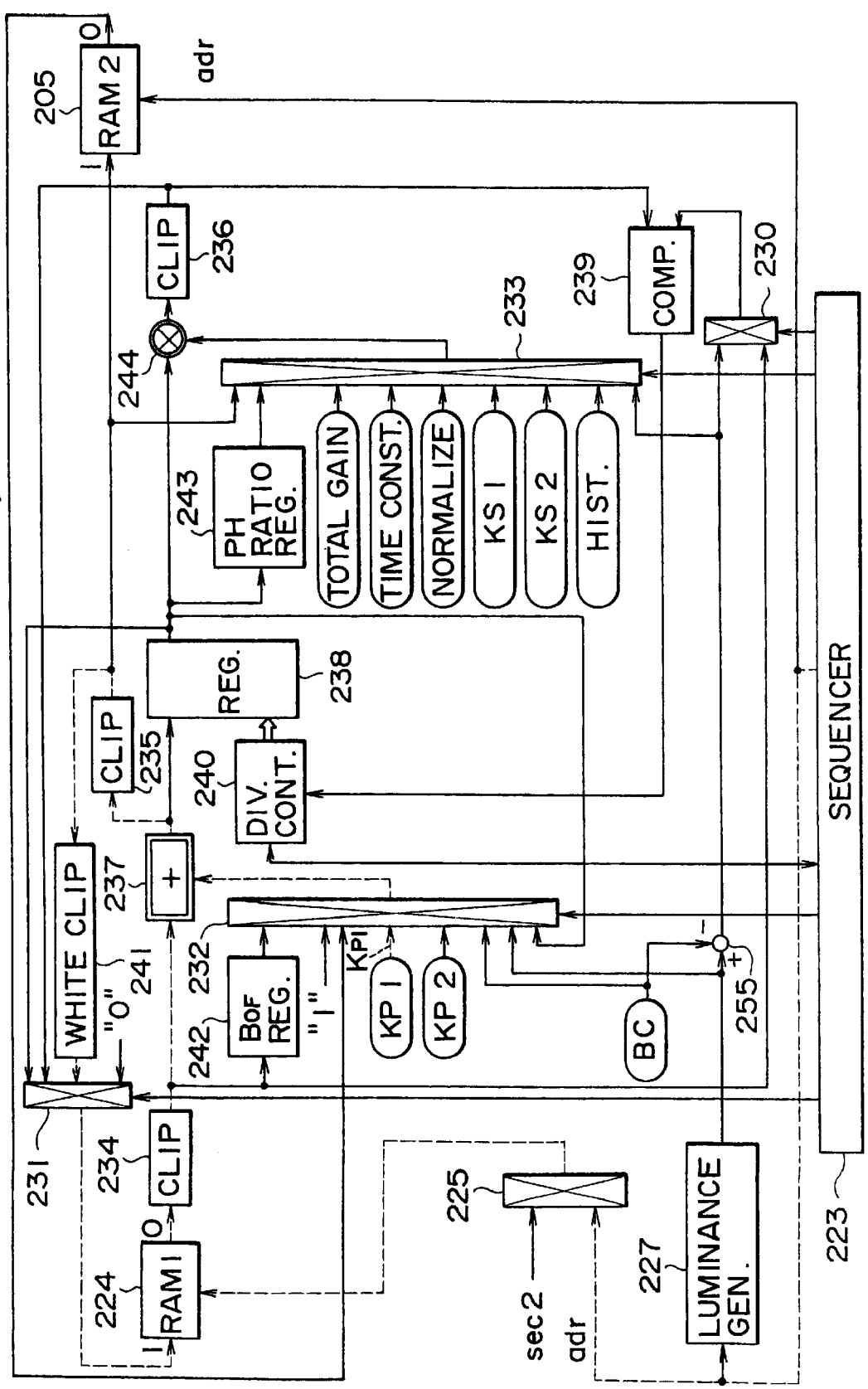
FIG. 28 is a diagram illustrating the ALU operation at step 8 for executing the knee compression operation (1)

FIG. 27 shows the operation of the ALU 226 performed in the first stage of the knee compression operation at step 7. The calculations of expressions (39) and (40) or expressions (41) and (42) are executed at step 7 with the exception of the Kp addition. Accordingly, the adder/subtracter 237 in the ALU 226 serves as a subtracter. And FIG. 28 shows the operation of the ALU 226 performed in the first stage of the knee compression operation at step 8. The remaining calculation of the Kp addition is executed at step 8. Accordingly, the adder/subtracter 237 in the ALU 226 serves as an adder.

(7) Steps 9 and 10: Knee compression (2) and white clipping (See FIG. 25(h))

At steps 9 and 10, the second stage of the knee compression and white clipping operations are executed. The process of applying the knee to the level table is executed according to the calculations of expressions (39) to (42), similar to the first stage of the knee compression operations. In this second stage, the values are set to satisfy the conditions of Kp=Kp2 and Ks=Ks2. However, due to application of the knee twice in this case, the slope of the last knee curve becomes Ks1*Ks2. The broken knee line is rounded off by such two-stage application of the knee compression operation.

White clipping is executed as the data of the white clip level is supplied from the microcomputer 125 to the white clip circuit 241 in step 10. The white clip circuit 241 does not function at any other step.

Figure 29:
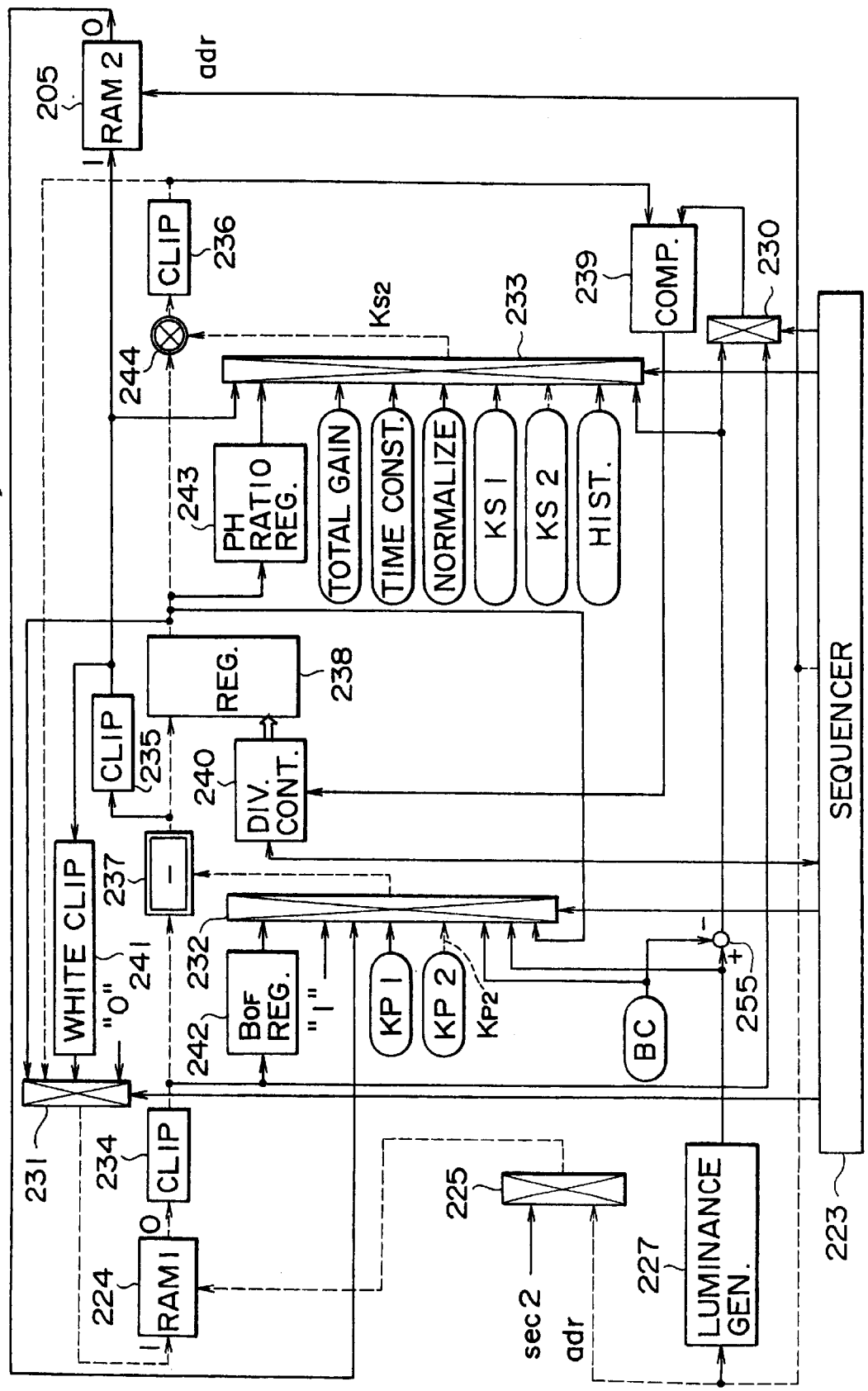
FIG. 29 is a diagram illustrating the ALU operation at step 9 for executing the knee compression operation (2)
Figure 30:
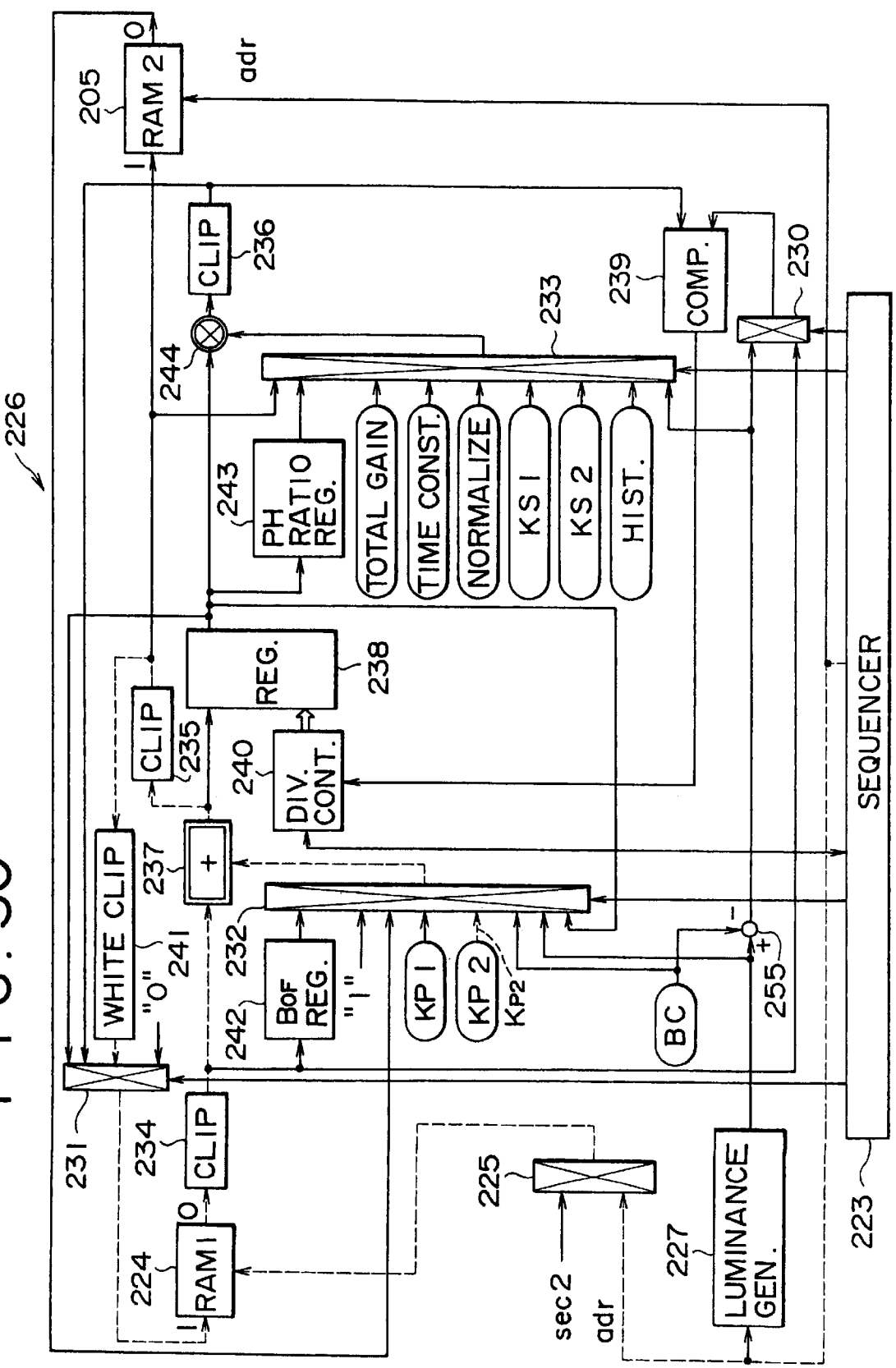
FIG. 30 is a diagram illustrating the ALU operation at step 10 for executing the knee compression operation (2) and a white clipping operation.

FIG. 29 shows the operation of the ALU 226 performed in the second stage of the knee compression and white clipping operations at step 9. The calculations of expressions (39) and (40) or expressions (41) and (42) are executed at step 9 with the exception of the Kp addition. Accordingly, the adder/subtractor 237 in the ALU 226 serves as a subtracter. And FIG. 30 shows the operation of the ALU 226 performed in the second stage of the knee compression and white clipping operations at step 10. The remaining calculation of the Kp addition is executed at step 10. Accordingly, the adder/subtracter 237 in the ALU 226 serves as an adder.

(8) Step 11: Total gain control (See FIG. 25(i))

At step 11, the level table is multiplied by the total gain (Gain) to adjust the overall gain. For example, in the case of an assigned code which is not the second power of an 8-bit D1 code (as is the case with a signal resulting from the A/D conversion having 11 bits including 1 extension bit and 5 extension bits on the MSB and LSB sides respectively), the data becomes the second power of the D1 code by multiplying this data by a correction coefficient. The calculations are executed on the basis of expressions (43) and (44).

$$Regin = RAM1out - BC \qquad (43)$$

$$RAM1in = Regout*Gain + BC \qquad (44)$$

Figure 31:
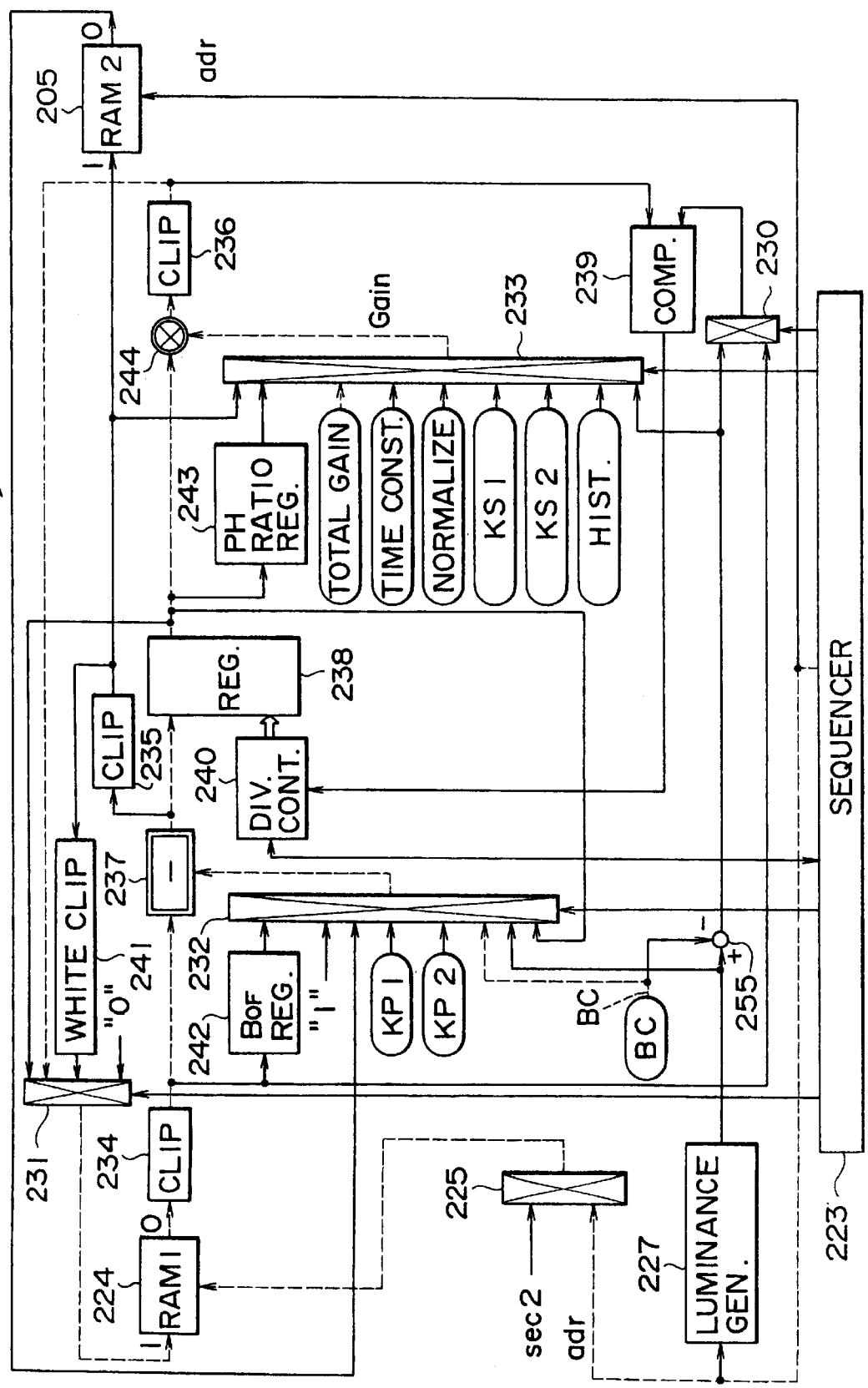
FIG. 31 is a diagram illustrating the ALU operation at step 11 for providing the total gain control.

FIG. 31 shows the operation of the ALU 226 in the total gain control at step 11. Expressions (43) and (44) are executed at step 11 with the exception of the BC addition. Accordingly, the adder/subtracter 237 in the ALU 226 serves as a subtracter. The remaining calculation of the BC addition can be omitted as will be described in the next item (9) below.

Figure 32:
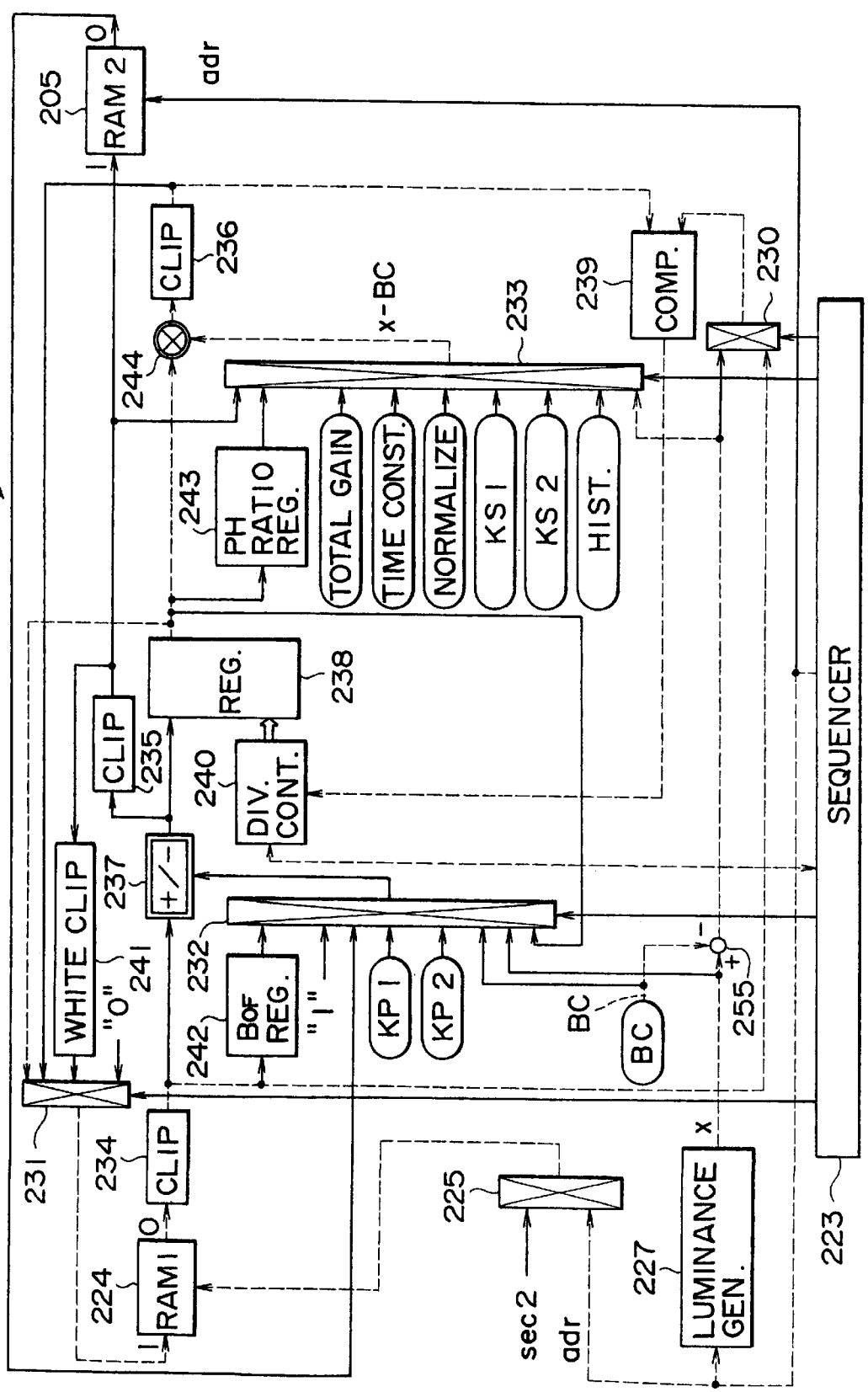
FIG. 32 is a diagram illustrating the ALU operation at step 12 for obtaining a transfer gain.

FIG. 32 is a diagram showing operations carried out by the ALU 226 to accomplish division for obtaining a transfer gain in step 12. By carrying out division similar to the processing for finding the peak-retention ratio described above, the transfer gain for luminance zones 0 to 60 is found. In step 12, processing based on expression (47) is carried out.

Initially, the sequencer 223 outputs address data adr for the luminance zone 0. The address data adr indicates an address at which luminance data RAM1out for a period of the luminance zone 0 is retrieved from the RAM 224. The luminance data RAM1out is supplied to the comparator 239. In the meantime, luminance data x for a period of the luminance zone 0 is output by the luminance data generator 227. The black code BC is subtracted from the luminance data x by a subtractor 255. The result of the subtraction (x−BC) is supplied to the multiplier 244. In the multiplier 244, the data output by the subtractor 255 (that is, the result of the subtraction (x−BC)) is multiplied by data of typically 12 bits b(11)–b(0) stored in a register 238. The product output by the multiplier 244 is supplied to the comparator 239. The comparator 239 compares luminance data RAM1out read out from the RAM 224 with the product output by the multiplier 244. The outcome of the comparison is supplied to the division controller 240.

In this state, based on the control exercised by the sequencer 223, the division controller 240 initially clears the contents of the register 238 by setting the bits b(11)–b(0) to 0. Then, the MSB b(11) is set to 1. Subsequently, based on the outcome of the comparison output by the comparator 239, the division controller 240 determines the value of the MSB b(11). Specifically, if the product data output by the multiplier 244 is greater than the luminance data RAM1out, the MSB b(11) is reset to 0. If, however, the product data output by the multiplier 244 is equal to or smaller than the luminance data RAM1out, the MSB b(11) is maintained as is (1). Thereafter, the division controller 240 sets the remaining bits b(10) to b(0) to 1 and then confirms these set bits sequentially one-by-one in the same way as the MSB b(11). In the end, the 12-bit data with the confirmed bits b(11)–b(0) is stored in the RAM 224 as the transfer gain RAM1in for the luminance zone 0.

Thereafter, the sequencer 223 outputs address data adr for the luminance zones 1 to 60 sequentially one zone after another. The division controller 240 is operative to carry out division operations in the same way as the one performed for the luminance zone 0, as described above. The transfer gain for each of the luminance zones 1 through 60 is thereby found and stored in the RAM 224.

Figure 26L:
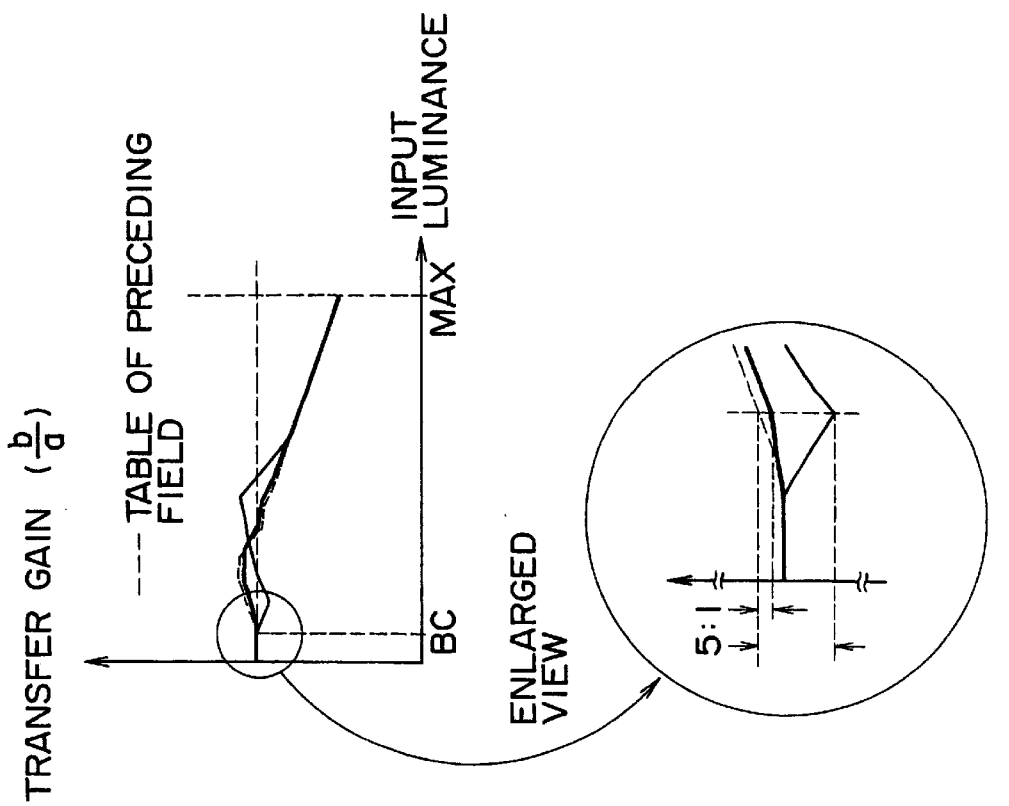
FIG. 26 shows diagrams illustrating division and various other functions carried out to obtain a transfer gain.

(9) Step 12: Division for obtaining the transfer gain (See FIG. 26 (k))

Figure 26J:
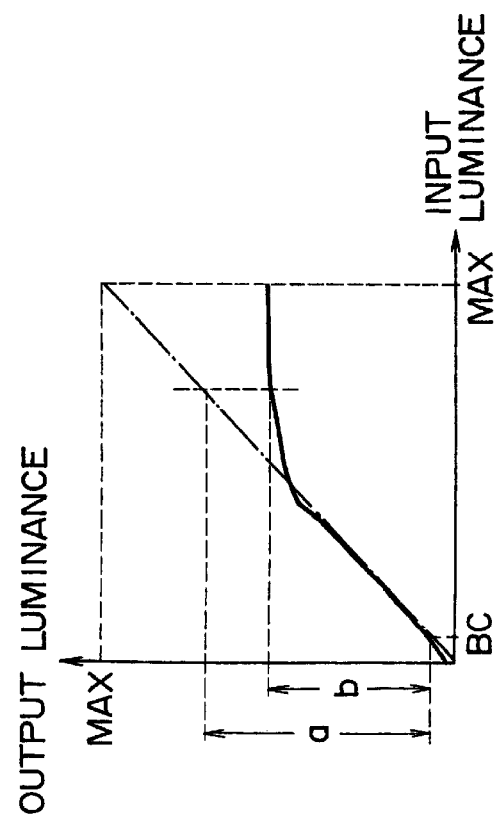
Figure 26K:
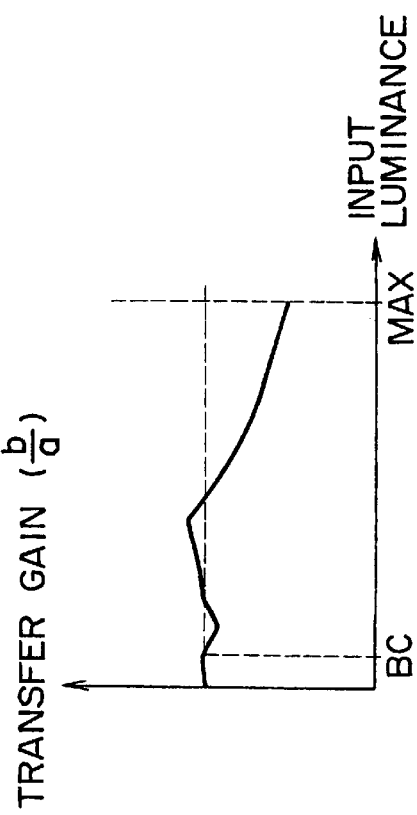

At step 12, division is executed for converting the level table into another table of Kw which represents the gain, as shown in FIG. 26 (j). For example, in a luminance region denoted by a vertical broken line in FIG. 26(j), a calculation has to be performed to obtain a proper gain for converting the level a to the level b. Prior to the calculation in the luminance conversion calculator 111, as shown in FIG. 1, the black code BC is subtracted from the red, green and blue color data in the subtracters 110R, 110G, 110B respectively, and the code is converted into a stimulus value. Therefore, the gain obtained by the division needs to be for the stimulus value. For this purpose, the calculation of expression (45) is executed for conversion into a gain table.

$$RAM1out = (RAM1out - BC)/(x - BC) \qquad (45)$$

In the numerator of expression (45), the black code BC is subtracted from the result obtained by the addition of the black code BC in expression (44). Therefore, such operation can be omitted since it is redundant. In this case, expressions (44) and (45) are rewritten as expressions (46) and (47), respectively.

$$RAM1in = Regout*Gain \qquad (46)$$

$$RAM1in = RAM1out/(x - BC) \qquad (47)$$

A conversion table in the present field is prepared in the manner as mentioned above. However, if this table is used directly for the conversion in the next field, some undesirable effects including flicker and so forth may be induced. In order to eliminate this problem, a hysteresis calculation is executed between the conversion table in the preceding field and the one in the present field so that the table can be updated with a time constant.

FIG. 32 shows the operation of the ALU 226 performed in the division process for obtaining the transfer gain at step 12. The calculation of expression (47) is executed at this step.

(10) Steps 13 and 14: Time constant process (LPF) (See FIG. 26(l))

At steps 13 and 14, an operation is executed to update the table with a time constant. The result is written in the RAM 205 as the final table which is referred to at the time of actually converting the input picture. For this reason, the calculations of expressions (48) and (49) are carried out.

$$Regin = RAM1out - RAM2out \qquad (48)$$

$$RAM2in = Regout*K_T + RAM2out \qquad (49)$$

In expression (49), $K_T$ is the time constant. The left side of this equation is expressed as RAM2in for the reason mentioned above. Here, RAM2out stands for the output data from the RAM 205, and RAM2in for the input data to the RAM 205.

The transfer function of this LPF calculation is expressed as expression (50) below. The sampling frequency in expression (50) is a field frequency.

$$G(z) = K_T/1 - (1 - K_T)z^{-1} \qquad (50)$$

The final table is thus prepared in the RAM 205.

Figure 33:
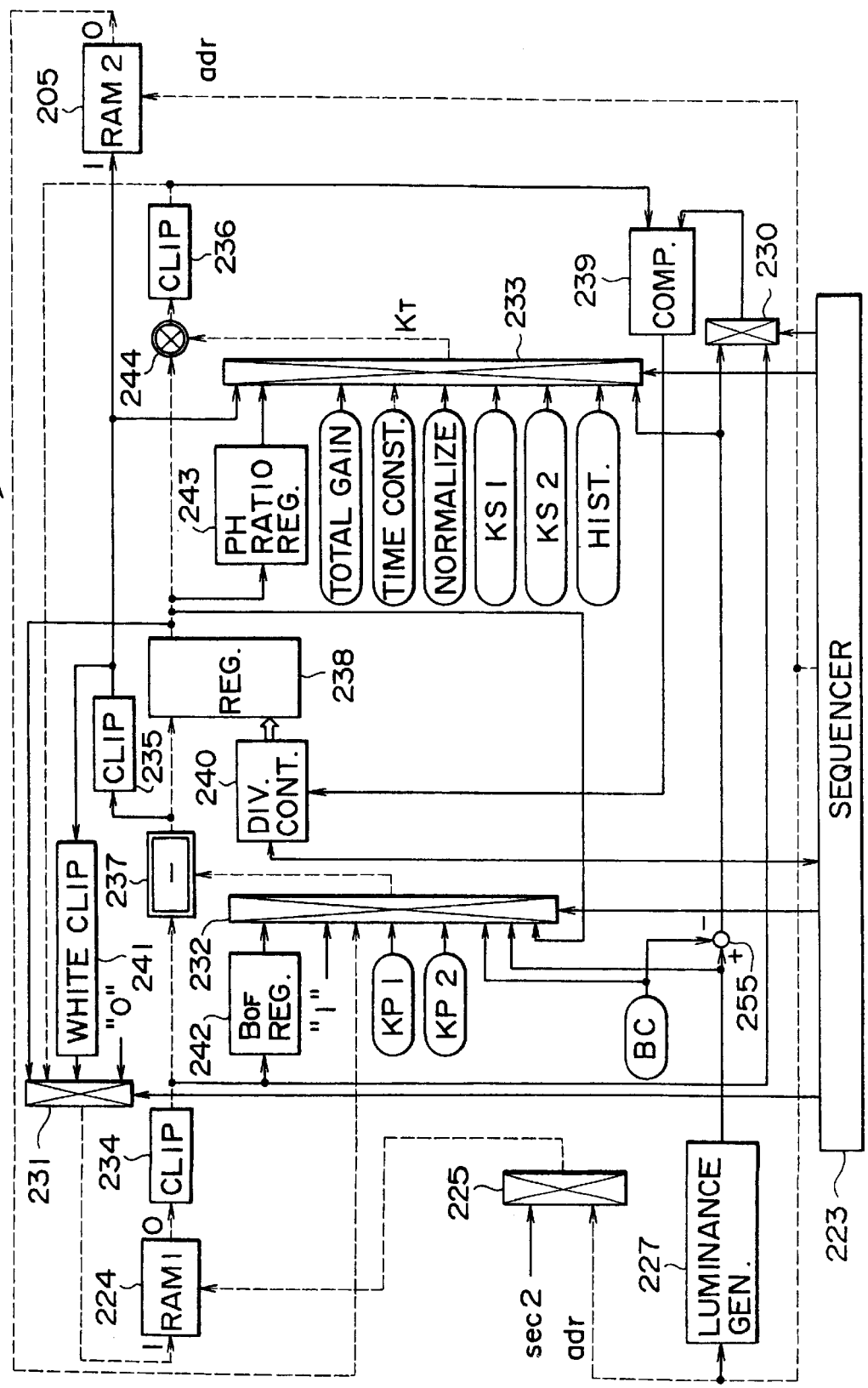
FIG. 33 is a diagram illustrating the ALU operation at step 13 for executing a time constant operation.
Figure 34:
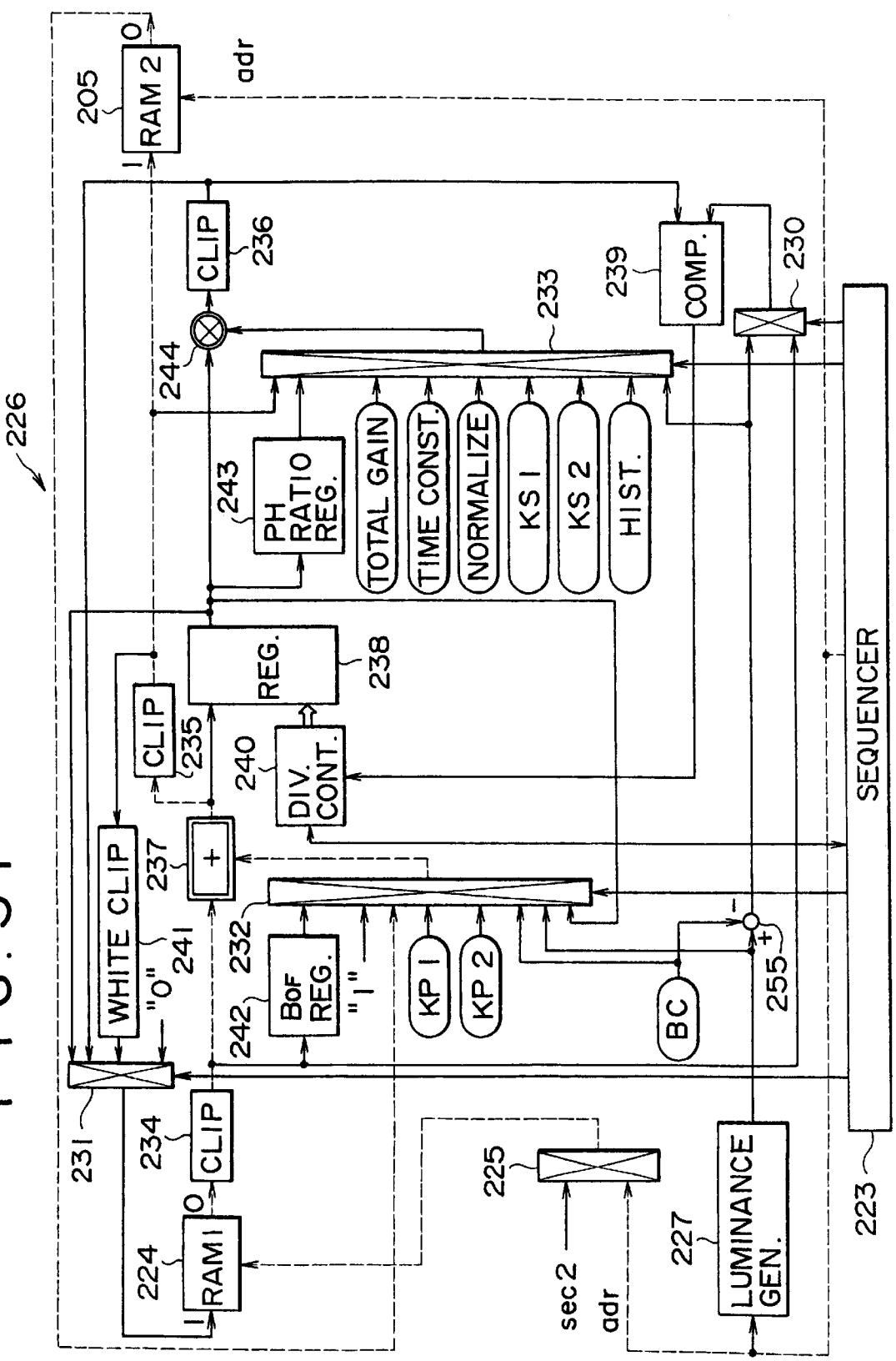
FIG. 34 is a diagram illustrating the ALU operation at step 14 for executing a time constant operation.

FIG. 33 shows the operation of the ALU 226 performed in the time constant operation at step 13. The calculations of expressions (48) and (49) are executed at this step with the exception of the RAM2out addition. Accordingly, the adder/subtracter in the ALU 226 serves as a subtracter. FIG. 34 shows the operation of the ALU 226 performed in the time constant process at step 14. The remaining calculation of the RAM2out addition is executed at this step. Accordingly, the adder/subtracter in the ALU 226 serves as an adder.

(11) Step 15: RAM clearing process

At step 15, the RAM 224 is cleared to be ready for the next histogram during the effective pixel period in the next field. FIG. 35 shows the operation of the ALU 226 performed during the RAM 224 clearing operation at step 15.

As described above, according to one embodiment of the present invention as shown in FIG. 1, the knee compression operation includes the luminance knee operation to execute the knee compression of the luminance level, and the saturation knee compression to reduce the saturation when an excessive level of any primary color signal still exists even after the luminance knee operation. The signal level is thus made to conform to the specified standard. It becomes possible to compress any high luminance portion properly while maintaining the hue unchanged and eliminating any excessive signal level.

Further description of the knee compression operation and various knee compression techniques may be found in two co-pending applications Ser. Nos. 08/574,520 and 08/600,688 (attorney docket No. 450100-3370 and 450100-3447, respectively), incorporated herein by reference.

The first embodiment includes the DCC plus function to add color in high luminance regions by setting the channel level limit value CM to, e.g., more than 110% in the saturation knee process to alleviate the restrictions on the channel level. Therefore, it becomes possible to advantageously obtain the satisfactory color in high luminance regions without changing the hue.

Also in the first embodiment, when any channel level is still excessive after the white clipping operation of the luminance signal, the saturation knee process is executed to adjust such a level. Consequently, the white clipping operation can be performed without changing the hue.

Further in the first embodiment, flare is corrected under such control as to decrease the luminance gain kw in any gradation region where the black floating is induced, so that the proper flare correction can be realized without affecting the color. In the first embodiment, such flare correction is performed automatically by the adaptive gradation conversion with the histogram equalization, hence attaining an advantage that a required correction is executed when the flare occurs.

Further in the first embodiment where the adaptive is gradation conversion with the histogram equalization is executed on the luminance level, any gradation regions not being currently used are compressed with priority to consequently attain effective use of the dynamic range. In this case, the histogram equalization can be adjusted by specifying the equalization strength Kwc (see expression (34) and FIG. 10(d)) to realize the proper adaptive gradation conversion with the optimum histogram equalization. And in a stage subsequent to the adjustment of the histogram equalization, the black code offset $B_{OF}$ is subtracted and then the black code holding process is executed (see FIG. 10(e)). Therefore, the consistency of the black code can be ensured to consequently achieve the satisfactory luminance conversion calculation in the luminance conversion calculator 111 carried out on the stimulus value. Moreover, after the termination of the black code holding process, the peak holding process is executed so that the level of the input luminance A may not be changed despite the conversion (see FIG. 10(f)). As a result, when lighting condition is good for example, and the histogram value of any section of a normal light amount is excellent, it is rendered possible, by holding the luminance level of the relevant section, to prevent a disadvantage that the video signal in the relevant section is knee-compressed.

If any channel level is excessive even after the adaptive gradation conversion with the histogram equalization performed on the luminance level, the saturation knee operation is executed to make a proper adjustment, whereby the adaptive gradation conversion with the histogram equalization can be carried out without changing the hue.

Further in the first embodiment, a user is enabled to set the saturation gain kcn to a desired value and, although the priority is given to the operation of reducing the saturation by the saturation knee operation, the saturation can be freely adjusted according to the saturation gain kcn set by the user.

In the first embodiment of FIG. 1, the controller 124 is operative to minimize the delay in the circuits relevant to the calculations of the luminance gain kw and the saturation gain kc, wherein data W' and MAX' for obtaining the saturation gain kc are calculated by multiplying the luminance gain kw1 by the luminance W and MAX(R,G,B). The reason for minimizing the delay in the relevant circuits is as follows: since the main system passing signals through the color correcting circuit 108 and the system including the image enhancer 109 exist in parallel with each other, the respective overall delays therein should be identical. If the delay in the system for obtaining kw and kc is greater, a delay circuit needs to be inserted in the other system to maintain the exact timing.

FIG. 36 shows principal components of a video camera 100A representing a second embodiment of the present invention. In this embodiment, apart from the above-described problem of the delay, a luminance conversion calculation is first executed, and then the luminance signal Wi and a saturation gain kc to be used in the saturation conversion calculation are obtained from the foregoing luminance calculations. In FIG. 36, any components corresponding to those in FIG. 1 are denoted by like reference numerals, and a detailed explanation thereof is omitted.

In the video camera 100A shown in FIG. 36, red, green and blue color data at the 2fs1 rate outputted from up-converters 107R, 107G, 107B are supplied to a luminance conversion controller 124a. The luminance gain kw to be used in the luminance conversion calculator 111 is generated by circuits in this controller 124a which correspond to the matrix circuit 201 and the luminance gain generator 202 in FIG. 11. Then red, green and blue stimulus values outputted from the luminance conversion calculator 111 are supplied to a saturation conversion controller 124b. And subsequently the luminance signal Wi and the saturation gain kc to be used in a saturation conversion calculator 112 are generated by circuits corresponding to the matrix circuit 201, the maximum value circuit 210 and the saturation gain generator 216 in FIG. 11.

Although not mentioned above, it is in the following two cases (1) and (2) that problems may arise due to the adaptive gradation conversion with the histogram equalization.

(1) When histogram values concentrate in specific luminance regions, particularly in dark portions.

(2) When lighting condition is good and the histogram values are mostly in a normal light range.

In the case when the histogram values concentrate in specific regions, the differential gain is increased extremely and therefore the S/N may be impaired. When the iris is closed, the gain is increased in the vicinity of black where the condition is the most severe for a video camera, so that the picture quality is deteriorated. In order to eliminate this problem, the microcomputer 125 acquires information on the luminance regions where the histogram values concentrate, and then reduces the strength Kwc of the histogram equalization. If the luminance regions, where the histogram values concentrate, are in the vicinity of black, the strength Kwc may further be reduced.

In sequence 6 "histwr" at step 2 of the operation of the sequencer shown in FIG. 16, each histogram value read from the RAM 224 is stored in the register of a histogram data report circuit (not shown). Then, in this circuit, the histogram values thus successively stored are compared with each other, and the data of the luminance regions corresponding to, e.g., the four greatest histogram values are obtained. Thereafter, the data of the luminance regions corresponding to such four greatest histogram values are outputted from the report circuit to the microcomputer 125.

In the case of a good lighting condition, the luminance peak holding operation is necessary, as described with reference to FIG. 10(f). The level A for keeping the luminance signal fixed needs to be designated. Although not mentioned above, it is preferred that an automatic iris control value be assigned to the level A. An automatic iris control value signifies the brightness extracted from one picture and representing the relevant picture, and the iris is so actuated that such brightness becomes equal to a preset value. By the use of this automatic iris control value for designating the level A, the desired luminance level in the automatic iris system can be reproduced completely with the process of the histogram equalization.

It has been described that, in the first embodiment, the amplitude transfer characteristic for executing the adaptive gradation conversion with the histogram equalization is produced on the basis of the cumulative frequency distribution (histogram table) detected during the video period of the preceding field. However, it is a matter of choice that such characteristic may also be produced on the basis of the cumulative frequency distribution detected during the video periods of several previous fields.

Having described specific preferred embodiments of the invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A video camera for generating a video signal formed of luminance and chrominance components, said chrominance component defined by hue and saturation components, said video camera comprising:

generator means for generating input three primary color signals having respective levels and representing the video signal;

luminance converter means for generating, as a first stage of a knee compression operation, compressed three primary color signals by compressing the respective levels of the input three primary color signals using one compression rate without affecting the hue and saturation components; and saturation converter means for adjusting, as a second stage of said knee compression operation, a maximum level detected from the compressed three primary color signals when the detected maximum level exceeds a first predetermined threshold level, wherein the detected maximum level is adjusted to substantially coincide with the first predetermined threshold level without affecting the hue component and the luminance component.

2. The apparatus according to claim 1, wherein the three respective levels are compressed when the luminance component exceeds a second predetermined threshold level.

3. The apparatus according to claim 2, wherein said first predetermined threshold level is selected to be higher than said second predetermined threshold level.

4. The apparatus according to claim 1, wherein said first predetermined threshold level is selected to be higher than a maximum signal level established in accordance with a color television standard.

5. The apparatus according to claim 1, further comprising gamma correction means for performing gamma correction on the compressed three primary color signals following the compression and adjustment by said luminance converter means and saturation converter means, respectively.

6. The apparatus according to claim 5, further comprising matrix means for generating the luminance component and color difference signals based on the compressed three primary color signals that have been processed by said gamma correction means.

7. The apparatus according to claim 1, further comprising input luminance level detector means for detecting the luminance level of the video signal represented by the input three primary color signals; and compression rate detector means for detecting the compression rate from the detected luminance level.

8. The apparatus according to claim 7, further comprising compressed luminance level detector means for detecting the luminance level of the video signal represented by the compressed three primary color signals; and level control value detector means for determining, based on the detected compressed luminance level, a level control value such that the maximum level of the compressed three primary color signals is adjusted by said saturation converter means to substantially coincide with the first predetermined threshold level, said saturation converter means adjusting the respective levels of the remaining compressed primary color signals as a function of the level control value.

9. The apparatus according to claim 1, further comprising compressed luminance level detector means for detecting the luminance level of the video signal represented by the compressed three primary color signals; and level control value detector means for determining, based on the detected compressed luminance level, a level control value such that the maximum level of the compressed three primary color signals is adjusted by said saturation converter means to substantially coincide with the first predetermined threshold level, said saturation converter means adjusting the respective levels of the remaining compressed primary color signals as a function of the level control value.

10. The apparatus according to claim 1, further comprising saturation conversion rate detector means for detecting a saturation conversion rate used in adjusting the saturation component of the video signal represented by the compressed three primary color signals such that the maximum level of at least one compressed primary color signal substantially coincides with the first predetermined threshold level, said saturation converter means adjusting the respective levels of the remaining compressed primary color signals using the detected saturation conversion rate.

11. The apparatus according to claim 1, further comprising saturation conversion rate detector means for detecting the saturation conversion rate used in adjusting the saturation component of the video signal represented by the compressed three primary color signals such that the maximum level of at least one compressed primary color signal substantially coincides with the first predetermined threshold level; and saturation conversion rate input means for supplying a user selectable saturation conversion rate; wherein said saturation converter means adjusts the respective levels of the compressed three primary color signals using the lowest rate selected from the detected saturation conversion rate or the user selectable saturation conversion rate.

12. A video signal processor for processing a video signal formed of luminance and chrominance components, said chrominance component defined by hue and saturation components, said video signal processor comprising:

generator means for generating input three primary color signals having respective levels and representing the video signal;

luminance converter means for generating, as a first stage of a knee compression operation, compressed three primary color signals by compressing the respective levels of the input three primary color signals using one compression rate without affecting the hue and saturation components; and saturation converter means for adjusting, as a second stage of said knee compression operation, a maximum level detected from the compressed three primary color signals when the detected maximum level exceeds a first predetermined threshold level, wherein the detected maximum level is adjusted to substantially coincide with the first predetermined threshold level without affecting the hue component and the luminance component.

13. The apparatus according to claim 12, wherein the three respective levels are compressed when the luminance component exceeds a second predetermined threshold level.

14. The apparatus according to claim 13, wherein said first predetermined threshold level is selected to be higher than said second predetermined threshold level.

15. The apparatus according to claim 12, wherein said first predetermined threshold level is selected to be higher than a maximum signal level established in accordance with a color television standard.

16. The apparatus according to claim 12, further comprising gamma correction means for performing gamma correction on the compressed three primary color signals following the compression and adjustment by said luminance converter means and saturation converter means, respectively.

17. The apparatus according to claim 16, further comprising matrix means for generating the luminance component and color difference signals from the compressed three primary color signals that have been processed by said gamma correction means.

18. The apparatus according to claim 12, further comprising input luminance level detector means for detecting the luminance level of the video signal represented by the input three primary color signals; and compression rate detector means for detecting the compression rate from the detected luminance level.

19. The apparatus according to claim 18, further comprising compressed luminance level detector means for detecting the luminance level of the video signal represented by the compressed three primary color signals; and level control value detector means for determining, based on the detected compressed luminance level, a level control value such that the maximum level of the compressed three primary color signals is adjusted by said saturation converter means to substantially coincide with the first predetermined threshold level, said saturation converter means adjusting the respective levels of the remaining compressed primary color signals as a function of the level control value.

20. The apparatus according to claim 12, further comprising compressed luminance level detector means for detecting the luminance level of the video signal represented by the compressed three primary color signals; and level control value detector means for determining, based on the detected compressed luminance level, a level control value such that the maximum level of the compressed three primary color signals is adjusted by said saturation converter means to substantially coincide with the first predetermined threshold level, said saturation converter means adjusting the respective levels of the remaining compressed primary color signals as a function of the level control value.

21. The apparatus according to claim 12, further comprising saturation conversion rate detector means for detecting a saturation conversion rate used in adjusting the saturation component of the video signal represented by the compressed three primary color signals such that the maximum level of at least one compressed primary color signal substantially coincides with the first predetermined threshold level, said saturation converter means adjusting the respective levels of the remaining compressed primary color signals using the detected saturation conversion rate.

22. The apparatus according to claim 12, further comprising saturation conversion rate detector means for detecting the saturation conversion rate used in adjusting the saturation component of the video signal represented by the compressed three primary color signals such that the maximum level of at least one compressed primary color signal substantially coincides with the first predetermined threshold level; and saturation conversion rate input means for supplying a user selectable saturation conversion rate; wherein said saturation converter means adjusts the respective levels of the compressed three primary color signals using the lowest rate selected from the detected saturation conversion rate or the user selectable saturation conversion rate.

23. A video camera for generating a video signal formed of luminance and chrominance components, said chrominance component defined by hue and saturation components, said video camera comprising:

generator means for generating input three primary color signals having respective levels and representing the video signal;

luminance converter means for generating gradation converted three primary color signals by gradation converting the respective levels of the input three primary color signals using one gradation conversion rate without affecting the hue and saturation components; and saturation converter means for adjusting, as part of a knee compression operation, a maximum level detected from the gradation converted three primary color signals when the detected maximum level exceeds a first predetermined threshold level, wherein the detected maximum level is adjusted to substantially coincide with the first predetermined threshold level without affecting the hue component and the luminance component.

24. The apparatus according to claim 23, wherein the three respective levels are gradation converted when the luminance component exceeds a second predetermined threshold level.

25. The apparatus according to claim 24, wherein said first predetermined threshold level is selected to be higher than said second predetermined threshold level.

26. The apparatus according to claim 23, wherein said luminance converter means is knee correction means for providing a knee characteristic operative on the video signal.

27. The apparatus according to claim 26, wherein said first predetermined threshold level is selected to be higher than a maximum signal level established in accordance with a color television standard.

28. The apparatus according to claim 23, further comprising gamma correction means for performing gamma correction on the gradation converted three primary color signals following the gradation conversion and adjustment by said luminance converter means and saturation converter means, respectively.

29. The apparatus according to claim 28, further comprising matrix means for generating the luminance component and color difference signals based on the gradation converted three primary color signals that have been processed by said gamma correction means.

30. The apparatus according to claim 23, further comprising input luminance level detector means for detecting the luminance level of the video signal represented by the input three primary color signals; and gradation conversion rate detector means for detecting the gradation conversion rate from the detected luminance level.

31. The apparatus according to claim 30, further comprising gradation conversion luminance level detector means for detecting the luminance level of the video signal represented by the gradation converted three primary color signals; and level control value detector means for determining, based on the detected gradation converted luminance level, a level control value such that the maximum level of the gradation converted three primary color signals is adjusted by said saturation converter means to substantially coincide with the first predetermined threshold level, said saturation converter means adjusting the respective levels of the remaining gradation converted primary color signals as a function of the level control value.

32. The apparatus according to claim 23, further comprising gradation conversion luminance level detector means for detecting the luminance level of the video signal represented by the gradation converted three primary color signals; and level control value detector means for determining, based on the detected gradation converted luminance level, a level control value such that the maximum level of the gradation converted three primary color signals is adjusted by said saturation converter means to substantially coincide with the first predetermined threshold level, said saturation converter means adjusting the respective levels of the remaining gradation converted primary color signals as a function of the level control value.

33. The apparatus according to claim 23, further comprising saturation conversion rate detector means for detecting a saturation conversion rate used in adjusting the saturation component of the video signal represented by the gradation converted three primary color signals such that the maximum level of at least one gradation converted primary color signal substantially coincides with the first predetermined threshold level, said saturation converter means adjusting the respective levels of the remaining gradation converted primary color signals using the detected saturation conversion rate.

34. The apparatus according to claim 23, further comprising saturation conversion rate detector means for detecting the saturation conversion rate used in adjusting the saturation component of the video signal represented by the gradation converted three primary color signals such that the maximum level of at least one gradation converted primary color signal substantially coincides with the first predetermined threshold level; and saturation conversion rate input means for supplying a user selectable saturation conversion rate; wherein said saturation converter means adjusts the respective levels of the gradation converted three primary color signals using the lowest rate selected from the detected saturation conversion rate or the user selectable saturation conversion rate.

35. A video signal processor for processing a video signal formed of luminance and chrominance components, said chrominance component defined by hue and saturation components, said video signal processor comprising:
generator means for generating input three primary color signals having respective levels and representing the video signal;
luminance converter means for generating gradation converted three primary color signals by gradation converting the respective levels of the input three primary color signals using one gradation conversion rate without affecting the hue and saturation components; and
saturation converter means for adjusting, as part of a knee compression operation, a maximum level detected from the gradation converted three primary color signals when the detected maximum level exceeds a first predetermined threshold level, wherein the detected maximum level is adjusted to substantially coincide with the first predetermined threshold level without affecting the hue component and the luminance component.

36. The apparatus according to claim 35, wherein the three respective levels are gradation converted when the luminance component exceeds a second predetermined threshold level.

37. The apparatus according to claim 36, wherein said first predetermined threshold level is selected to be higher than said second predetermined threshold level.

38. The apparatus according to claim 35, wherein said luminance converter means is knee correction means for providing a knee characteristic operative on the video signal.

39. The apparatus according to claim 38, wherein said first predetermined threshold level is selected to be higher than a maximum signal level established in accordance with a color television standard.

40. The apparatus according to claim 35, further comprising gamma correction means for performing gamma correction on the gradation converted three primary color signals following the gradation conversion and adjustment by said luminance converter means and saturation converter means, respectively.

41. The apparatus according to claim 40, further comprising matrix means for generating the luminance component and color difference signals from the gradation converted three primary color signals that have been processed by said gamma correction means.

42. The apparatus according to claim 35, further comprising input luminance level detector means for detecting the luminance level of the video signal represented by the input three primary color signals; and gradation conversion rate detector means for detecting the gradation conversion rate from the detected luminance level.

43. The apparatus according to claim 42, further comprising gradation converted luminance level detector means for detecting the luminance level of the video signal represented by the gradation converted three primary color signals; and level control value detector means for determining, based on the detected gradation converted luminance level, a level control value such that the maximum level of the gradation converted three primary color signals is adjusted by said saturation converter means to substantially coincide with the first predetermined threshold level, said saturation converter means adjusting the respective levels of the remaining gradation converted primary color signals as a function of the level control value.

44. The apparatus according to claim 35, further comprising gradation converted luminance level detector means for detecting the luminance level of the video signal represented by the gradation converted three primary color signals; and level control value detector means for determining, based on the detected gradation converted luminance level, a level control value such that the maximum level of the gradation converted three primary color signals is adjusted by said saturation converter means to substantially coincide with the first predetermined threshold level, said saturation converter means adjusting the respective levels of the remaining gradation converted primary color signals as a function of the level control value.

45. The apparatus according to claim 35, further comprising saturation conversion rate detector means for detecting a saturation conversion rate used in adjusting the saturation component of the video signal represented by the gradation converted three primary color signals such that the maximum level of at least one gradation converted primary color signal substantially coincides with the first predetermined threshold level, said saturation converter means adjusting the respective levels of the remaining gradation converted primary color signals using the detected saturation conversion rate.

46. The apparatus according to claim 35, further comprising saturation conversion rate detector means for detecting the saturation conversion rate used in adjusting the saturation component of the video signal represented by the gradation converted three primary color signals such that the maximum level of at least one gradation converted primary color signal substantially coincides with the first predetermined threshold level; and saturation conversion rate input means for supplying a user selectable saturation conversion rate; wherein said saturation converter means adjusts the respective levels of the gradation converted three primary color signals using the lowest rate selected from the detected saturation conversion rate or the user selectable saturation conversion rate.

47. A method for compressing a level of a video signal formed of luminance and chrominance components, said chrominance component defined by hue and saturation components, the video signal being represented by three primary color signals having respective levels, said method comprising the steps of:

compressing, during a first stage of a knee compression operation, the respective levels of the three primary color signals using one compression rate to generate compressed three primary color signals without affecting the hue and saturation components; and adjusting, during a second stage of said knee compression operation, a maximum level of at least one compressed primary color signal to substantially coincide with a predetermined threshold level without affecting the hue component and the luminance component when the maximum level of said one compressed primary color signal exceeds the predetermined threshold level.

48. A method for converting gradations of a video signal formed of luminance and chrominance components, said chrominance component defined by hue and saturation components, the video signal being represented by three primary color signals, said method comprising the steps of:

converting the gradations of the three primary color signals using one compression rate to generate gradation converted three primary color signals without affecting the hue and saturation components; and adjusting, as part of a knee compression operation, a maximum level of at least one gradation converted primary color signal to substantially coincide with a predetermined threshold level without affecting the hue component and the luminance component when the maximum level of said one gradation converted primary color signal exceeds the predetermined threshold level.

49. A video camera for generating an output video signal by converting gradations of an input video signal, comprising:

cumulative frequency distribution detector means for detecting a cumulative frequency distribution of the input video signal;

first conversion data generator means for generating first conversion data for converting a level of the input video signal to a level of the output video signal based on the cumulative frequency distribution;

second conversion data generator means for generating second conversion data by adjusting the first conversion data, wherein the second conversion data is obtained by making the output video signal level, converted with the first conversion data, substantially equal to the input video signal level; and level converter means for converting the input video signal level to the output video signal level using the second conversion data.

50. The apparatus according to claim 49, wherein the output video signal comprises high luminance components, and further comprising high luminance compression means for compressing the high luminance components outputted from said level converter means.

51. The apparatus according to claim 49, wherein the input video signal includes at least first and second video portions and a vertical blanking interval; and wherein the cumulative frequency distribution is detected during the first video portion, and the first and second conversion data are generated during the vertical blanking interval based on the cumulative frequency distribution detected during the second video portion preceding the first video portion.

52. The apparatus according to claim 49, wherein the input video signal includes a plurality of video portions and at least one vertical blanking interval; and wherein the first and second conversion data are generated during the vertical blanking interval based on a plurality of cumulative frequency distributions detected during the plurality of video portions.

53. A video signal processor for processing a video signal by converting gradations of an input video signal to obtain an output video signal, comprising:

cumulative frequency distribution detector means for detecting a cumulative frequency distribution of the input video signal;

first conversion data generator means for generating first conversion data for converting a level of the input video signal to a level of the output video signal based on the cumulative frequency distribution;

second conversion data generator means for generating second conversion data by adjusting the first conversion data, wherein the second conversion data is obtained by making the output video signal level, converted with the first conversion data, substantially equal to the input video signal level; and level converter means for converting the input video signal level to the output video signal level using the second conversion data.

54. The apparatus according to claim 53, wherein the output video signal comprises high luminance components, and further comprising high luminance compression means for compressing the high luminance components outputted from said level converter means.

55. The apparatus according to claim 53, wherein the input video signal includes at least first and second video portions and a vertical blanking interval; and wherein the cumulative frequency distribution is detected during the first video portion, and the first and second conversion data are generated during the vertical blanking interval based on the cumulative frequency distribution detected during the second video portion preceding the first video portion.

56. The apparatus according to claim 53, wherein the input video signal includes a plurality of, video portions and at least one vertical blanking interval; and wherein the first and second conversion data are generated during the vertical blanking interval based on a plurality of cumulative frequency distributions detected during the plurality of video portions.

57. A video camera for generating an output video signal by converting gradations of an input video signal which includes a high data occurrence period and a low data occurrence period, comprising:

detector means for detecting signal level distribution data of an input video signal during the high data occurrence period, and for detecting conversion data for converting a gradation of the input video signal during the low data occurrence period based on the signal level distribution data;

control means for controlling said detector means in accordance with the input video signal;

memory means for storing at least the signal level distribution data and conversion data; and gradation converter means for converting the gradation of the input video signal based on the conversion data.

58. The apparatus according to claim 57, wherein said control means enables said detector means to detect the conversion data in response to the signal level distribution data being stored in said memory means.

59. The apparatus according to claim 58, wherein the conversion data is operative to inhibit the gradation conversion with respect to a predetermined level of the input video signal.

60. The apparatus according to claim 58, wherein the input video signal includes a black code, and the conversion data is operative to inhibit the gradation conversion with respect to the black code.

61. A video signal processor for processing a video signal by converting gradations of an input video signal, which includes a high data occurrence period and a low data occurrence period, to obtain an output video signal, comprising:

detector means for detecting signal level distribution data of an input video signal during the high data occurrence period, and for detecting conversion data for converting a gradation of the input video signal during the low data occurrence period based on the signal level distribution data;

control means for controlling said detector means in accordance with the input video signal;

memory means for storing at least the signal level distribution data and conversion data; and gradation converter means for converting the gradation of the input video signal based on the conversion data.

62. The apparatus according to claim 61, wherein said control means enables said detector means to detect the conversion data in response to the signal level distribution data being stored in said memory means.

63. The apparatus according to claim 62, wherein the conversion data is operative to inhibit the gradation conversion with respect to a predetermined level of the input video signal.

64. The apparatus according to claim 62, wherein the input video signal includes a black code, and the conversion data is operative to inhibit the gradation conversion with respect to the black code.

65. A method for converting gradations of an input video signal, which includes a high data occurrence period and a low data occurrence period, to obtain an output video signal, comprising the steps of:

detecting a cumulative frequency distribution of the input video signal;

generating first conversion data for converting a level of the input video signal to a level of the output video signal based on the cumulative frequency distribution;

generating second conversion data by adjusting the first conversion data, wherein the second conversion data is obtained by making the output video signal level, converted with the first conversion data, substantially equal to the input video signal level; and converting the input video signal level to the output video signal level using the second conversion data.

* * * * *